US012221893B2

(12) United States Patent
Cafaro et al.

(10) Patent No.: US 12,221,893 B2
(45) Date of Patent: Feb. 11, 2025

(54) CONTROLLING EXCITATION LOADS ASSOCIATED WITH OPEN ROTOR AERONAUTICAL ENGINES

(71) Applicants: General Electric Company, Schenectady, NY (US); General Electric Company Polska Sp. z o.o., Warsaw (PL)

(72) Inventors: Stefan Joseph Cafaro, Chapel Hill, NC (US); Inenhe Mohammed Khalid, West Chester, OH (US); James Ryan Reepmeyer, Montgomery, OH (US); Amit Zutshi, Mason, OH (US); Daniel Edward Mollmann, Cincinnati, OH (US); Arjan Johannes Hegeman, Cincinnati, OH (US); Rafal Sarba, Warsaw (PL)

(73) Assignees: GENERALE ELECTRIC COMPANY, Evendale, OH (US); GENERALE ELECTRIC COMPANY POLSKA SP. Z O.O, Warsaw (PL)

( * ) Notice: Subject to any disclaimer, the term of this patent is extended or adjusted under 35 U.S.C. 154(b) by 0 days.

(21) Appl. No.: 18/081,813

(22) Filed: Dec. 15, 2022

(65) Prior Publication Data

US 2024/0052755 A1 Feb. 15, 2024

(30) Foreign Application Priority Data

Aug. 10, 2022 (PL) ..................................... P.441992

(51) Int. Cl.
*F01D 17/16* (2006.01)
*F01D 7/00* (2006.01)

(52) U.S. Cl.
CPC ............ *F01D 17/162* (2013.01); *F01D 7/00* (2013.01); *F05D 2220/323* (2013.01); *F05D 2240/12* (2013.01); *F05D 2240/20* (2013.01)

(58) Field of Classification Search
CPC . F01D 17/162; F01D 7/00; F01D 5/02; F01D 5/147; F01D 21/00; F01D 21/003;
(Continued)

(56) References Cited

U.S. PATENT DOCUMENTS 3,861,822 A * 1/1975 Wanger ................ F04D 29/563
415/162
4,738,589 A 4/1988 Wright
(Continued)

FOREIGN PATENT DOCUMENTS

DE 102004014850 A1 11/2005
WO WO9819909 A1 5/1998
WO WO2009/096058 A1 8/2009

OTHER PUBLICATIONS

Cecrdle, Aeroelastic Stability of Turboprop Aircraft: Whirl Flutter, Chapter 8, Intech, Flight Physics—Models, Techniques and Technologies, Feb. 2018, pp. 139-158. http://dx.doi.org/10.5772/intechopen.70171.

(Continued)

*Primary Examiner* — Brian Christopher Delrue
(74) *Attorney, Agent, or Firm* — Dority & Manning, P.A.

(57) ABSTRACT

A method of controlling an aeronautical gas turbine engine may be performed with an electronic controller. The method may include determining an airfoil pitch control command for at least one of a plurality of airfoils of the aeronautical gas turbine engine based at least in part on an excitation load acting upon the aeronautical gas turbine engine, and outputting the airfoil pitch control command to one or more actuators actuatable to change a pitch angle of the at least one of the plurality of airfoils. The airfoil pitch control
(Continued)

command may be configured to augment and/or compensate for the excitation load acting upon the aeronautical gas turbine engine. The method may be embodied by a non-transitory computer-readable medium that includes computer-executable instructions, which when executed by a processor associated with the electronic controller, cause the electronic controller to perform the method.

20 Claims, 13 Drawing Sheets

(58) Field of Classification Search
CPC ........... F05D 2220/323; F05D 2240/12; F05D 2240/20; F02C 9/00; F04D 27/00; F04D 27/001; F04D 29/388
See application file for complete search history.

(56) References Cited

U.S. PATENT DOCUMENTS

| | | | | |
|---|---|---|---|---|
| 4,856,962 | A | 8/1989 | McDow | |
| 4,967,550 | A * | 11/1990 | Acton | G05D 16/2066 415/119 |
| 5,259,187 | A | 11/1993 | Dunbar et al. | |
| 5,315,821 | A | 5/1994 | Dunbar et al. | |
| 5,453,943 | A | 9/1995 | Magliozzi | |
| 5,794,432 | A * | 8/1998 | Dunbar | F04D 27/02 60/226.1 |
| 7,730,714 | B2 | 6/2010 | Wood et al. | |
| 8,276,362 | B2 * | 10/2012 | Suciu | F02K 3/068 60/226.1 |
| 8,641,367 | B2 * | 2/2014 | Norris | F04D 29/563 415/115 |
| 8,974,184 | B2 * | 3/2015 | Becker | F03B 13/24 416/168 R |
| 9,423,233 | B2 | 8/2016 | Holt et al. | |
| 9,821,917 | B2 | 11/2017 | Becker et al. | |
| 10,414,484 | B2 | 9/2019 | Moxon | |
| 10,556,699 | B2 * | 2/2020 | Pautis | B64C 11/305 |
| 10,647,438 | B2 * | 5/2020 | Armstrong | B64D 27/10 |
| 2006/0122798 | A1 * | 6/2006 | Teolis | G01M 15/14 702/66 |
| 2008/0273965 | A1 * | 11/2008 | Rajamani | F01D 21/003 60/39.24 |
| 2010/0014977 | A1 | 1/2010 | Shattuck | |
| 2015/0027212 | A1 * | 1/2015 | Fadlun | F04B 51/00 73/112.05 |
| 2016/0333729 | A1 | 11/2016 | Miller et al. | |
| 2017/0102006 | A1 | 4/2017 | Miller et al. | |
| 2017/0218854 | A1 * | 8/2017 | Nestico | F02C 9/18 |
| 2019/0040875 | A1 | 2/2019 | Ramamoorthy et al. | |
| 2020/0003073 | A1 | 1/2020 | Karapurath et al. | |
| 2020/0191004 | A1 * | 6/2020 | Prasad | F01D 17/16 |
| 2021/0108575 | A1 * | 4/2021 | Adibhatla | F02C 9/22 |
| 2021/0108595 | A1 | 4/2021 | Khalid et al. | |
| 2021/0222575 | A1 * | 7/2021 | Breeze-Stringfellow | F01D 25/12 |
| 2023/0060832 | A1 * | 3/2023 | Hall | F01D 17/162 |
| 2024/0051656 | A1 * | 2/2024 | Zutshi | B64C 13/24 |
| 2024/0052753 | A1 * | 2/2024 | Zutshi | B64C 11/32 |

OTHER PUBLICATIONS

McNamee, Propeller Blade Asymmetric Loading Part 1, Youtube Video, Sep. 2010. Retrieved Jan. 13, 2022 from https://www.youtube.com/watch?v=H880hnwtAh0.

Reed III, Review of Propeller-Rotor Whirl Flutter, NASA-TR-R-264, National Aeronautics and Space Administration Technical Report, Washington DC, Jul. 1967, 34 Pages.

Swashplate (Aeronautics), Wikipedia, 3 Pages. Retrieved Jan. 14, 2022 from: https://en.wikipedia.org/wiki/Swashplate_(aeronautics).

* cited by examiner

CONTROLLING EXCITATION LOADS ASSOCIATED WITH OPEN ROTOR AERONAUTICAL ENGINES

PRIORITY INFORMATION

The present application claims priority to Polish Patent Application Number P. 441992 filed on Aug. 10, 2022.

FIELD

The present disclosure relates to open rotor aeronautical engines.

BACKGROUND

A gas turbine engine may include a turbomachine and a fan section. The turbomachine may include a compressor, a combustor, and a turbine arranged in serial flow order. The fan section may include a fan that is coupled with the turbomachine, such that the turbomachine may rotate the fan of the fan section. An outer nacelle may surround the fan of the fan section. The outer nacelle may effectively straighten out an inlet airflow to the fan, such that regardless of an angle of attack of the engine, the airflow to the fan is relatively axial (with respect to the gas turbine engine.

At least certain gas turbine engines may remove the outer nacelle, for example, to facilitate a larger fan within the fan section of the gas turbine engine. The inventors of the present disclosure have found that improvements may be desired to accommodate off-axis airflow provided to the fan of the fan section.

BRIEF DESCRIPTION OF THE DRAWINGS

A full and enabling disclosure, including the best mode thereof, directed to one of ordinary skill in the art, is set forth in the specification, which makes reference to the appended figures, in which.

DETAILED DESCRIPTION

Figure 1:
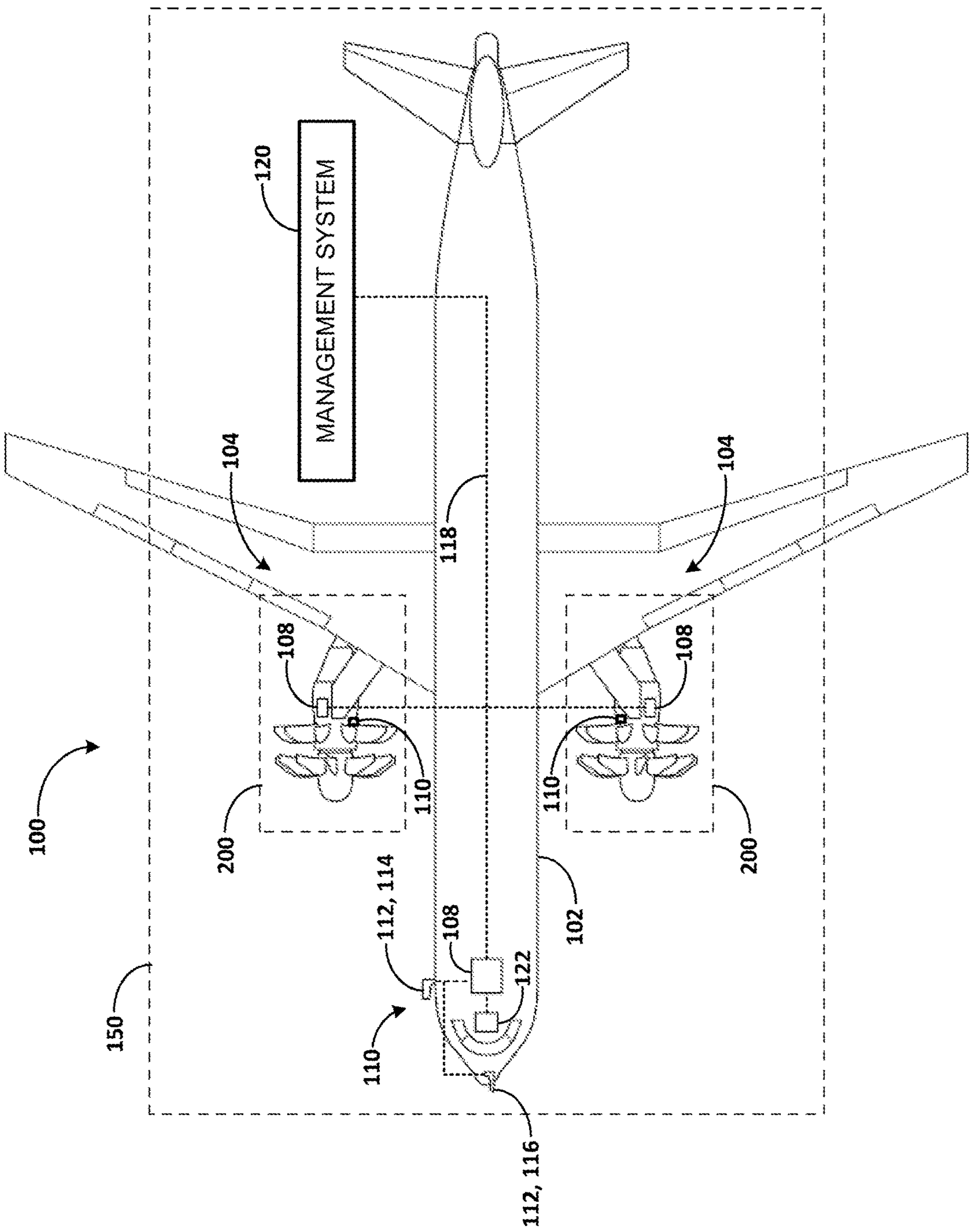
FIG. 1 schematically depicts an exemplary aircraft in accordance with an exemplary embodiment of the present disclosure.

Reference will now be made in detail to present embodiments of the disclosure, one or more examples of which are illustrated in the accompanying figures. The present disclosure uses numerical and letter designations to refer to features in the figures. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include open rotor turbine engines, turbofan engines, turboprop engines, turbojet engines, turboshaft engines, etc., as well as hybrid-electric versions of one or more of these engines.

The term "open rotor aeronautical engine" or "open rotor engine" refers to an aeronautical engine, such as an aeronautical gas turbine engine, that includes a fan stage with fan blades that are not enclosed within a casing. An open rotor aeronautical engine may sometimes be referred to as a propfan engine, an unducted fan engine, or an ultra-high-bypass turbofan. An open rotor aeronautical engine may sometimes be referred to more succinctly as an open rotor engine.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g.,-er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the term "rated speed" with reference to a gas turbine engine refers to a maximum rotational speed that the gas turbine engine may achieve while operating properly. For example, the gas turbine engine may be operating at the rated speed during maximum load operations, such as during takeoff operations.

As used herein, the term "fan pressure ratio" as it relates to a plurality of fan blades of a fan, refers to a ratio of an air pressure immediately downstream of the fan blades during operation of the fan to an air pressure immediately upstream of the fan blades of the fan during operation of the fan.

Approximating language, as used herein throughout the specification and claims, is applied to modify any quantitative representation that could permissibly augment without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

For purposes of the present disclosure, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The present disclosure generally pertains to aeronautical engines, such as aeronautical gas turbine engines. Such engines may have an open rotor configuration as described herein. An open rotor aeronautical engine may include a plurality of airfoils, such as a plurality of fan blades and/or a plurality of guide vanes, that may be subjected to airfoil excitation phenomenon associated with such open rotor configuration. Such airfoil excitation phenomenon may cause aerodynamic forces that affect operational performance of the open rotor engine. Additionally, or in the alternative, such airfoil excitation phenomenon may affect structural requirements of an open rotor aeronautical engine, support structures, and/or related componentry. Accordingly, it would be welcomed in the art to provide apparatuses, systems, methods, and computer-readable media that may be utilized in connection with control operations of an open rotor aeronautical engine, including control operations performed to augment and/or compensate for an excitation load associated with an airfoil excitation phenomena.

The present disclosure generally provides apparatuses, systems, methods, and computer-readable media that may be utilized in connection with control operations of an open rotor aeronautical engine, including control operations performed in connection with airfoil excitation phenomenon that may impart an excitation load upon the open rotor engine, such as upon one or more airfoils of the open rotor engine, one or more bearing assemblies of the open rotor engine, and/or upon one or more engine support structures. In accordance with the present disclosure, various sensors may be utilized to determine an occurrence of an airfoil excitation phenomena and/or an excitation load associated therewith. Sensor data from the various sensors may be provided to one or more electronic controllers that have an airfoil excitation control module configured to provide control commands to controllable components associated with the open rotor engine based at least in part on the sensor data. The open rotor engine may include one or more pitch change assemblies that may change a pitch angle of one or more airfoils, such as one or more fan blades and/or one or more guide vanes of the open rotor engine. The pitch angle of the one or more airfoils may be changed, for example, based at least in part on control commands from an electronic controller, to augment and/or compensate for an excitation load acting upon the open rotor engine, such as upon one or more airfoils of the open rotor engine, one or more bearing assemblies of the open rotor engine, and/or one or more support structures of the open rotor engine. In some embodiments, the pitch angle of one or more fan blades may be changed to augment and/or compensate for an excitation load. Additionally, or in the alternative, the pitch angle of one or more guide vanes may be changed to augment and/or compensate for an excitation load. Additionally, or in the alternative, a fuel flow and/or power output of the open rotor engine may be changed to augment and/or compensate for such an excitation load.

As used herein, the terms “airfoil excitation phenomena” and “airfoil excitation phenomenon” refer to aerodynamic phenomena that impart an excitation load upon an open rotor aeronautical engine. An airfoil excitation phenomena may impart an excitation load upon one or more airfoils of an open rotor engine. The excitation load may be translated to other portions of the open rotor engine, such as to one or more bearing assemblies and/or one or more support structures. An airfoil excitation phenomena may be attributable at least in part to uneven or variable airflow incident upon the one or more airfoils in relation to an axis of thrust of the open rotor engine. The axis of thrust may generally be oriented along a longitudinal axis of the fan assembly; however, it will be appreciated that in some embodiments the axis of thrust may differ or diverge from the longitudinal axis of the fan assembly (e.g., up, down, left, and/or right), for example, according to the configuration of the open rotor engine and/or under various operation conditions. Additionally, the longitudinal axis of the fan assembly may generally be aligned with a longitudinal axis of the open rotor engine; however, it will be appreciated that the longitudinal axis of the fan assembly may differ or diverge from the longitudinal axis of the open rotor engine (e.g., up, down, left, and/or right), for example, according to the configuration of the open rotor engine and/or under various operating conditions. The axis of thrust may be augmented by changing a pitch angle of one or more airfoils, such as a pitch angle of one or more fan blades and/or a pitch angle of one or more guide vanes.

As used herein, the term “excitation load” refers to a load acting upon an open rotor aeronautical engine as a result of, or in relation to, one or more airfoil excitation phenomenon. The excitation load may act upon one or more airfoils, such as one or more fan blades and/or one or more guide vanes. The excitation load may translate to other portions of the open rotor engine, such as to one or more bearing assemblies and/or one or more engine support structures. As used herein, the term “asymmetric load” refers to an excitation load that has asymmetry, or is asymmetric, as between one or more airfoils of an open rotor engine, and/or as between one or more circumferential positions about a longitudinal axis of the open rotor engine. An excitation load, such as an asymmetric load, may have a frequency corresponding to rotation of the fan assembly and/or a circumferential position of one or more respective airfoils. An excitation load, such as an asymmetric load, may occur in a cyclic nature corresponding to one or more rotational circumferential positions of the fan blades, for example, at a frequency of n-instances per revolution of the fan assembly, and may sometimes be referred to as “cyclic load.” A cyclic load that occurs at a frequency of one instance per revolution of the fan assembly may be referred to as a “1P load,” where 1P stance for once per revolution. In some embodiments, an excitation load, such as an asymmetric load, may have a frequency that corresponds to a multiple or a fraction of a full revolution of the fan assembly. In some embodiments, an excitation load, such as an asymmetric excitation load, may include an “nP load,” where n is the number of instances per revolution. For example, an nP load may include a 2P load, a 3P load, a 4P load, or even higher order cyclic loads. Such nP loads may be amplified in proximity to a natural frequency or resonant frequency of the airfoils.

An excitation load may act upon one or more airfoils to varying degrees during operation of an open rotor engine, for example, based at least in part on varying airfoil excitation phenomenon that may contribute to the excitation load. The excitation load may translate from the airfoils to one or more components of the open rotor engine, such as to one or more bearing assemblies, and/or to an engine support structure, such as to one or more support arms that mount the open rotor engine to the aircraft. In accordance with the present disclosure, an open rotor engine may include one or more sensors that provide sensor data that may be utilized by an electronic controller to determine airfoil excitation phenomenon and/or an excitation load and to provide control commands to one or more controllable components to augment and/or compensate for such airfoil excitation phenomenon and/or excitation load.

In some embodiments, a relatively high excitation load may arise during maneuvers in which at least some of the airfoils exhibit a relatively high aerodynamic incidence vector. By augmenting and/or compensating for such airfoil excitation phenomenon and/or excitation loads, propulsive efficiency of an open rotor engine may be improved. For example, fuel efficiency, specific fuel consumption, thrust-specific fuel consumption, and/or thrust-to-weight ratio, may be improved. Additionally, or in the alternative, cycle fatigue and/or load bearing design requirements of various components of an open rotor engine may be reduced, which may improve longevity, maintenance runtime, and/or operating performance of the open rotor engine.

In some embodiments, an airfoil excitation phenomena may include aerodynamic phenomena attributable at least in part to an aerodynamic incidence vector of the respective airfoils and/or to one or more atmospheric conditions encountered by the respective airfoils. The aerodynamic incidence vector may depend on a pitch angle of the respective airfoils. Additionally, or in the alternative, the aerodynamic incidence vector may depend on a direction of airflow incident upon the respective airfoils. Additionally, or in the alternative, the aerodynamic incidence vector may depend at least in part on a flight path of an aircraft propelled by one or more open rotor engines, a flight trajectory or aerial maneuver of the aircraft, and/or operating conditions of the open rotor engine. For example, the aerodynamic incidence vector may depend at least in part on a pitch, roll, and/or yaw associated with a flight trajectory or aerial maneuver of the aircraft.

The one or more atmospheric conditions that may cause or contribute to an airfoil excitation phenomena may include variations in air speed, atmospheric pressure, temperature, humidity, turbulent air patterns, vortices, ground effects, and so forth. An airfoil excitation phenomena attributable to an aerodynamic incidence vector and/or to one or more other aerodynamic phenomenon may impart an excitation load that is asymmetric with respect to one or more airfoils of an open rotor engine, and/or with respect to one or more circumferential positions of the airfoils. For example, the aerodynamic incidence vector may differ as between respective circumferential positions of one or more airfoils, such as a rotational circumferential position in the case of a plurality of fan blades rotating about a longitudinal axis of the fan assembly and/or a fixed circumferential position in the case of a plurality of guide vanes circumferential spaced about the longitudinal axis in respectively fixed radial positions. The excitation load may depend at least in part on a circumferential position of the respective airfoils, for example, based at least in part on the aerodynamic incidence vector of the respective airfoils corresponding to a respective circumferential position. The aerodynamic incidence vector of a respective fan blade may change, for example, according to a sinusoidal function, as the respective fan blade rotates about the longitudinal axis of the fan assembly. At a given instant, the aerodynamic incidence vector of a plurality of circumferentially-spaced fan blades may depend at least in part on the circumferential positions of the respective fan blades, for example, according to a sinusoidal function.

By way of example, a downward moving fan blade may have a relatively higher aerodynamic incidence vector, attributable at least in part to a relatively higher angle of attack, as compared to an upward moving fan blade. Such a relatively higher angle of incidence vector of a downward moving fan blade may correspond to a relatively higher amount of airflow across the airfoil and a correspondingly higher amount of thrust, as compared to an upward moving fan blade. As a result, the respective fan blades may undergo cyclic loading as they rotate.

The aerodynamic incidence vector of a plurality of circumferentially-spaced guide vanes may depend at least in part on the fixed circumferential position of the respective guide vanes, for example, according to a sinusoidal function. Additionally, or in the alternative, a direction of airflow incident upon the respective airfoils may affect the aerodynamic incidence vector, such as which of the airfoils have a relatively higher and/or relatively lower aerodynamic incidence vector. Asymmetric loading, such as with respect to rotational or fixed circumferential position, may cause a pitch moment, a roll moment, and/or yaw moment, which may translate to other portions of the open rotor engine, such as to one or more bearing assemblies and/or one or more engine support structures. The aerodynamic incidence vector of a respective airfoil (e.g., a fan blade or a guide vane) may be augmented by changing a pitch angle of the respective airfoil. Such an airfoil excitation phenomena that imparts an excitation load that depends on a rotational or fixed circumferential position sometimes be referred to as a "cyclic excitation."

In addition, or in the alternative to a cyclic excitation, in some embodiments, an airfoil excitation phenomena may include autogenous excitation. As used herein, the term "autogenous excitation" refers to one or more airfoil excitation phenomenon that impart an autogenous load upon one or more airfoils of an open rotor engine, such as one or more fan blades and/or one or more guide vanes. As used herein, the term "autogenous load" refers to an excitation load that arises from or within one or more airfoils that is at least partially attributable to an airfoil excitation phenomenon. In some embodiments, an autogenous excitation may include an aeroelastic excitation. In some embodiments, an autogenous load may include an aeroelastic load, such as airfoil flutter (e.g., fan blade flutter and/or guide vane flutter). Airfoil flutter may sometimes be referred to as "whirl." An aeroelastic load such as airfoil flutter or whirl may include vibrations that may translate to other portions of the open rotor engine and/or to an engine support structure. An autogenous excitation such as airfoil flutter, may be attributable at least in part to aerodynamic phenomenon such as aerodynamic incidence vector, uneven or variable airflow incident upon the one or more airfoils in relation to an axis of thrust of the open rotor engine, and/or other atmospheric conditions. An aeroelastic load such as airfoil flutter may have an increased incidence of occurrence in the event of high power operations, during landing, and at certain airfoil pitch angles. An aeroelastic load such as airfoil flutter may additionally or alternatively have an increased incidence of occurrence in the event of an aerodynamic incidence vector that includes a high angle of attack and/or a significant angle of sideslip, such as during high power operations, during landing, and at certain airfoil pitch angles. The vibrations associated with an aeroelastic load such as airfoil flutter may exhibit a relatively high amplitude and/or frequency, and/or a rapidly changing amplitude and/or frequency.

In addition, or in the alternative, to aeroelastic excitation, an autogenous excitation may include gyroscopic excitation. In some embodiments, an autogenous load may include a gyroscopic load. A gyroscopic load may be attributable at least in part to an aerodynamic phenomenon that forces airfoils out of a normal plane of rotation, and/or as a result of rapid pitch and/or yaw changes, such as those associated with aerial maneuvers. A gyroscopic load upon the airfoils may translate to other portions of the open rotor engine and/or to an engine support structure. In some embodiments, autogenous load such as airfoil flutter may be attributable at least in part to a gyroscopic load. For example, vibrations attributable to an autogenous load such as airfoil flutter may be amplified and/or induced by a gyroscopic load. Additionally, or in the alternative, a cyclic excitation may be amplified and/or induced at least in part by a gyroscopic load. An autogenous load from autogenous excitation such as aeroelastic excitation and/or gyroscopic excitation may translate to other portions of the open rotor engine, such as to one or more bearing assemblies of the open rotor engine, and/or to one or more engine support structures of the open rotor engine.

As used herein, the term "aerodynamic incidence vector" refers to a vector representing a direction at which a stream of airflow becomes incident upon an airfoil. An aerodynamic incidence vector may have X, Y, and Z dimensions in relation to a cartesian coordinate system, in which the X direction corresponds to a chord line of the airfoil representing a straight line joining the leading edge and trailing edge of the airfoil, the Y direction corresponds to a longitudinal axis of the airfoil, and the Z direction corresponds to a normal axis oriented normal to the X and Y direction. An aerodynamic incidence vector may include component vectors corresponding to an angle of attack and/or an angle of sideslip. The aerodynamic incidence vector may represent a resultant vector of the component vectors corresponding to an angle of attack and/or an angle of sideslip. As used herein, the term "angle of attack" refers to an angle between the chord line of the airfoil (X axis) and the projection of the aerodynamic incidence vector on the plane of symmetry defined by the chord line of the airfoil and the normal axis (X, Z plane). Angle of attack generally corresponds to oncoming airflow incident upon the airfoil, such as oncoming airflow associated with relative air speed. As used herein, the term "angle of sideslip" refers to an angle between the chord line of the airfoil (X axis) and the projection of the aerodynamic incidence vector on the plane of symmetry defined by the chord line of the airfoil and the longitudinal axis of the airfoil (X, Z plane). Angle of sideslip generally corresponds to crossways airflow incident upon the airfoil, such as crossways airflow associated with cross-wind.

Referring now to the drawings, with respect to which identical numerals indicate the same elements throughout the figures, exemplary embodiments of the present disclosure are further described. Referring to FIG. 1, an exemplary aircraft 100 is described. It will be appreciated that the aircraft 100 shown in FIG. 1 is provided by way of example and not to be limiting, and that presently disclosed subject matter may be incorporated into other embodiments of an aircraft without departing from the scope of the present disclosure. As shown, an aircraft 100 may include a fuselage 102 and a pair of wings 104 extending laterally outward from the fuselage 102. The aircraft 100 may include one or more open rotor engines 200 that provide thrust for operating the aircraft 100 such as during flight and/or taxiing. As shown, the one or more open rotor engines 200 may be configured as an open rotor engine 200, as described, for example, in FIGS. 2 and 3. The aircraft 100 may include any suitable number of open rotor engines 200, such as 1, 2, 4, 6, or 8 open rotor engines 200. As shown, a first open rotor engine 200 may be mounted to a first wing 104, such as in an under-wing configuration, and a second open rotor engine 200 may be mounted to a second wing 104, such as in an under-wing configuration. In some embodiments, a plurality of open rotor engines 200 may be mounted to the first and second wings 104, respectively. Additionally, or in the alternative, one or more open rotor engines 200 may be mounted to the aircraft 100 in other suitable locations and/or configurations, such as to the fuselage 102 aft of the wings 104.

The aircraft 100 may include a computing system 700 that controls operations of the aircraft 100 and the various systems thereof, including, for example, operations of the one or more open rotor engines 200. The computing system 700 may include one or more electronic controllers 108. The one or more electronic controllers 108 may include one or more engine control units, electronic engine controllers, full-authority digital engine control (FADEC) device, or the like. The one or more electronic controllers 108 may be located anywhere in the aircraft 100. By way of example, a first electronic controller 108, such as a FADEC device, may be located on or in proximity to a first open rotor engine 200, a second electronic controller 108 may be located on or in proximity to a second open rotor engine 200, and/or a third electronic controller 108 may be located within the fuselage 102 of the aircraft 100, such as in the cockpit.

The aircraft 100 may include a plurality of sensors 110, such as one or more sensors 110 for sensing various operating conditions associated with the aircraft 100, and/or one or more sensors 110 for sensing various operating conditions associated with the one or more open rotor engines 200. As shown, the one or more sensors 110 for sensing various operating conditions associated with the aircraft 100 may include one or more aerodynamic incidence sensors 112, such as one or more angle of attack sensors 114 and/or one or more angle of sideslip sensors 116. The one or more sensors 110 for sensing various operating conditions associated with the aircraft 100, may additionally include one or more airspeed sensors, temperature sensors, pressure sensors, sensors for recording ambient conditions, and the like. The plurality of sensors 110 may be communicatively coupled with one or more of the electronic controllers 108 of the computing system 700, for example, via a wired or wireless communication network 118. Sensor data from the respective sensors 110, such as the one or more aerodynamic incidence sensors 112, may be provided to the one or more electronic controllers 108.

The computing system 700 may also be communicatively coupled with a management system 120 and/or a user interface 122 via the wired or wireless communication network 118. The management system 120 and the computing system 700 may interact with one another in connection with enterprise-level or fleet-level operations pertaining to the aircraft 100 and/or the computing system 700. Such enterprise level operations may include transmitting data from the management system 120 to the computing system 700 and/or transmitting data from the computing system 700 to the management system 120. The user interface 122 may include one or more user input/output devices to allow a user to interact with the computing system 700.

In accordance with the present disclosure, various aspects of the aircraft 100, the one or more open rotor engines 200, and/or the computing system 700, may define an excitation load control system 150. The excitation load control system may be configured to augment and/or control an excitation load acting upon an open rotor engine 200 as described herein. The excitation load control system 150 may include and/or may be integrated within any one or more of the aspects of the aircraft 100, any one or more of the aspects of the one or more open rotor engines 200, and/or any one or more of the aspects of the computing system 700, including any one or more of such aspects described herein.

Figure 2:
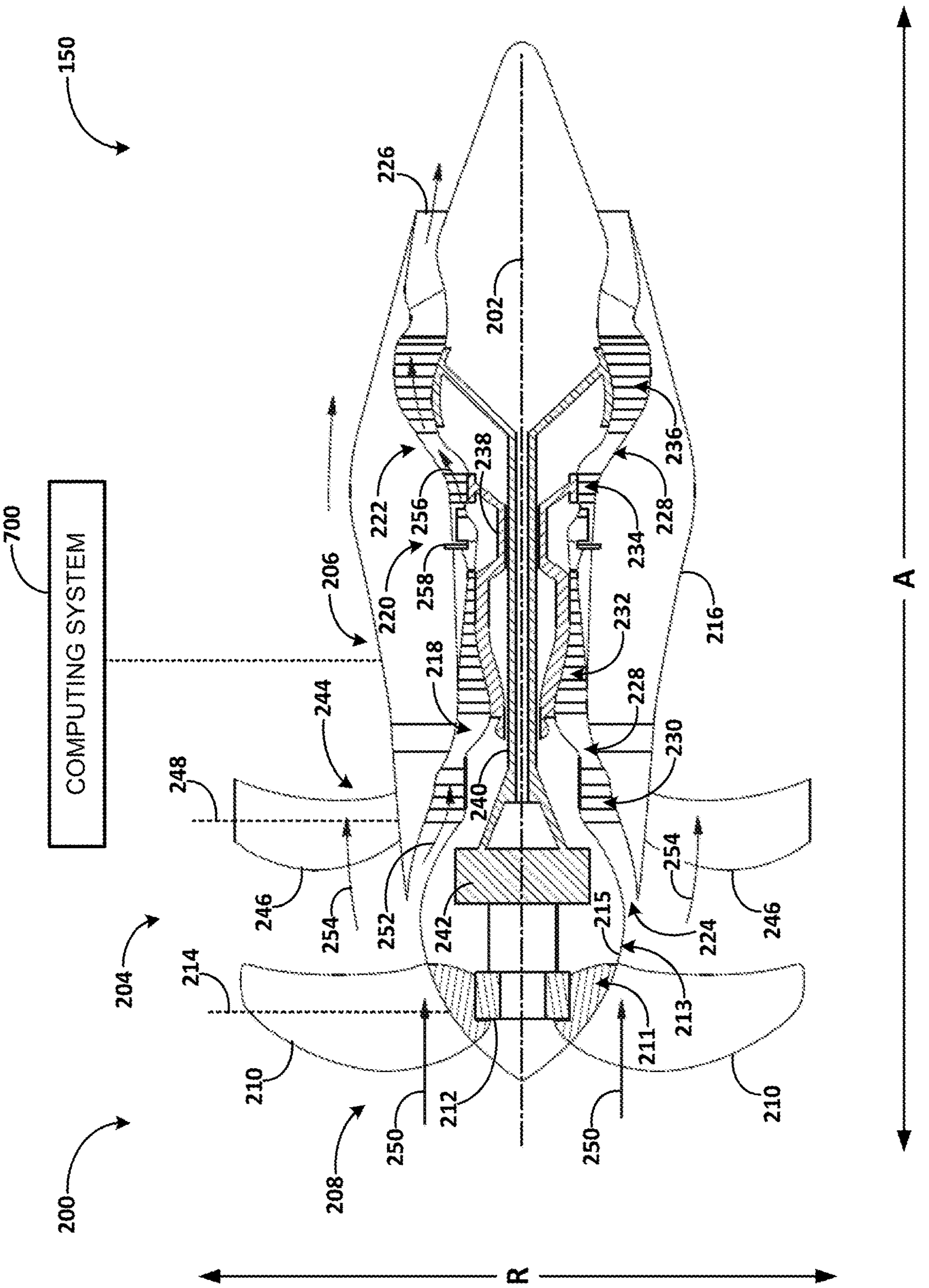
FIG. 2 shows a cross-sectional view schematically depicting certain aspects of an exemplary open rotor aeronautical engine that may be utilized to provide thrust for the aircraft depicted in FIG. 1.
Figure 3:
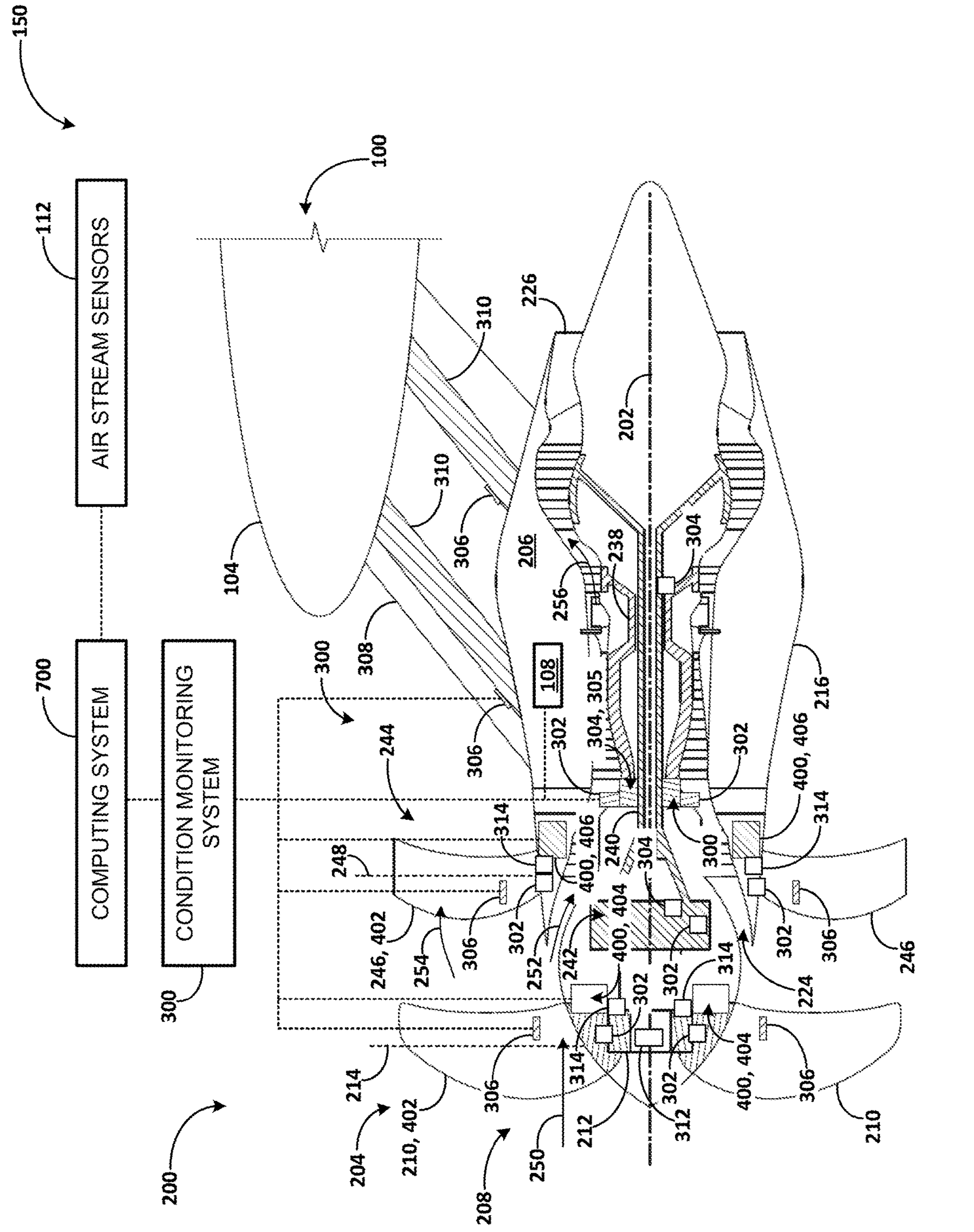
FIG. 3 shows a cross-sectional view schematically depicting additional aspects of the open rotor aeronautical engine shown in FIG. 2.

Referring now to FIGS. 2 and 3, an exemplary open rotor engine 200 is further described. In some exemplary embodiments, the open rotor engine 200 may be a relatively large power class open rotor engine 200 that may generate a relatively large amount of thrust when operated at the rated speed. For example, the open rotor engine 200 may generate from about 300 Kilonewtons (kN) of thrust to about 700 kN of thrust, such as from about 300 kN to about 500 kN of thrust, such as from about 500 kN to about 600 kN of thrust, or such as from about 600 kN to about 700 kN of thrust. However, it will be appreciated that the various features and attributes of the open rotor engine 200 described with reference to FIGS. 2 and 3 are provided by way of example only and not to be limiting. In fact, the present disclosure may be implemented with other types of open rotor engines 200, as well as other types of open rotor engines 200, including those with attributes or features that differ in one or more respects from those described herein.

As shown in FIGS. 2 and 3, the open rotor engine 200 defines an axial direction A, extending parallel to a longitudinal axis 202, and a radial direction R, extending radially transverse to the longitudinal axis 202. The open rotor engine 200 also defines a circumferential direction (not depicted), that circumferentially surrounds the longitudinal axis 202. As shown, for example, in FIG. 2 an open rotor engine 200 may include a fan section 204 and a core engine 206 disposed downstream from the fan section 204. The fan section 204 may include a fan assembly 208 rotatably driven by the core engine 206. The fan assembly 208 may include a plurality of fan blades 210. The plurality of fan blades 210 may be circumferentially-spaced from one another and may extend outwardly generally along a radial direction. The plurality of fan blades 210 may be coupled to a fan disk 212 in a spaced apart manner.

As shown in FIGS. 2 and 3, the fan blades 210 are not enclosed within a casing. A fan assembly 208 that has fan blades 210 that are not enclosed within a casing may sometimes be referred to as "unducted" fan assembly 208, and/or as a fan assembly 208 that has an unducted configuration. Fan blades 210 that are not enclosed within a casing may sometimes be referred to as "unducted" fan blades 210, or as fan blades 210 that have an unducted configuration. An unducted fan assembly 208 may sometimes be more succinctly referred to as a fan assembly 208. Unducted fan blades 210 may sometimes be more succinctly referred to as fan blades 210.

The fan assembly 208 may include a rotor portion 211 and a stator portion 213. The rotor portion 211 may include the fan disk 212 and the plurality of fan blades 210. The stator portion 213 may include a fan case 215. The fan case 215 may circumferentially surround at least a portion of the fan assembly 208. The core engine 206 may be coupled directly or indirectly to the fan section 204 to provide torque for driving the fan section 204. In exemplary embodiments, the fan assembly 208 may have a variable pitch configuration, such that the plurality of fan blades 210 may be rotated about a respective fan pitch axis 214, as described herein. Such fan blades 210 may be referred to as variable pitch fan blades 210.

The core engine 206 may include an engine case 216 that encases one or more portions of the core engine 206, including, a compressor section 218, a combustor section 220, and a turbine section 222. The engine case 216 may define a core engine-inlet 224, an exhaust nozzle 226, and a core air flowpath 228 therebetween. The core air flowpath 228 may pass through the compressor section 218, the combustor section 220, and the turbine section 222, in serial flow relationship. The compressor section 218 may include a first, booster or low pressure (LP) compressor 230 and a second, high pressure (HP) compressor 232. The turbine section 222 may include a first, high pressure (HP) turbine 234 and a second, low pressure (LP) turbine 236. The compressor section 218, combustor section 220, turbine section 222, and exhaust nozzle 226 may be arranged in serial flow relationship and may respectively define a portion of the core air flowpath 228 through the core engine 206.

The core engine 206 and the fan section 204 may be coupled to a shaft driven by the core engine 206. By way of example, as shown in FIG. 2, the core engine 206 may include a high pressure (HP) shaft 238 and a low pressure (LP) shaft 240. The HP shaft 238 may drivingly connect the HP turbine 234 to the HP compressor 232. The LP shaft 240 may drivingly connect the LP turbine 236 to the LP compressor 230. In other embodiments, an open rotor engine 200 may have three shafts, such as in the case of an engine that includes an intermediate pressure turbine.

In some embodiments, the fan section 204 may be coupled directly to a shaft of the core engine 206, such as directly to an LP shaft 240. Alternatively, as shown in FIG. 2, the fan section 204 and the core engine 206 may be coupled to one another by way of a power gearbox 242, such as a planetary reduction gearbox, an epicyclical gearbox, or the like. For example, the power gearbox 242 may couple the LP shaft 240 to the fan assembly 208, such as to the fan disk 212 of the fan section 204. The power gearbox 242 may include a plurality of gears for stepping down the rotational speed of the LP shaft 240 to a more efficient rotational speed for the fan section 204.

The open rotor engine 200 may include one or more guide vane assemblies 244. A guide vane assembly 244 may include a plurality of guide vanes 246 extending outwardly from the core engine 206, such as from the engine case 216, generally along the radial direction R, in a circumferentially-spaced manner. The guide vanes 246 may have uniform or non-uniform circumferential spacing. The plurality of guide vanes 246 may be mounted to a stationary frame or other mounting structure of the engine case 216. In some embodiments, a guide vane assembly 244 may include a plurality of guide vanes 246 disposed downstream from the fan section 204 along the axial direction A, as shown. Guide vanes 246 that are disposed downstream from the fan section 204 may be referred to as outlet guide vanes 246. Additionally, or in the alternative, a guide vane assembly 244 may include a plurality of guide vanes 246 disposed upstream from the fan section 204 along the axial direction A. Guide vanes 246 that are disposed upstream from the fan section 204 may be referred to as inlet guide vanes 246. The plurality of guide vanes 246, whether configured as outlet guide vanes 246 or inlet guide vanes 246, may be rotatable about respective guide vane axis 248, as described herein. Such guide vanes 246 may be referred to as a variable pitch guide vanes 246.

As shown in FIGS. 2 and 3, the guide vanes 246 are not enclosed within a casing. A guide vane assembly 244 that has guide vanes 246 that are not enclosed within a casing may sometimes be referred to as "unducted" guide vane assembly, and/or as a guide vane assembly that has an unducted configuration. Guide vanes 246 that are not enclosed within a casing may sometimes be referred to as "unducted" guide vanes 246, or as guide vanes 246 that have an unducted configuration. An unducted guide vane assembly 244 may sometimes be more succinctly referred to as a guide vane assembly 244. Unducted guide vanes 246 may sometimes be more succinctly referred to as guide vanes 246.

During operation of the open rotor engine 200 shown in FIGS. 2 and 3, volume of air 250 passes over the plurality of fan blades 210. A first portion of the volume of air 250, defining a core airflow 252, flows into the core engine-inlet 224 and through the core air flowpath 228. A second portion of the volume of air 250, defining a bypass airflow 254, passes over the guide vanes 246. The core airflow 252 is compressed by the compressor section 218. Pressurized air from the compressor section 218 flows downstream to the combustor section 220 where fuel is introduced to generate combustion gasses 256. The combustion gasses 256 exit the combustor section 220 and flow through the turbine section 222, generating torque that rotates the compressor section 218 to support combustion while also rotating the fan section 204, generating propulsive thrust. Additional thrust is generated by the combustion gasses 256 exiting the exhaust nozzle 226. The open rotor engine 200 may include a fuel system that has one or more fuel valves 258 that control a flow of fuel to the combustor section 220.

The guide vanes 246 may reduce swirl in the bypass airflow 254 generated by fan blades 210. Inlet guide vanes 246 may impart a degree of counter-swirl in the bypass airflow 254, for example, by imparting a tangential velocity in a direction opposite to the rotational direction of the fan blades 210. Outlet guide vanes 246 may reduce swirl generated by the fan blades 210, for example, by imparting a change in tangential velocity in a direction opposite to the rotational direction of the fan blades 210. Swirl remaining the bypass airflow 254 may correspond to a decrease in the amount of thrust generated by the fan blades 210, and/or the efficiency of the open rotor engine 200. The guide vanes 246 may straighten the bypass airflow 254, which improves the efficiency of the open rotor engine 200.

Referring now to FIG. 3, aspects of an exemplary open rotor engine 200 are further described, including aspects associated with an excitation load control system 150. As shown, the open rotor engine 200 may be communicatively coupled to the computing system 700. The computing system 700 may control operations of the open rotor engine 200 and the various systems thereof, including, for example, adjusting positions of the variable pitch fan blades 210 (e.g., rotating the respective fan blades 210 about the corresponding fan pitch axis 214) and/or adjusting positions of the variable pitch guide vanes 246 (e.g., rotating the respective guide vanes 246 about the corresponding guide vane axis 248). Generally, adjustments to the pitch of the fan blades 210 and/or the guide vanes 246 may be carried out at least in part two vary thrust and/or swirl effects under various operating conditions. For example, a magnitude and/or direction of thrust produced by the fan blades 210 may be adjusted by changing the pitch of the fan blades 210 and/or the guide vanes 246. Additionally, or in the alternative, the pitch of the fan blades 210 and/or the guide vanes 246 may be changed in response to an excitation load acting upon the open rotor engine 200, such as upon one or more airfoils (e.g., one or more fan blades 210 and/or one or more guide vanes 246), one or more bearing assemblies, and/or an engine support structure 308 (e.g., one or more support arms 310 that mount the open rotor engine 200 to the aircraft 100). For example, the pitch of the fan blades 210 and/or the guide vanes 246 may be changed at least in part to augment and/or compensate for an excitation load, such as an asymmetric load. The excitation load may be determined based at least in part on an aerodynamic incidence vector of one or more of the airfoils (e.g., one or more fan blades 210 and/or one or more guide vanes 246). Additionally, or in the alternative, the excitation load may depend at least in part on the aerodynamic incidence vector of one or more of the airfoils. The aerodynamic incidence vector may be determined based at least in part on sensor data corresponding to one or more sensors 110 (e.g., FIG. 1).

The control operations of the open rotor engine 200 may be carried out based at least in part on sensor data corresponding to one or more sensors 110 (e.g., FIG. 1) that sense various operating conditions associated with the open rotor engine 200 and/or the aircraft 100. The control operations may be performed at least in part by one or more electronic controllers 108, such as one or more engine control units, electronic engine controllers, full-authority digital engine control (FADEC) device, or the like.

As shown in FIG. 3, the open rotor engine 200 may include a condition monitoring system 300. The condition monitoring system 300 may monitor one or more conditions associated with the open rotor engine 200. The condition monitoring system 300 may define a portion of the computing system 700, or may be communicatively coupled with the computing system 700. Additionally, or in the alternative, the conditioning monitoring system 300 may define a portion of an electronic controller 108, or may be communicatively coupled with an electronic controller 108, such as an electronic controller 108 located on, or in proximity to, the open rotor engine 200. The condition monitoring system 300 may perform vibration-based condition monitoring of the open rotor engine 200. The vibration-based condition monitoring may include determining an excitation load acting upon the open rotor engine 200. The open rotor engine 200 may include one or more vibration sensors 302 operably coupled thereto. The one or more vibration sensors 302 may be utilized by the condition monitoring system 300 to perform vibration-based condition monitoring of the open rotor engine 200. By way of example the one or more vibration sensors 302 may include an accelerometer, a strain gauge, an eddy-current sensor, an acoustic sensor, an optical displacement sensor, or a gyroscope, as well as combinations of these. The one or more vibration sensors 302 may measure one or more characteristics of vibration, such as frequency, amplitude, phase, or noise, as well as combinations of these.

The one or more vibration sensors 302 may be located at any suitable position about the open rotor engine 200, such as at one or more locations about the core engine 206 and/or one or more locations about the fan assembly 208. By way of example, one or more vibration sensors 302 may be positioned on, at, within, or in proximity to one or more bearing assemblies 304 of the open rotor engine 200, such as on, at, within, or in proximity to one or more bearing assemblies of the HP shaft 238 and/or the LP shaft 240. In some embodiments, one or more vibration sensors 302 may be located at or in proximity to a forward axial bearing assembly 305 supporting the LP shaft 240. The one or more vibration sensors 302 located on, at, within, or in proximity to the one or more bearing assemblies 304 may include an accelerometer or any other suitable vibration sensor 302.

Additionally, or in the alternative, in some embodiments, one or more vibration sensors 302 may be located on, at, within, or in proximity to the fan assembly 208. For example, one or more vibration sensors 302 may be coupled to and/or contained within respective ones of the plurality of fan blades 210. All or a portion of the plurality of fan blades 210 may include one or more vibration sensors 302. The one or more vibration sensors 302 coupled to and/or contained within a respective fan blade 210 may include a strain gauge or any other suitable vibration sensor 302. Additionally, or in the alternative, one or more vibration sensors 302 may be located on, at, within, or in proximity to the fan disk 212 and/or the power gearbox 242.

Additionally, or in the alternative, in some embodiments, one or more vibration sensors 302 may be disposed about the engine case 216, for example, on, at, within, or in proximity to the guide vane assembly 244. For example, one or more vibration sensors 302 may be coupled to and/or contained within respective ones of the plurality of guide vanes 246. All or a portion of the plurality of guide vanes 246 may include one or more vibration sensors 302. The one or more vibration sensors 302 coupled to and/or contained within a respective guide vanes 246 may include a strain gauge or any other suitable vibration sensor 302.

In addition, or in the alternative, to sensor data from one or more vibration sensors 302, the computing system 700 and/or the condition monitoring system 300 may determine an excitation load acting upon the open rotor engine 200 based at least in part on sensor data from one or more strain gauges 306. As shown in FIG. 3, the open rotor engine 200 and/or the aircraft 100 may include one or more strain gauges 306 operably coupled thereto. By way of example, the one or more strain gauges 306 may include a linear strain gauge, a rosette strain gauge, a quarter-bridge type strain gauge, a half-bridge type strain gauge, or a full-bridge type strain gauge, as well as combinations of these. The one or more vibration sensors 302 may measure one or more characteristics of strain, such as axial strain, bending strain, shear strain, or torsion strain, as well as combinations of these.

The one or more strain gauges 306 may be located at any suitable position about the open rotor engine 200 and/or the aircraft 100, such as at one or more locations about the fan assembly 208 and/or one or more locations about the guide vane assembly 244. In some embodiments, one or more strain gauges 306 may be coupled to and/or contained within at least some of the plurality of airfoils 402. For example, one or more strain gauges 306 may be coupled to and/or contained within respective ones of the plurality of fan blades 210. All or a portion of the plurality of fan blades 210 may include one or more strain gauges 306. Additionally, or in the alternative, one or more strain gauges 306 may be coupled to and/or contained within respective ones of the plurality of guide vanes 246. All or a portion of the plurality of guide vanes 246 may include one or more strain gauges 306. Additionally, or in the alternative, in some embodiments, one or more strain gauges 306 may be coupled to and/or contained within an engine support structure 308. The engine support structure 308 may include one or more support arms 310 that mount the open rotor engine 200 to the aircraft 100, and/or that support the open rotor engine 200 in a mounted position, such as from the wing, fuselage, or tail of an aircraft. For example, as shown in FIG. 3, the open rotor engine 200 may be mounted in a mounted in an under-wing configuration. The one or more support arms 310 may include one or more pylons extending between the aircraft 100 and the engine case 216 of the open rotor engine 200. Additionally, or the alternative, the one or more support arms 310 include one or more thrust mounts that transfer axially directed thrust loads from the engine case 216 to the engine support structure 308.

The one or more vibration sensors 302 and/or the one or more strain gauges 306 may provide sensor data to the computing system 700 and/or the condition monitoring system 300. The sensor data from the one or more vibration sensors 302 and/or the one or more strain gauges 306 may be utilized to determine an excitation load. The computing system 700 and/or the condition monitoring system 300 may provide control commands to one or more controllable components, for example, in response to an excitation load determined based at least in part on sensor data from the one or more vibration sensors 302 and/or the one or more strain gauges 306.

Still referring to FIG. 3, the open rotor engine 200 may include one or more position indicators 312 that determine a circumferential position of at least one of the plurality of airfoils 402. In some embodiments, a position indicator 312 may determine a circumferential position of the fan assembly 208 and/or a circumferential position of one or more fan blades 210 of the fan assembly 208. One or more position indicators 312 may be situated at any suitable location of the open rotor engine 200. For example, a position indicator 312 may be disposed about the fan disk 212, one or more fan blades 210, the power gearbox 242, and/or the LP shaft 240. Any suitable position indicator may be utilized, such as a proximity sensor or the like. Suitable proximity sensors may include electromagnetic proximity sensors, optical proximity sensors, ultrasonic proximity sensors, capacitive proximity sensors, photoelectric proximity sensors, inductive proximity sensors, and magnetic proximity sensors.

A position indicator 312 may provide sensor data to the computing system 700 and/or the condition monitoring system 300 indicating a circumferential position of one or more fan blades 210. The circumferential position may be utilized to correlate or associate an excitation load to a circumferential position of one or more fan blades 210. Additionally, or in the alternative, the circumferential position may be utilized to determine an asymmetric load corresponding to a circumferential position of one or more of the fan blades 210 and/or one or more of the guide vanes 246. The computing system 700 and/or the condition monitoring system 300 may provide control commands to one or more controllable components, for example, based at least in part on an excitation load, such as an asymmetric load, corresponding to a circumferential position of one or more of the fan blades 210 and/or one or more of the guide vanes 246.

In some embodiments, the open rotor engine 200 may include one or more pitch angle indicators 314 that determine a pitch angle of one or more fan blades 210 and/or a pitch angle of one or more guide vanes 246. The one or more pitch angle indicators 314 may be situated at any suitable location of the open rotor engine 200. For example, one or more pitch angle indicators 314 may be disposed about a fan assembly 208. In some embodiments, respective ones of the plurality of pitch angle indicators 314 may determine a pitch angle of a corresponding one of the plurality of fan blades 210. Additionally, or the alternative, a pitch angle indicator 314 may determine a pitch angle of respective ones of a plurality of fan blades 210. Additionally, or the alternative, one more pitch angle indicators 314 may be disposed about a guide vane assembly 244. In some embodiments, respective ones of the plurality of pitch angle indicators 314 may determine a pitch angle of a corresponding one of the plurality of guide vanes 246. Additionally, or in the alternative, a pitch angle indicator 314 may determine a pitch angle of respective ones of a plurality of guide vanes 246.

A pitch angle indicator 314 may provide sensor data to the computing system 700 and/or to the condition monitoring system 300 indicating a pitch angle of one or more fan blades 210 and/or of one or more guide vanes 246. An excitation load, such as an asymmetric load, may be determined based at least in part on a corresponding pitch angle determined by a respective pitch angle indicator 314. Additionally, or in the alternative, an excitation load, such as an asymmetric load, may be determined based at least in part on an angle of attack and/or an angle of sideslip, as determined, for example, based at least in part on data from an angle of attack sensor 114 and/or an angle of sideslip sensor 116. The computing system 700 and/or the condition monitoring system 300 may provide control commands to one more controllable components, for example, based at least in part on a pitch angle of the one or more fan blades 210 and/or a pitch angle of the one or more guide vanes 246.

As shown in FIG. 3, the one or more controllable components may include one or more pitch change assemblies 400. A pitch change assembly 400 may change a pitch angle of one or more airfoils 402, such as a pitch angle of one or more fan blades 210 or a pitch angle of one or more guide vanes 246. The pitch angle of respective ones of a plurality of airfoils 402 may be changed individually and/or collectively by a pitch change assembly 400. As shown in the example of FIG. 3, the airfoils 402 are not enclosed within a casing. Airfoils 402 that are not enclosed within a casing may sometimes be referred to as "unducted" airfoils 402, or as airfoils 402 that have an unducted configuration. Unducted airfoils 402 may sometimes be more succinctly referred to as airfoils 402. A pitch change assembly 400 that changes a pitch angle of one or more fan blades 210 may sometimes be referred to as a fan blade-pitch change assembly 404. A fan blade-pitch change assembly 404 may individually and/or collectively change a pitch angle of respective ones of a plurality of fan blades 210. A pitch change assembly 400 that changes a pitch angle of one or more guide vanes 246 may sometimes be referred to as a guide vane-pitch change assembly 406. A guide vane-pitch change assembly 406 may individually and/or collectively change a pitch angle of respective ones of a plurality of guide vanes 246.

A fan blade-pitch change assembly 404 may change a pitch angle of one or more fan blades 210 by rotating the respective one or more fan blades 210 about a corresponding fan pitch axis 214. The pitch angle of the one or more fan blades 210 may be adjusted by the fan blade-pitch change assembly 404 to augment and/or compensate for an excitation load acting upon one or more of the airfoils 402. For example, the pitch angle of the one or more fan blades 210 may be adjusted by the fan blade-pitch change assembly 404 to augment and/or compensate for an excitation load acting upon one or more of the fan blades 210, and/or to augment and/or compensate for an excitation load acting upon one or more of the guide vanes 246. Additionally, or in the alternative, the pitch angle of the one or more fan blades 210 may be adjusted by the fan blade-pitch change assembly 404 to augment and/or compensate for an excitation load acting upon one more other portions of the open rotor engine 200, such as one or more bearing assemblies 304 (e.g., a forward axial bearing assembly 305), and/or such as an engine support structure 308 (e.g., one or more support arms 310).

A guide vane-pitch change assembly 406 may change a pitch angle of one or more guide vanes 246 by rotating the respective one more guide vanes 246 about a corresponding guide vane axis 248. The pitch angle of the one or more guide vanes 246 may be adjusted by the guide vane-pitch change assembly 406 to augment and/or compensate for an excitation load acting upon one or more of the airfoils 402. For example, the pitch angle of the one or more guide vanes 246 may be adjusted by the guide vane-pitch change assembly 406 to augment and/or compensate for an excitation load acting upon one or more of the fan blades 210, and/or to augment and/or compensate for an excitation load acting upon one or more of the guide vanes 246. Additionally, or in the alternative, the pitch angle of the one or more guide vanes 246 may be adjusted by the guide vane-pitch change assembly 406 to augment and/or compensate for an excitation load acting upon one more other portions of the open rotor engine 200, such as one or more bearing assemblies 304 (e.g., a forward axial bearing assembly 305), and/or such as an engine support structure 308 (e.g., one or more support arms 310).

In some embodiments, the pitch angle of the one or more fan blades 210 and/or the one or more guide vanes 246 may be adjusted at least in part to augment and/or to compensate for an excitation load, such as an asymmetric load, corresponding to one or more circumferential positions. An excitation load, such as an asymmetric load, may be determined based at least in part on sensor data from the one or more sensors 110, such as from the one or more aerodynamic incidence sensors 112, the one or more vibration sensors 302, and/or the one or more strain gauges 306. In some embodiments, an asymmetric load may be determined based at least in part on such sensor data in combination with data from one or more position indicators 312. Additionally, or in the alternative, an asymmetric load may be determined based at least in part on a correlation between the sensor data and circumferential position. In some embodiments, the one or more actuators 413 may be actuated to a first position during a cruise flight condition. The first position may correspond to an excitation load, such as an asymmetric load, that may exist during at least some cruise flight conditions. Additionally, or in the alternative, the one or more actuators 413 may be actuated to a second position during at least one of: a climbing flight condition, a descending flight condition, and a takeoff flight condition. The second position may correspond to an excitation load, such as an asymmetric load, that may exist during at least some climbing, descending, and/or takeoff flight conditions.

Referring now to FIGS. 4A-4H, exemplary pitch change assemblies 400 are further described. FIGS. 4A-4H show various embodiments and features of exemplary pitch change assemblies 400. It will be appreciated that the embodiments and features shown may be utilized interchangeably in various combinations. As shown, for example, in FIG. 4A, a pitch change assembly 400, such as a fan blade-pitch change assembly 404, may change a pitch angle (θ) of one or more airfoils 402, such as one or more fan blades 210. As shown, for example, in FIG. 4B, a pitch change assembly 400, such as a guide vane-pitch change assembly 406, may change a pitch angle (θ) of one or more airfoils 402, such as one or more guide vanes 246.

As shown in FIGS. 4A-4H, the one or more airfoils 402 may be respectively coupled to a corresponding airfoil retention mechanism 408. An airfoil retention mechanism 408 may have any suitable configuration that facilitates retaining the respective airfoil or airfoils 402 while allowing the respective airfoil or airfoils 402 to rotate about the respective fan pitch axis 214 or guide vane axis 248 (FIG. 3), as applicable. For example, an airfoil retention mechanism 408 may be configured as a trunnion, a cradle, a clevis, a bracket, or the like, as well as combinations of these. Such airfoil retention mechanism 408 may include associated mounting hardware. An airfoil retention mechanism 408 retains a fan blade 210 may sometimes be referred to as a fan blade-retention mechanism 410. An airfoil retention mechanism 408 that retains a guide vane 246 may sometimes be referred to as a guide vane-retention mechanism 412.

As shown in FIGS. 4A-4H, a pitch change assembly 400 may include one or more actuators 413 directly or indirectly coupled to one or more of the airfoil retention mechanisms 408 and/or to one or more airfoils 402. The one or more actuators 413 may be actuatable to change the pitch angle (θ) of the one or more airfoils 402. Any suitable actuator may be included in a pitch change assembly 400, such as an actuator that provides linear and/or rotary movement. Exemplary actuators include linear actuators, rotary actuators, hydraulic actuators, pneumatic actuators, electric actuators, electric motors, stepper motors, servomotors, comb drives. The one or actuators 413 may include associated mounting hardware, linkages, and so forth.

Figure 4B:
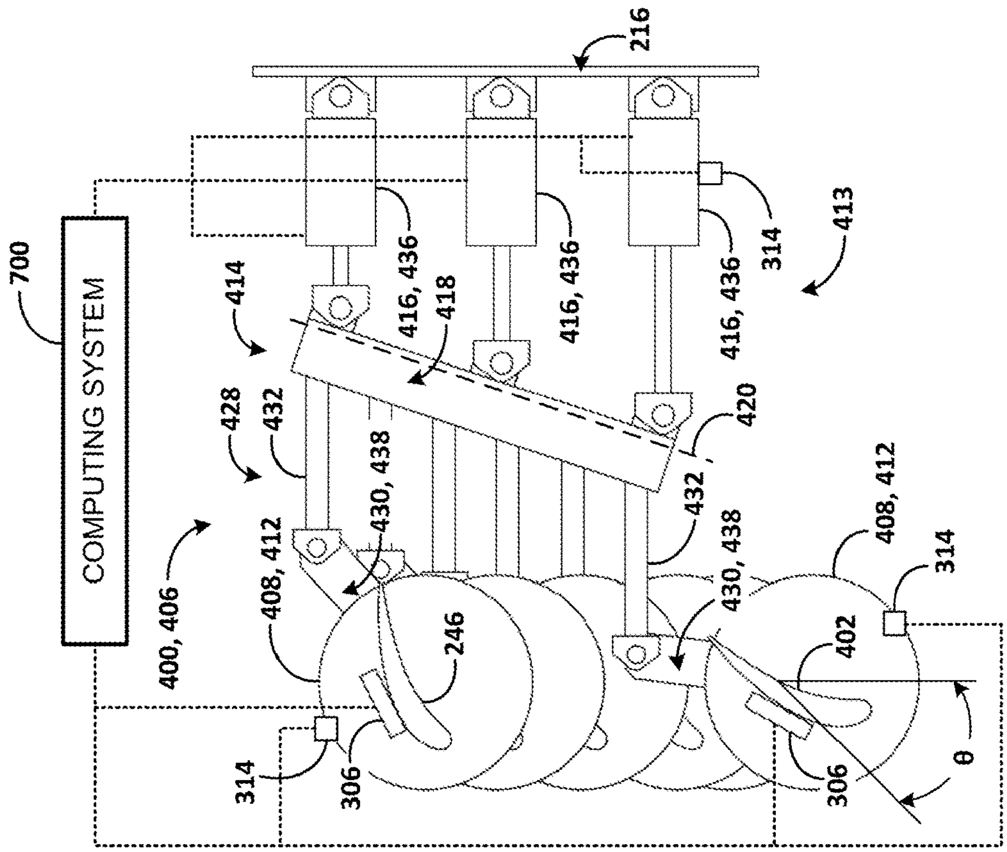
FIG. 4B schematically depicts aspects of a second exemplary pitch change assembly that may be utilized to change a pitch of one or more airfoils of an open rotor aeronautical engine.
Figure 4A:
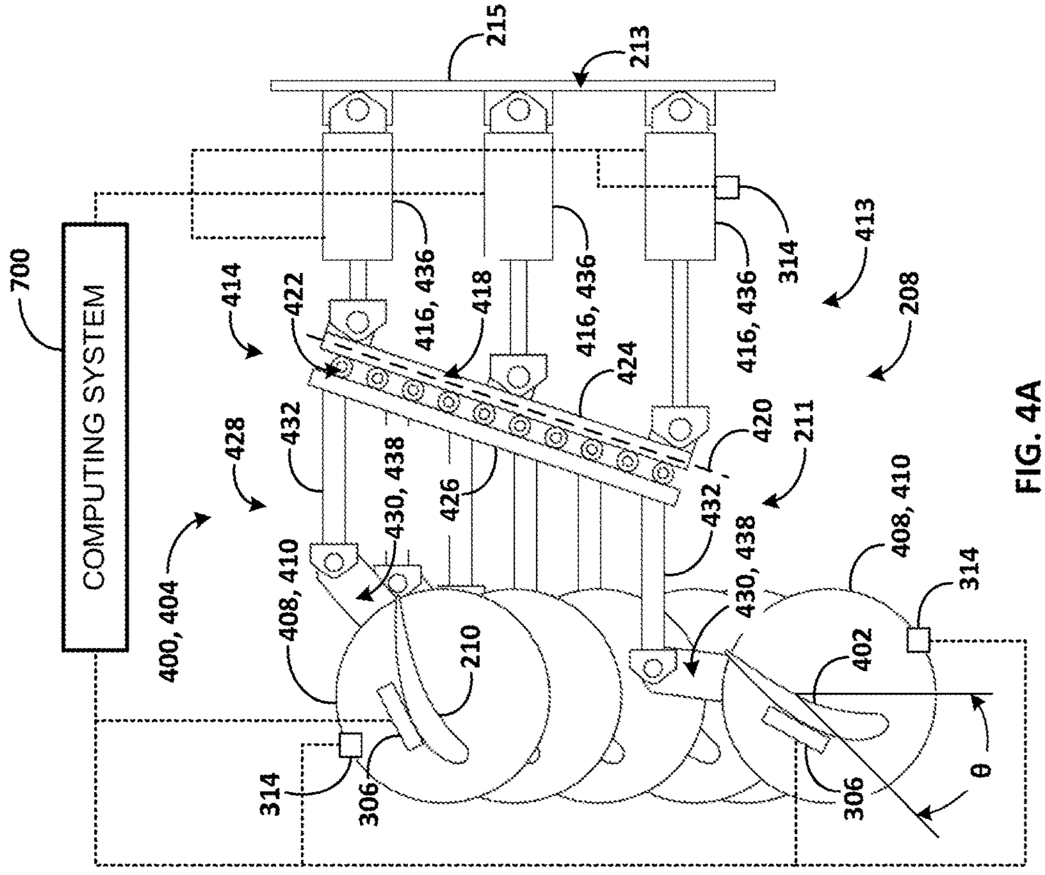
FIG. 4A schematically depicts aspects of a first exemplary pitch change assembly that may be utilized to change a pitch of one or more airfoils of an open rotor aeronautical engine.

As shown, for example, in FIGS. 4A and 4B, a pitch change assembly 400 may include an ensemble actuator assembly 414. An ensemble actuator assembly 414 may include one or more ensemble actuators 416 that collectively change a pitch angle of respective ones of the plurality of airfoils 402. The one or more ensemble actuators 416 may be communicatively coupled to the computing system 700. The one or more ensemble actuators 416 may collectively change a pitch angle of respective ones of the plurality of airfoils 402 responsive to control commands from the computing system 700. The control commands from the computing system 700 may cause the one or more ensemble actuators 416 to collectively change the pitch angle of respective ones of the plurality of airfoils 402 to augment and/or compensate for an excitation load, such as an asymmetric load. For example, the one or more ensemble actuators 416 may collectively change the pitch angle of respective ones of the plurality of airfoils 402 according to a control command from the computing system 700 configured at least in part to augment and/or to compensate for an asymmetric load, corresponding to a circumferential position of one or more of the fan blades 210 and/or one or more of the guide vanes 246.

In some embodiments, an ensemble actuator assembly 414 may include a unison ring 418 that translates motion of the one or more ensemble actuators 416, such as linear and/or rotary motion, collectively to respective ones of the plurality of airfoils 402. The one or more ensemble actuators 416 may be coupled directly or indirectly to the unison ring 418. Additionally, or in the alternative, the plurality of airfoils 402 may be coupled directly or indirectly to the unison ring 418. The unison ring 418 may be movable by the one or more ensemble actuators 416 in one or more degrees of freedom, so as to collectively change the pitch angle of respective ones of the plurality of airfoils 402. For example, the unison ring 418 may be movable with respect to one or more degrees of freedom, such as forward-and-aftward movement, up-and-down movement, left-and-right movement, pitch, roll, or yaw, as well as combinations of these. As shown, for example, in FIGS. 4A and 4B, and ensemble actuator assembly 414 may include a plurality of ensemble actuators 416, such as three ensemble actuators 416. It will be appreciated, however, that any number of ensemble actuators 416 may be provided, including for example, one, two, three, or more ensemble actuators 416.

The unison ring 418 may define a pitch plane 420, and movement of the one or more ensemble actuators 416 may translate an orientation of the pitch plane 420 with respect to one or more of such degrees of freedom. In some embodiments, as shown, for example, in FIGS. 4A a 4B, one or more ensemble actuators 416 may translate the unison ring 418, for example, with respect to pitch and/or yaw of the unison ring 418. Additionally, or in the alternative, one or more ensemble actuators 416 may translate or rotate the unison ring 418, with respect to a roll degree of freedom. Regardless of the particular degrees of freedom with respect to which the unison ring 418 may be movable, movement of the unison ring 418 may collectively change the pitch angle of respective ones of the plurality of airfoils 402.

In some embodiments, as shown in FIG. 4A, the fan assembly 208 may be rotatable with respect to the ensemble actuator assembly 414. For example, as shown, the unison ring 418 may include a fan bearing assembly 422. The unison ring may include an inward unison ring 424 and an outward unison ring 426, and the fan bearing assembly 422 may be disposed between the inward unison ring 424 and the outward unison ring 426. The fan bearing assembly 422 may allow the rotor portion 211 of the fan assembly 208 to rotate in relation to the stator portion 213 of the fan assembly 208. The outward unison ring 426 may rotate in relation to the inward unison ring 424 by way of the fan bearing assembly 422. The outward unison ring 426 may define part of the rotor portion 211 of the fan assembly 208. The inward unison ring 424 may define part of the stator portion 213 of the fan assembly 208. In some embodiments, the unison ring 418 may define a portion of the fan disk 212. For example, the outward unison ring 426 may define a portion of the fan disk 212. Additionally, or in the alternative, the outward portion of the unison ring 418 may be coupled to the fan disk 212.

As shown in FIG. 4A, for an ensemble actuator assembly 414 that changes a pitch angle of a plurality of fan blades 210, the ensemble actuator assembly 414 may be coupled directly or indirectly to the stator portion 213 of a fan assembly 208, such as to the fan case 215, for example, by the one or more ensemble actuators 416. The fan blade-pitch change assembly 404 may include a pitch angle indicator 314 that determines a pitch angle of the plurality of fan blades 210 associated with the ensemble actuator assembly 414, such as a pitch angle corresponding to a change to the pitch angle of the plurality of fan blades 210 imparted by the ensemble actuator assembly 414. As shown in FIG. 4B, for an ensemble actuator assembly 414 that changes a pitch angle of a plurality of guide vanes 246, the ensemble actuator assembly 414 may be coupled directly or indirectly to the core engine 206, such as to the engine case 216, for example, by the one or more ensemble actuators 416. The guide vane-pitch change assembly 406 may include a pitch angle indicator 314 that determines a pitch angle of the plurality of fan blades 210 associated with the ensemble actuator assembly 414, such as a pitch angle corresponding to a change to the pitch angle of the plurality of guide vanes 246 imparted by the ensemble actuator assembly 414.

Still referring to FIGS. 4A and 4B, in some embodiments, a pitch change assembly 400 may include one or more unitary actuator assemblies 428. A unitary actuator assembly 428 may include a plurality of unitary actuators 430. Respective ones of the plurality of unitary actuators 430 may respectively change a pitch angle of a corresponding airfoil 402. The plurality of unitary actuators 430 may be communicatively coupled to the computing system 700. The plurality of unitary actuators 430 may respectively change a pitch angle of a corresponding airfoil 402 responsive to control commands from the computing system 700. The control commands from the computing system 700 may cause a respective unitary actuator 430 to change the pitch angle of a corresponding airfoil 402 to augment and/or compensate for an excitation load, such as an asymmetric load, corresponding to a circumferential position of one or more of the fan blades 210 and/or one or more of the guide vanes 246. The unitary actuator assembly 428 may include one or more pitch angle indicators 314 that determine a pitch angle of a corresponding airfoil 402 associated with a respective unitary actuator 430, such as a pitch angle corresponding to a change to the pitch angle of the airfoil 402 imparted by the unitary actuator assembly 428.

A unitary actuator 430 may be directly or indirectly coupled to a corresponding airfoil 402 or airfoil retention mechanism 408. Additionally, or in the alternative, a unitary actuator 430 may be directly or indirectly coupled to a unison ring 418, such as to an outward unison ring 426. For example, a first end of a unitary actuator 430 may be coupled to an airfoil 402 or airfoil retention mechanism 408, and a second end of the unitary actuator 430 may be coupled to the unison ring 418. In some embodiments, as shown in FIG. 4A, a unitary actuator assembly 428 may include a plurality of linkage arms 432 respectively disposed between the unison ring 418, such as the outward unison ring 426, and a corresponding unitary actuator 430. For example, a first end of a unitary actuator 430 may be coupled to an airfoil 402 or airfoil retention mechanism 408, and a second end of the unitary actuator 430 may be coupled to a corresponding linkage arm 432. A first end of such linkage arm 432 may be coupled to the second end of the unitary actuator 430, and a second end of such linkage arm 432 may be coupled to the unison ring 418. Additionally, or in the alternative, a unitary actuator assembly 428 may include a plurality of linkage arms 432 respectively disposed between a corresponding unitary actuator 430 and a corresponding airfoil 402 or airfoil retention mechanism 408. For example, a first end of the linkage arm 432 may be coupled to an airfoil 402 or airfoil retention mechanism 408, and a second end of the linkage arm 432 may be coupled to the first end of the unitary actuator 430.

Figure 4C:
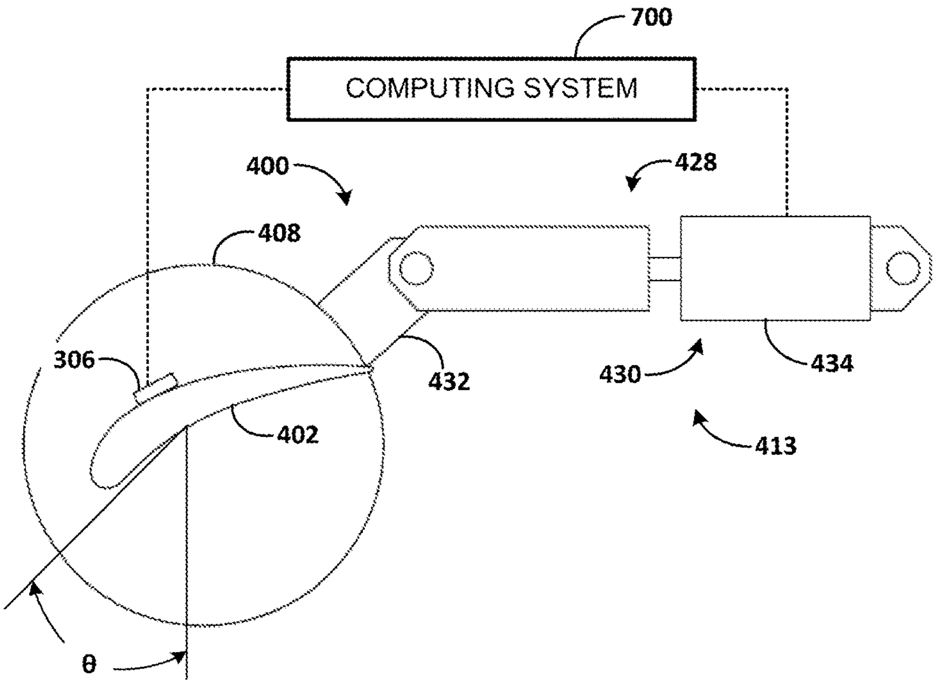
FIG. 4C schematically depicts aspects of a third exemplary pitch change assembly that may be utilized to change a pitch of one or more airfoils of an open rotor aeronautical engine.
Figure 4D:
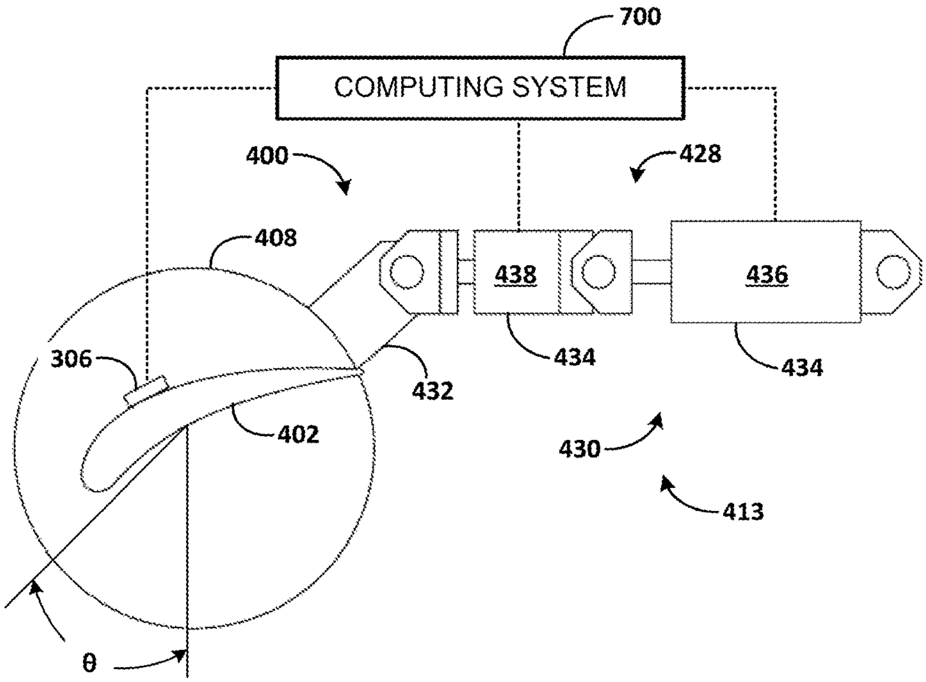
FIG. 4D schematically depicts aspects of a fourth exemplary pitch change assembly that may be utilized to change a pitch of one or more airfoils of an open rotor aeronautical engine.

Now referring to FIGS. 4C and 4D, exemplary unitary actuator assemblies 428 are further described. A unitary actuator assembly 428 may include a plurality of unitary actuators 430. FIGS. 4C and 4D respectively show an exemplary unitary actuator 430. A unitary actuator 430 may include one or more actuator mechanisms 434. For example, FIG. 4C shows a unitary actuator 430 that has one actuator mechanism 434. As another example, FIG. 4D shows a unitary actuator that has a plurality of actuator mechanisms 434, such as a first actuator mechanism 436 and a second actuator mechanism 438. In some embodiments, a pitch change assembly 400 may include a unitary actuator assembly 428 with a plurality of unitary actuators 430 configured as shown in FIGS. 4C and/or 4D. For example, the pitch change assembly 400 shown in FIG. 4A and/or the pitch change assembly 400 shown in FIG. 4B may include a plurality of unitary actuators 430 configured as shown in FIGS. 4C and/or 4D. Additionally, or in the alternative, a pitch change assembly 400 may include unitary actuator assembly 428 with a plurality of unitary actuators 430 configured as shown in FIGS. 4C and/or 4D, for example, without requiring an ensemble actuator assembly 414.

In some embodiments, the pitch change assembly 400 may include a unitary actuator assembly 428 with a plurality of unitary actuators 430 configured as shown in FIG. 4D, for example, with respective ones of the plurality of unitary actuators 430 corresponding to respective ones of the plurality of airfoils 402. The plurality of unitary actuators 430 may respectively change a pitch angle of a corresponding airfoil 402 responsive to control commands from the computing system 700. In some embodiments, the control commands from the computing system 700 may cause the plurality of unitary actuators 430 to collectively change the pitch angle of respective ones of the plurality of airfoils 402. For example, the control commands may cause a plurality of course actuator mechanisms 434 (e.g., a plurality of first actuator mechanisms 436) corresponding to respective ones of the plurality of unitary actuators 430 to collectively change the pitch angle of respective ones of the plurality of airfoils 402. For example, the plurality of course actuator mechanisms 434 may adjust the pitch angle according to a course range of motion, such as up to a full range of motion, of the corresponding airfoil 402 with respect to the pitch axis thereof (e.g., the fan pitch axis 214 or the guide vane axis 248, as applicable). Additionally, or in the alternative, the control commands may cause one or more of the plurality of fine actuator mechanisms 434 (e.g., one or more of the second actuator mechanisms 438) corresponding to a respective unitary actuator 430 to change the pitch angle of a corresponding airfoil 402. For example, the plurality of fine actuator mechanisms 434 may adjust the pitch angle according to a fine range of motion, such as within a partial range of motion, of the corresponding airfoil 402 with respect to the pitch axis thereof (e.g., the fan pitch axis 214 or the guide vane axis 248, as applicable).

Referring, by way of example, to FIGS. 4A, 4B, and 4D, in some embodiments, a first actuator mechanism 436 may provide course adjustments to the pitch angle of a corresponding airfoil 402. Additionally, or in the alternative, a second actuator mechanism 438 may provide fine adjustments to the pitch angle of the corresponding airfoil 402. An actuator mechanism 434 that provides course adjustments to the pitch angle of a corresponding airfoil 402 may sometimes be referred to as a course actuator mechanism 434. An actuator mechanism 434 that provides fine adjustments to the pitch angle of a corresponding airfoil 402 may sometimes be referred to as a fine actuator mechanism 434.

By way of example, a course actuator mechanism 434 (e.g., the first actuator mechanism 436 shown in FIG. 4D) may have a stroke length corresponding to a coarse range of motion, such as a full range of motion, of the airfoil 402 with respect to the corresponding pitch axis (e.g., the fan pitch axis 214 or the guide vane axis 248, as applicable). Additionally, or in the alternative, a course actuator mechanism 434 may have a stroke length corresponding to from about 10% to about 100% of the range of motion of the airfoil 402 with respect to such pitch axis, such as from about 10% to about 100%, such as from about 25% to about 100%, or such as from about 60% to about 100%.

By way of further example, a fine actuator mechanism 434 (e.g., the second actuator mechanism 438 shown in FIG. 4D) may have a stroke length corresponding to a fine range of motion, such as a partial range of motion of the airfoil 402 with respect to the corresponding pitch axis (e.g., the fan pitch axis 214 or the guide vane axis 248, as applicable). For example, a fine actuator mechanism 434 may have a stroke length corresponding to from about 1% to about 40% of the range of motion of the airfoil 402 with respect to such pitch axis, such as from about 1% to about 10%, such as from about 1% to about 25%, or such as from about 25% to about 40%. In some embodiments, the stroke length of a course actuator mechanism 434 and the stroke length of a fine actuator mechanism 434 may collectively correspond to a full range of motion of the airfoil 402 with respect to the corresponding pitch axis.

Figure 4F:
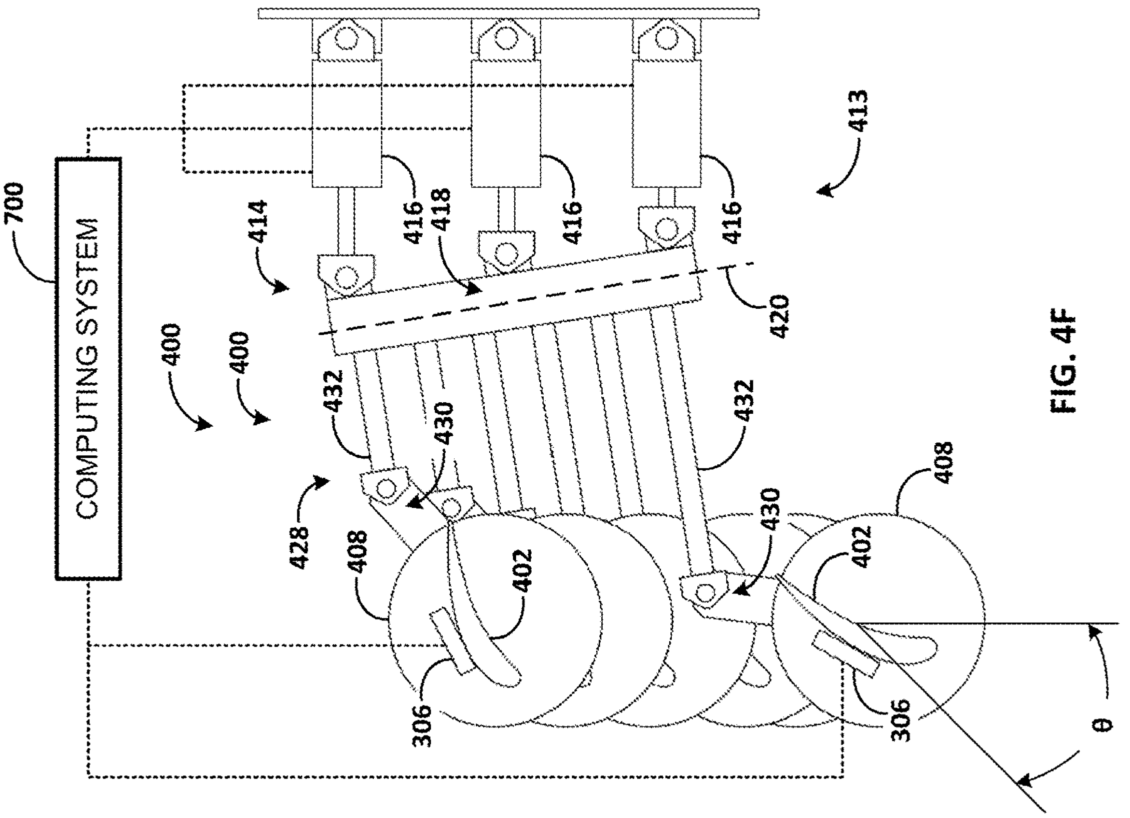
FIG. 4F schematically depicts aspects of a sixth exemplary pitch change assembly that may be utilized to change a pitch of one or more airfoils of an open rotor aeronautical engine.
Figure 4E:
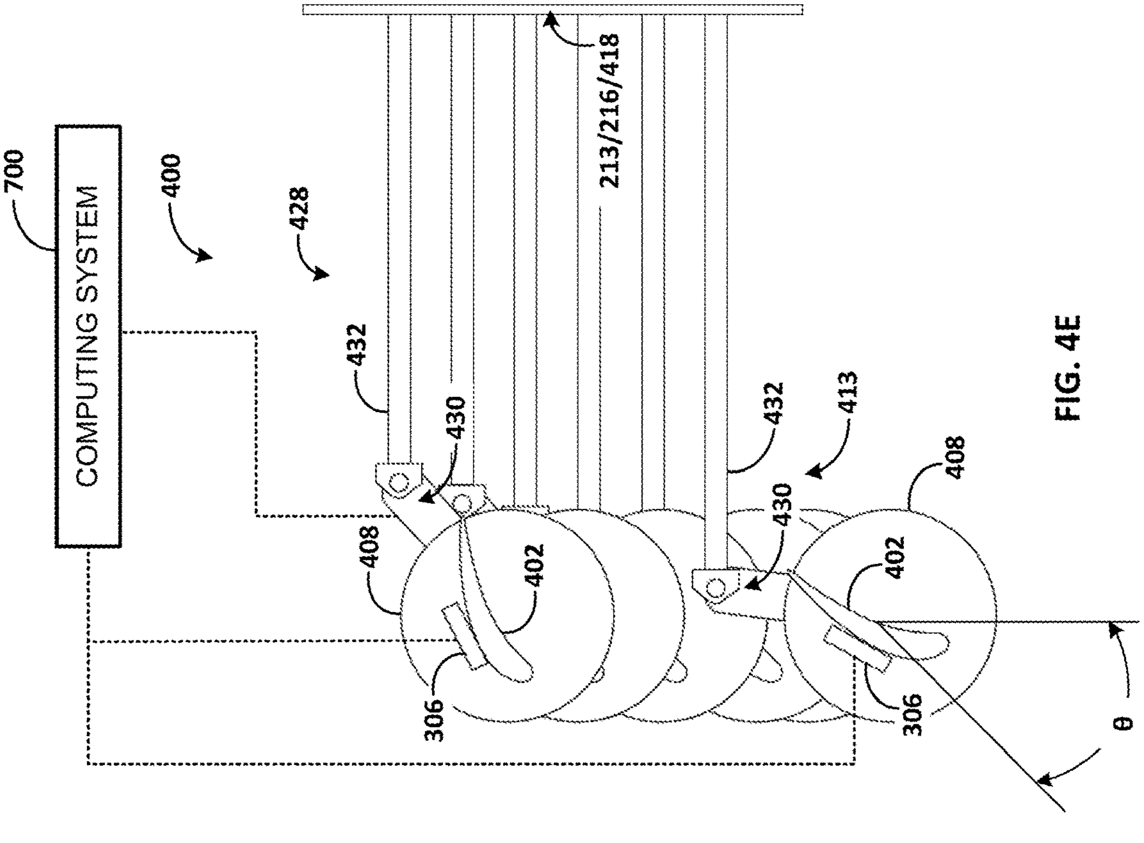
FIG. 4E schematically depicts aspects of a fifth exemplary pitch change assembly that may be utilized to change a pitch of one or more airfoils of an open rotor aeronautical engine.

Referring now to FIGS. 4E and 4F, a pitch change assembly 400 may include one or more actuators 413 configured to change a pitch angle of respective ones of the plurality of airfoils 402, and a plurality of linkage arms 432 that are respectively movable by actuation of at least one of the one or more actuators 413. Respective ones of the plurality of linkage arms 432 may be directly or indirectly coupled to a corresponding one of the plurality of airfoils 402. Respective ones of the plurality of linkage arms 432 may have a length that differs from at least another one of the plurality of linkage arms 432 respectively corresponding to another one of the plurality of airfoils 402. The respective length of the respective ones of the plurality of linkage arms 432 may be selected at least in part to orient a displacement or a range of motion of the corresponding linkage arm 432 to a desired envelope of rotation of the corresponding airfoil 402 about the pitch axis of the airfoil 402 (e.g., the fan pitch axis 214 or the guide vane axis 248, as applicable). The desired envelope of rotation of the corresponding airfoil 402 may differs from the envelope of rotation of at least another one of the plurality of airfoils 402. The desired envelope of rotation may include a pitch angle range, a maximum pitch angle, and/or a desired minimum pitch angle. Additionally, or in the alternative, the desired envelope of rotation may include a rate of rotation about the pitch axis of the airfoil 402 as a function of a displacement of the respective linkage arm 432 and/or as a function of a displacement of a corresponding one or more actuators 413 directly or indirectly coupled to the respective linkage arm 432. In some embodiments, the length of the corresponding linkage arm 432 may provide a respectively different envelope of rotation, for example, while maintaining a common pitch angle range as between at least some of the plurality of airfoils 402. Additionally, or in the alternative, the length of the corresponding linkage arm 432 may provide a respectively different pitch angle range as between at least some of the plurality of airfoils 402.

In some embodiments, the plurality of airfoils 402 shown in FIGS. 4E and 4F may include fan blades 210. In some embodiments, the plurality of airfoils 402 shown in FIGS. 4E and 4F may include guide vanes 246. In some embodiments, a plurality of airfoils 402 may have a uniform pitch angle as between respective ones of the plurality of airfoils 402 at a first position of the one or more actuators 413, and a non-uniform pitch angle as between respective ones of the plurality of airfoils 402 at a second position of the one or more actuators 413. Additionally, or in the alternative, a plurality of airfoils 402 may have a first non-uniform pitch angle as between respective ones of the plurality of airfoils 402 at a first position of the one or more actuators 413, and a second non-uniform pitch angle as between respective ones of the plurality of airfoils 402 at a second position of the one or more actuators 413.

In some embodiments, one or more unitary actuators 430 may provide a respectively different envelope of rotation for respective ones of a plurality of airfoils 402, depending, for example, on the length of the linkage arm 432 coupled directly or indirectly to a corresponding airfoil 402. For example, the respectively different envelope of rotation of the plurality of airfoils 402 may be realized by a corresponding plurality of unitary actuators 430 that have a common stroke length. Additionally, or in the alternative, in some embodiments, one or more ensemble actuators 416 may provide a respectively different envelope of rotation for respective ones of a plurality of airfoils 402, depending, for example, on the length of the linkage arm 432 coupled directly or indirectly to a corresponding airfoil 402. In some embodiments, a pitch change assembly 400 may include a unitary actuator assembly 428 that has a plurality of linkage arms 432 of differing lengths relative to one another. At least some of the plurality of linkage arms 432 may have a length that differs from at least another one of the plurality of linkage arms 432. The one or more actuators 413 may respectively include a unitary actuator 430 directly or indirectly coupled to a corresponding one of the plurality of airfoils 402.

In some embodiments, the one or more actuators 413 may be actuated responsive to an excitation load acting upon the open rotor engine 200. The excitation load may include an asymmetric load corresponding to one or more circumferential positions of respective ones of the plurality of airfoils 402, and the envelope of rotation of the corresponding ones of the plurality of airfoils 402 may be selected at least in part to offset the asymmetric load at least partially. Additionally, or in the alternative, in some embodiments, the one or more actuators 413 may be actuated to a first position during a cruise flight condition. The first position may correspond to an excitation load, such as an asymmetric load, that may exist during at least some cruise flight conditions. Additionally, or in the alternative, the one or more actuators 413 may be actuated to a second position during at least one of: a climbing flight condition, a descending flight condition, and a takeoff flight condition. The second position may correspond to an excitation load, such as an asymmetric load, that may exist during at least some climbing, descending, and/or takeoff flight conditions. The envelope of rotation of the corresponding ones of the plurality of airfoils 402 may be selected at least in part to allow the one or more actuators 413 to be actuated to the first position during the cruise flight condition and/or to the second position during the climbing flight condition, the descending flight condition, and/or the takeoff flight condition.

In some embodiments, the pitch change assembly 400 may include an ensemble actuator assembly 414, a unitary actuator assembly 428, and a plurality of linkage arms 432 of differing lengths relative to one another. The plurality of linkage arms 432 of differing lengths may be respectively coupled to a corresponding one of the plurality of unitary actuators 430. In some embodiments, a pitch change assembly 400 may include an ensemble actuator assembly 414 and a plurality of linkage arms 432 of different lengths relative to one another coupled to corresponding ones of the plurality of airfoils 402 and/or to a corresponding airfoil retention mechanism 408. For example, a pitch change assembly 400 may include a plurality of linkage arms 432 of different lengths relative to one another, instead of, or without having, a unitary actuator assembly 428. The ensemble actuator assembly may include a unison ring 418 and the plurality of linkage arms 432 may extend between the unison ring 418 and the corresponding one of the plurality of airfoils 402.

In some embodiments, a plurality of linkage arms 432 respectively corresponding to inversely disposed airfoils 402 may have respective length that differs from one another. For example, a first linkage arm 432 corresponding to a first airfoil 402 at a circumferential position that has a horizontally leftward orientation (e.g., at a nine o'clock position) may have a first length that differs from a second length of a second linkage arm 432 corresponding to a second airfoil 402 at a circumferential position that has a horizontally rightward orientation (e.g., at a three o'clock position). In some embodiments, a pitch change assembly 400 that has such a plurality of linkage arms 432 of respectively differing lengths may be otherwise configured according to any one or more of the embodiments of a pitch change assembly described herein, including those described with reference to FIGS. 4A-4D, 4G and 4H. Additionally, or in the alternative, in some embodiments, inversely disposed guide vanes 246 may have respectively different geometry configured, for example to at least partially offset or compensate for an asymmetric load. Such respectively different geometry may include respectively different shapes, sizes, contours, chord lengths, camber lines, pitch angles (e.g., fixed or nominal pitch angles), and the like. For example, a first guide vane 246 that has a horizontally leftward orientation (e.g., a nine o'clock position) and a second guide vane 246 that has a horizontally rightward orientation (e.g., a three o'clock position) may have respectively different geometry configured to at least partially offset or compensate for an asymmetric load.

Figure 4G:
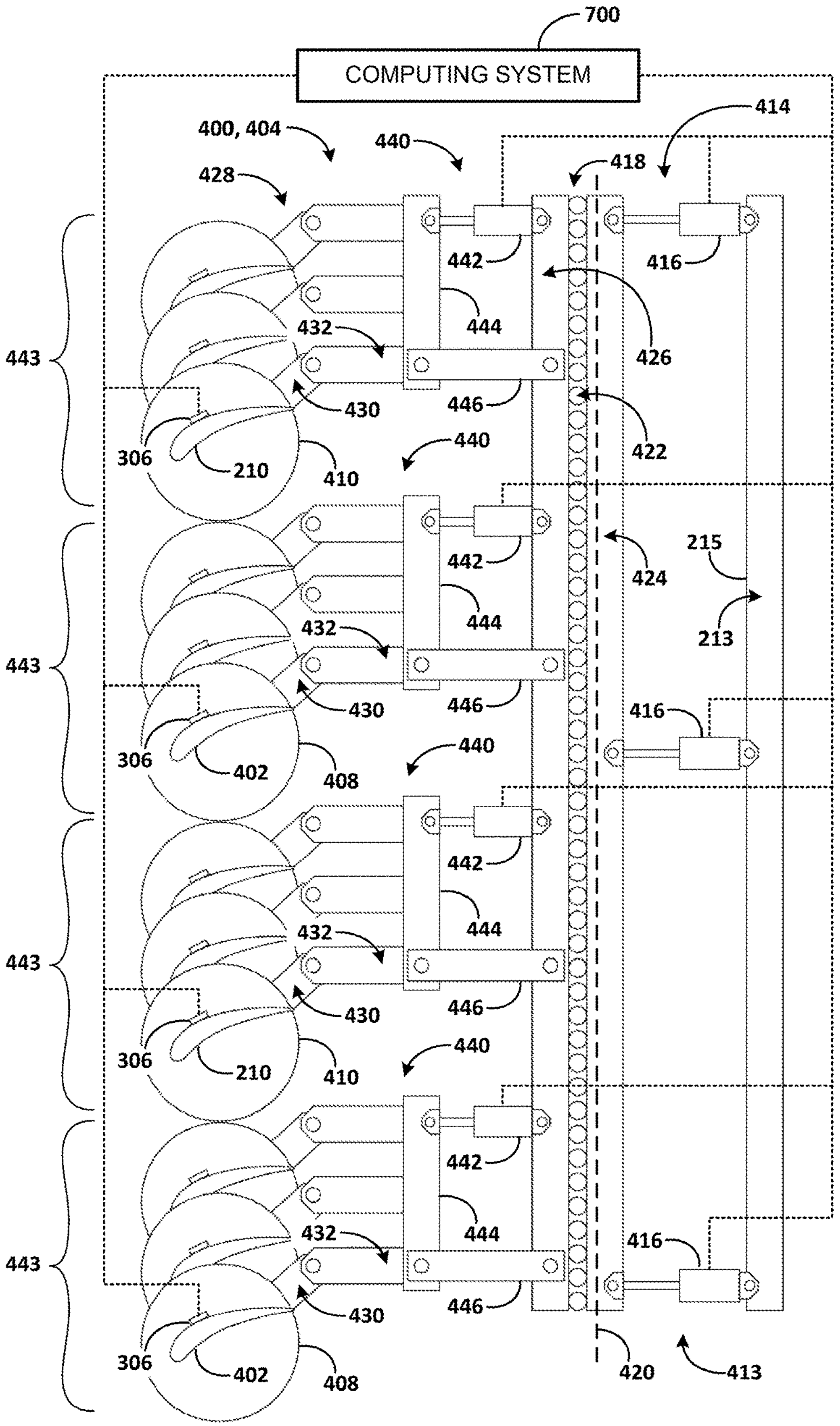
FIG. 4G schematically depicts aspects of a seventh exemplary pitch change assembly that may be utilized to change a pitch of one or more airfoils of an open rotor aeronautical engine.
Figure 4H:
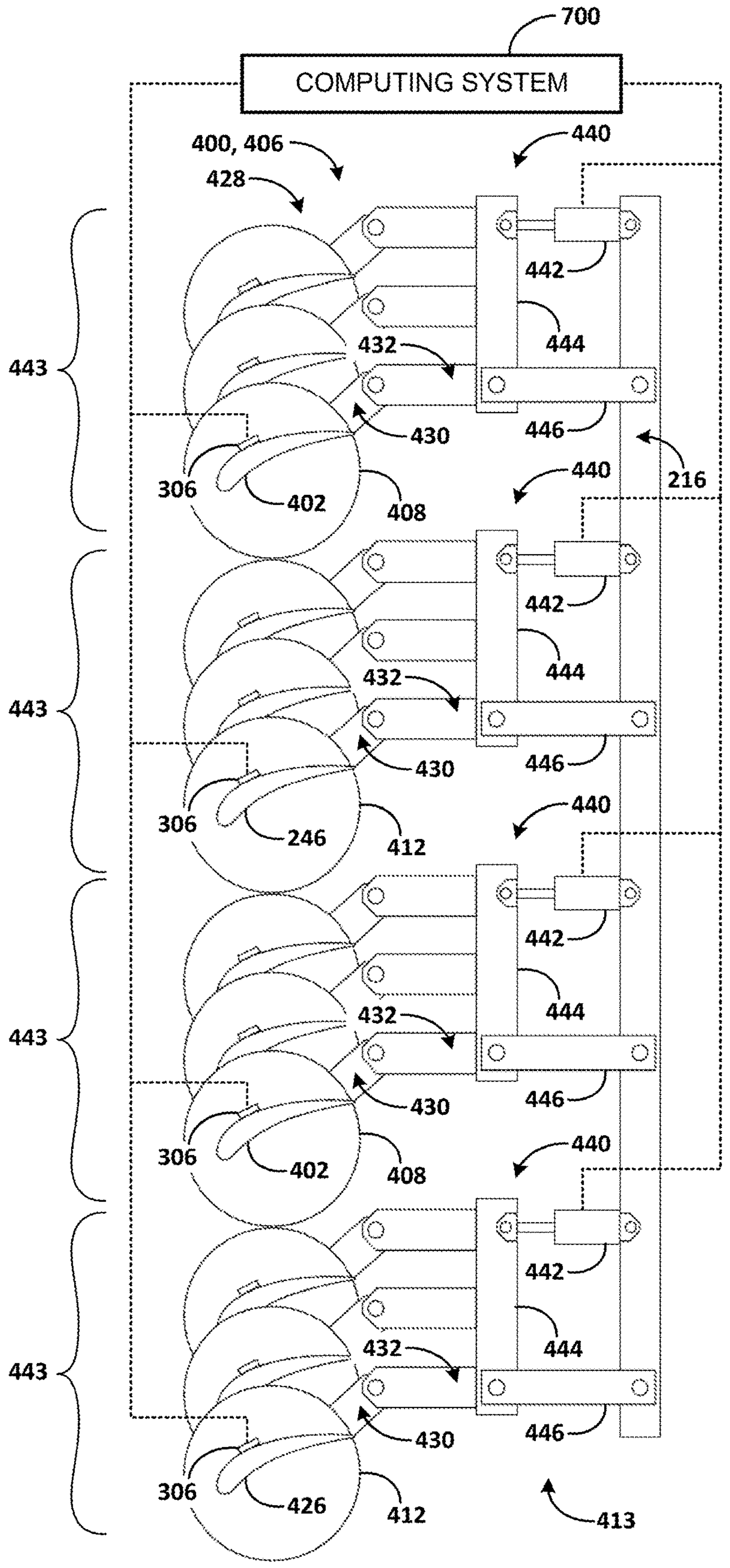
FIG. 4H schematically depicts aspects of a eighth exemplary pitch change assembly that may be utilized to change a pitch of one or more airfoils of an open rotor aeronautical engine.

Referring now to FIGS. 4G and 4H, exemplary pitch change assemblies 400 are further described. As shown in FIGS. 4G and 4H, a pitch change assembly 400 may include a plurality of subgroup actuator assemblies 440. Respective ones of the plurality of subgroup actuator assemblies 440 may include a subgroup actuator 442 that changes a pitch angle of a plurality of airfoils 402 corresponding to an airfoil subgroup 443. The respective pitch angles of the airfoils 402 in the airfoil subgroup 443 may be changed collectively, or as a group, by actuating the subgroup actuator 442. A pitch change assembly 400 that includes a plurality of subgroup actuator assemblies 440 may be otherwise configured according to any one or more of the embodiments of a pitch change assembly described herein, including those described with reference to FIGS. 4A-4F.

The subgroup actuator 442 corresponding to a respective subgroup actuator assembly 440 may change the respective pitch angles of the airfoils 402 and the corresponding subgroup responsive to control commands from the computing system 700. The control commands from the computing system 700 may cause the one or more subgroup actuators 442 to change such pitch angles to augment and/or compensate for an excitation load acting upon the open rotor engine 200, such as an asymmetric load corresponding to a circumferential position of one or more of the fan blades 210 and/or one or more of the guide vanes 246.

A subgroup actuator 442 may be directly or indirectly coupled to a plurality of airfoils 402 or corresponding airfoil retention mechanisms 408. The plurality of airfoils 402 actable by a subgroup actuator 442 coupled directly or indirectly thereto may define an airfoil subgroup 443. In some embodiments, a subgroup actuator assembly 440 may include a subgroup coupling arm 444 disposed between the subgroup actuator 442 and the plurality of airfoils 402 in the respective airfoil subgroup 443. A subgroup coupling arm 444 may be configured at least in part to directly or indirectly couple the airfoils 402 in the respective airfoil subgroup 443 to a corresponding subgroup actuator 442. For example, the subgroup actuator 442 may be coupled to the subgroup coupling arm 444, and the subgroup coupling arm may be coupled directly or indirectly to the airfoils 402 in the respective airfoil subgroup 443. Additionally, or in the alternative, the subgroup actuator 442, and/or the subgroup coupling arm 444, may be coupled to a plurality of unitary actuators 430 corresponding to respective ones of the plurality of airfoils 402 in the subgroup. For example, a first end of respective ones of the plurality of unitary actuators 430 may be respectively coupled to a corresponding airfoil 402 or airfoil retention mechanism 408, and a second end of the respective ones of the plurality of unitary actuators 430 may be coupled to the corresponding subgroup coupling arm 444. In some embodiments, as shown, a plurality of linkage arms 432 may be respectively disposed between the subgroup coupling arm 444 and the corresponding unitary actuators 430. For example, a first end of such linkage arms 432 may be respectively coupled to a corresponding unitary actuator 430, and a second end of such linkage arms 432 may be coupled to the subgroup coupling arm 444.

In some embodiments, such as shown in FIG. 4G, respective ones of the plurality of subgroup actuators 442 may be directly or indirectly coupled to a unison ring 418, such as to an outward unison ring 426. For example, a first end of a subgroup actuator 442 may be coupled to a corresponding subgroup coupling arm 444, and a second end of the subgroup actuator 442 may be coupled to the unison ring 418. In some embodiments, such as depicted in FIG. 4H, for a plurality of subgroup actuator assemblies 440 that change a pitch angle of a plurality of guide vanes 246 corresponding to the respective subgroup, the plurality of subgroup actuators 442 may be directly or indirectly coupled to the core engine 206, such as to the engine case 216.

Still referring to FIGS. 4G and 4H, in some embodiments, a subgroup actuator assembly 440 may include a subgroup linkage arm 446. As shown in FIG. 4G, the subgroup linkage arm 446 may be disposed between the subgroup coupling arm 444 and the unison ring 418. For example, a first end of the subgroup linkage arm 446 may be coupled to the subgroup coupling arm 444, and a second end of the subgroup linkage on 446 may be coupled to the unison ring 418, such as to an outward unison ring 426. As shown in FIG. 4H, the subgroup linkage arm 446 may be disposed between the subgroup coupling arm 444 and the core engine 206. For example, a first end of the subgroup linkage arm 446 may be coupled to the subgroup coupling arm 444, and a second end of the subgroup linkage on 446 may be coupled to the core engine 206, such as the engine case 216.

It will be appreciated that the pitch change assemblies shown in FIGS. 4A-4H schematically depict exemplary embodiments by way of example and are not to be limiting. In fact, various aspects of the present disclosure may be practiced with other suitable pitch change assemblies. For example, in some embodiments, a pitch change assembly may include a swashplate mechanism. A swashplate mechanism may control cyclic rotation of a fan assembly 208 and/or pitch angles of the plurality of fan blades 210.

Figure 5A:
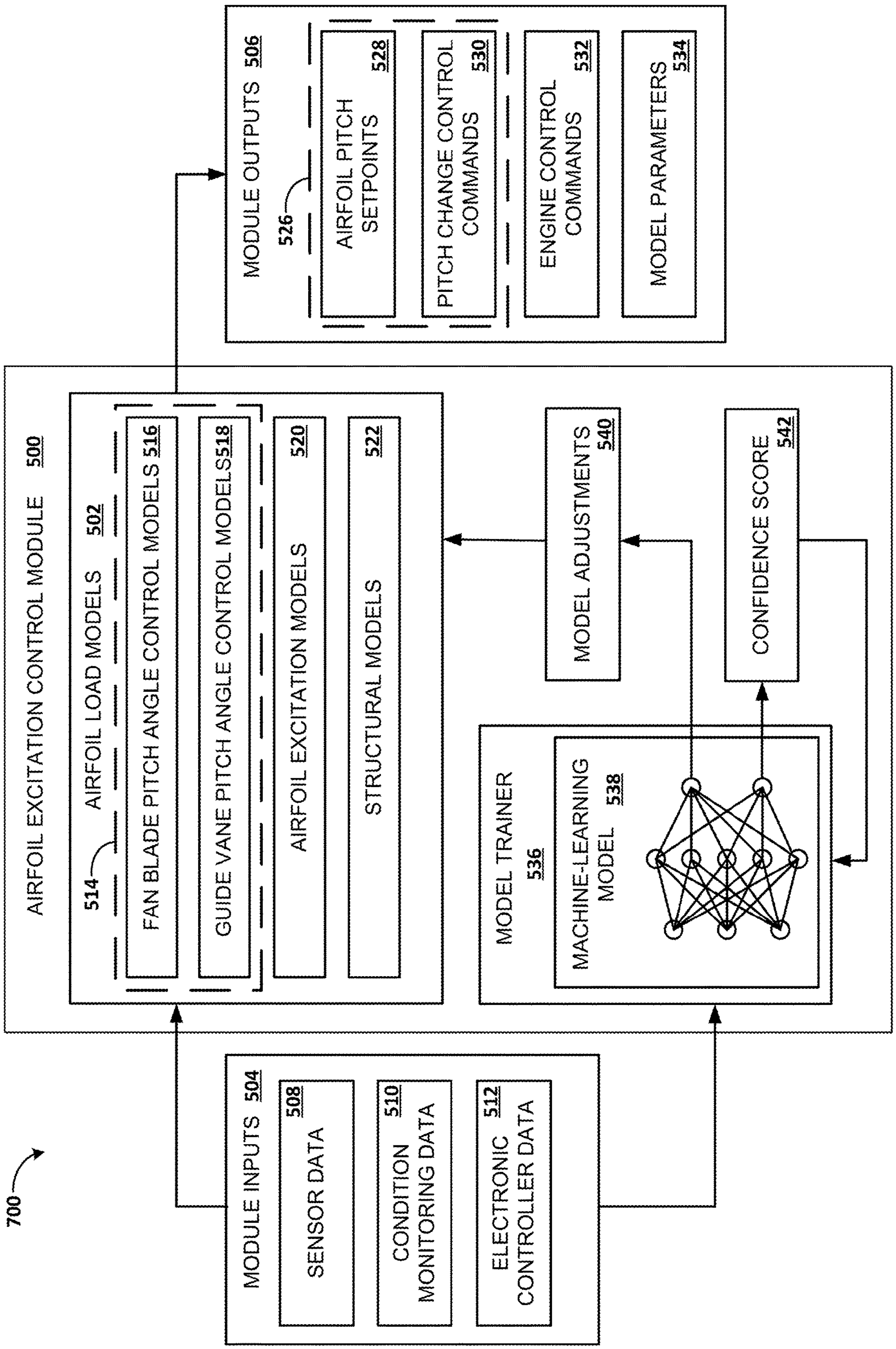
FIG. 5A schematically depicts aspects of a first exemplary airfoil excitation control module.
Figure 5B:
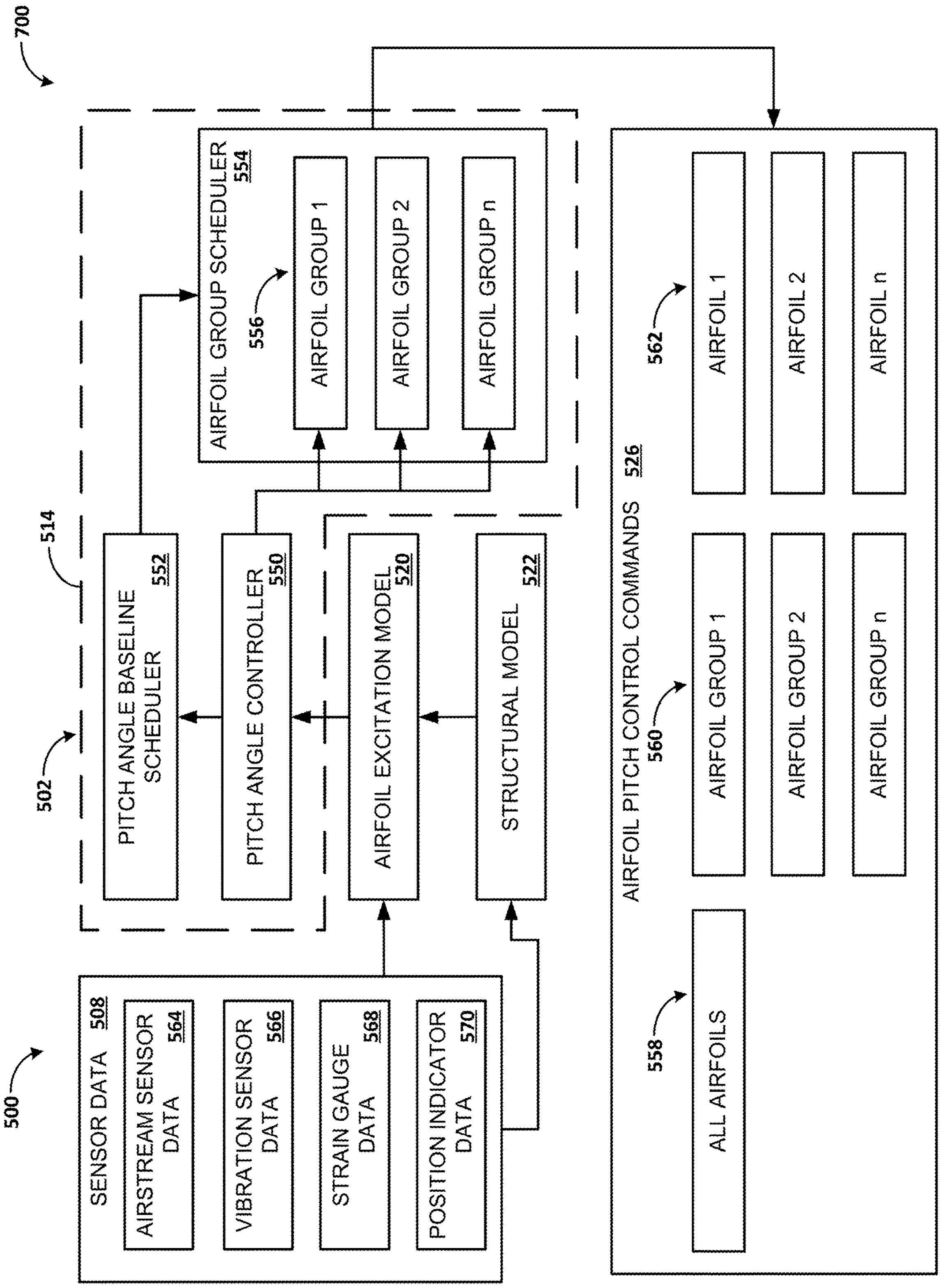
FIG. 5B schematically depicts aspects of a second exemplary airfoil excitation control module.

Referring now to FIGS. 5A and 5B, exemplary airfoil excitation control modules 500 will be described. As shown in FIGS. 5A and 5B, an airfoil excitation control module 500 may include one or more airfoil load models 502. The airfoil excitation control module 500 may receive one or more module inputs 504. The one or more module inputs 504 may be utilized by the one or more airfoil load models 502 to provide one or more module outputs 506. An airfoil excitation control module 500 may determine an excitation load acting upon one or more airfoils 402, such as one or more fan blades 210 and/or one or more of the guide vanes 246. Additionally, or in the alternative, an airfoil excitation control module 500 may determine an excitation load acting upon one or more other portions of the open rotor engine 200, such as upon one or more bearing assemblies 304 and/or upon an engine support structure 308. The excitation load may include an asymmetric load.

The airfoil excitation control module 500 may determine an excitation load based at least in part on the one or more module inputs 504. For example, one more module inputs 504 may be utilized by the one or more airfoil load models 502 to determine the excitation load acting upon the one or more airfoils 402. The airfoil excitation control module 500 may provide module outputs 506, for example, based at least in part on an excitation load determined by the one or more airfoil load models 502. The module outputs 506 may include control commands to one or more controllable components, such as control commands configured to change a pitch angle of one or more airfoils 402, such as a pitch angle of one or more fan blades 210 and/or a pitch angle of one or more guide vanes 246. Such control commands may augment and/or compensate for an excitation load acting upon the open rotor engine 200, such as upon one or more airfoils 402 (e.g., upon the one or more of the fan blades 210 and/or upon one or more of the guide vanes 246). Additionally, or in the alternative, such control commands may augment and/or compensate for an excitation load acting upon other portions of the open rotor engine 200, such as upon one or more bearing assemblies 304 and/or upon an engine support structure 308.

Exemplary module inputs 504 that may be utilized by the one or more airfoil load models 502 include sensor data 508 generated or otherwise provided by one or more sensors 110 associated with the aircraft 100 and/or the one or more open rotor engines 200, condition monitoring data 510 generated or otherwise provided by the condition monitoring system 300, and/or electronic controller data 512 generated or otherwise provided by one or more electronic controllers 108 associated with the aircraft 100 and/or the one or more open rotor engines 200, such as an electronic engine controller, a full-authority digital engine control (FADEC) device, or the like. The sensor data 508 may be generated or otherwise provided by one or more sensors 110, such as one or more aerodynamic incidence sensors 112, one or more vibration sensors 302, one or more strain gauges 306, one or more position indicators 312, and/or one or more pitch angle indicators 314. The condition monitoring data 510 may include vibration-based condition monitoring data associated with one or more of the open rotor engines 200. The condition monitoring data and/or the vibration-based condition monitoring data may include or may be determined based at least in part on sensor data 508, such as data from one or more sensors 110, such as one or more aerodynamic incidence sensors 112, one or more vibration sensors 302, one or more strain gauges 306, one or more position indicators 312, and/or one or more pitch angle indicators 314. The electronic controller data 512 may include data associated with one or more operating conditions of the aircraft 100 and/or the one or more open rotor engines 200. The electronic controller data 512 may include or may be determined based at least in part on sensor data 508, such as data from one or more sensors 110, such as one or more aerodynamic incidence sensors 112, one or more vibration sensors 302, one or more strain gauges 306, one or more position indicators 312, and/or one or more pitch angle indicators 314. The sensor data 508, the condition monitoring data 510, and/or the electronic controller data 512 may correspond to a current or previous operating period of the aircraft 100 and/or the one or more open rotor engines 200, such as a current flight or a portion thereof, and/or one or more previous flights and/or a portion thereof.

In some embodiments, the one or more airfoil load models 502 may include one or more airfoil pitch angle control models 514. An airfoil pitch angle control models 514 may include one or more models, controllers, algorithms, lookup tables, or the like, configured to determine an excitation load acting upon one or more airfoils 402, for example, based at least in part on the one or more module inputs 504. Additionally, or in the alternative, an airfoil pitch angle control model 514 may include one or more models, controllers, algorithms, lookup tables, or the like, configured to determine an excitation load translated from one or more airfoils 402 to one or more other portions of the open rotor engine 200, such as to one or more bearing assemblies 304 and/or to an engine support structure 308. Additionally, or in the alternative, an airfoil pitch angle control model 514 may include one or more models, controllers, algorithms, lookup tables, or the like, configured to determine one or more module outputs 506, for example, based at least in part on an excitation load determined by an airfoil pitch angle control model 514. One or more module outputs 506 determined by an airfoil pitch angle control model 514 may include control commands configured to augment and/or compensate for an excitation load.

In some embodiments, the one or more airfoil pitch angle control models 514 may include one or more fan blade pitch angle control models 516. A fan blade pitch angle control model 516 may include one or more models, controllers, algorithms, lookup tables, or the like, configured to determine an excitation load acting upon one or more of the fan blades 210, for example, based at least in part on the one or more module inputs 504. Additionally, or in the alternative, the fan blade pitch angle control model 516 may determine one or more module outputs 506, for example, based at least in part on an excitation load acting upon the one or more fan blades 210. One or more module outputs determined by the fan blade pitch angle control model 516 may include control commands configured to augment and/or compensate for an excitation load acting upon one or more of the fan blades 210. For example, as will be discussed in more detail below, in response to an excitation load in excess of a predetermined threshold on eth fan blades 210, the outlet guide vanes 246, or both, the fan blade pitch angle control model 516 may provide airfoil pitch setpoints 528, pitch change control commands 530, or both to relieve the excitation loads.

In some embodiments, the one or more airfoil pitch angle control models 514 may include one or more guide vane pitch angle control models 518. A guide vane pitch angle control model 518 may include one or more models, controllers, algorithms, lookup tables, or the like, configured to determine an excitation load acting upon one or more of the guide vanes 246, for example, based at least in part on the one or more module inputs 504. Additionally, or in the alternative, the guide vane pitch angle control model 518 may determine one or more module outputs 506, for example, based at least in part on an excitation load acting upon the one or more guide vanes 246. One or more module outputs determined by the guide vane pitch angle control model 518 may include control commands configured to augment and/or compensate for an excitation load acting upon one or more of the guide vanes 246.

In some embodiments, the one or more airfoil load models 502 may include one or more airfoil excitation models 520. An airfoil excitation model 520 may include one or more models, controllers, algorithms, lookup tables, or the like, configured to determine one or more airfoil excitation phenomenon, and/or an excitation load corresponding to such airfoil excitation phenomenon. In some embodiments, an airfoil excitation model 520 may determine one or more airfoil excitation phenomenon, and/or an excitation load corresponding to such airfoil excitation phenomenon, based at least in part on sensor data generated by one or more aerodynamic incidence sensors 112, such as one or more angle of attack sensors 114 and/or one or more angle of sideslip sensors 116. Additionally, or in the alternative, an airfoil excitation phenomenon and/or a corresponding excitation load may be determined based at least in part on sensor data generated by one or more vibration sensors 302 and/or one or more strain gauges 306. The airfoil excitation model 520 may be, e.g., as noted above, a lookup table or set of lookup tables for various operating conditions that provides a certain output in response to the model inputs 504.

In some embodiments, an airfoil excitation model 520 may include one or more models, controllers, algorithms, lookup tables, or the like, configured to determine one or more aerostatic parameters, such as pitch stiffness, pitch moment, yaw moment, roll moment, lift, and the like. Pitch stiffness may be determined from a derivative of the ratio of the pitch moment to the aerodynamic incidence vector.

In some embodiments, an airfoil excitation model 520 may be utilized by one or more airfoil pitch angle control models 514, such as the one or more fan blade pitch angle control models 516 and/or by the one or more guide vane pitch angle control models 518. For example, an excitation load acting upon one or more fan blades 210 may be determined by the fan blade pitch angle control model 516 based at least in part on an airfoil excitation model 520. Additionally, or in the alternative, an excitation load acting upon one or more guide vanes 246 may be determined by the guide vane pitch angle control model 518 based at least in part on an airfoil excitation model 520. Additionally, or in the alternative, the fan blade pitch angle control model 516 and/or the guide vane pitch angle control model 518 may determine one or more module outputs 506 based at least in part on an airfoil excitation model 520.

In some embodiments, the airfoil excitation model 520 may be configured to determine an asymmetric load. The asymmetric load may correspond to one or more circumferential positions of the one or more airfoils 402. The asymmetric load may be determined based at least in part on sensor data generated by one or more aerodynamic incidence sensors 112, such as one or more angle of attack sensors 114 and/or one or more angle of sideslip sensors 116, sensor data generated by one or more vibration sensors 302, and/or sensor data generated by one or more strain gauges 306. Such sensor data may be correlated to a circumferential position of the one or more airfoils 402. For example, the circumferential position of the one or more airfoils 402 may be determined based at least in part on sensor data from one or more position indicator 312 that determine a circumferential position of the fan assembly 208 and/or a circumferential position of one or more fan blades 210 of the fan assembly 208. Additionally, or in the alternative the circumferential position of respective guide vanes 246 may be pre-associated with corresponding sensors 110.

In some embodiments, the one or more airfoil load models 502 may include one or more structural models 522. A structural model 522 may determine one or more structural parameters associated with a plurality of airfoils 402, such as one or more structural parameters of the fan blades 210 and/or the guide vanes 246. The structural parameters may include parameters associated with one or more material properties of one or more materials from which the plurality of airfoils 402 are formed. Additionally, or in the alternative, the structural parameters may include parameters associated with the structural configuration of the plurality of airfoils 402. The structural parameters may include parameters associated with a behavior of the plurality of airfoils 402 in response to an excitation load, such as stress, strain, deflection, elasticity, stiffness, or the like. In some embodiments, a structural model 522, and/or one or more structural parameters determined by a structural model 522, may be utilized by one or more of the other airfoil load models 502, such as the one or more airfoil pitch angle control models 514.

An airfoil excitation control module 500 may provide module outputs 506, for example, based at least in part on one or more of the airfoil load models 502. The module outputs 506 may be determined based at least in part on at least one of: a fan blade pitch angle control model 516, a guide vane pitch angle control model 518, and an airfoil excitation model 520, and a structural model 522. The module outputs 506 may include setpoints, control commands, model parameters, or the like configured to control one or more controllable components of an open rotor engine 200 based at least in part on one or more module inputs 504 and/or one or more airfoil load models 502. The module outputs 506 may include control commands configured to augment and/or compensate for airfoil excitation phenomenon, and/or excitation loads associated therewith. The airfoil excitation phenomenon may include autogenous excitations and/or cyclic excitations. The excitation loads associated with such airfoil excitation phenomenon may include an asymmetric load acting upon one or more airfoils 402, upon one or more bearing assemblies 304, and/or upon an engine support structure 308.

In some embodiments, the module outputs 506 may include airfoil pitch control commands 526. The airfoil pitch control commands 526 may control a pitch angle of one or more airfoils 402, such as a pitch angle of one or more fan blades 210 and/or a pitch angle of one or more guide vanes 246. The airfoil pitch control commands 526 may include airfoil pitch setpoints 528. The airfoil pitch setpoints 528 may include setpoints for a pitch angle of one or more airfoils 402, such as setpoints for a pitch angle of one or more fan blades 210 and/or setpoints for a pitch angle of one or more guide vanes 246. The setpoints for the pitch angle of the one or more airfoils 402 may include setpoints for a position of one or more ensemble actuators 416, setpoints for a position of one or more unitary actuators 430, and/or setpoints for a position of one or more subgroup actuators 442. The airfoil pitch setpoints 528 may be determined based at least in part on the one or more airfoil load models 502.

Additionally, or in the alternative, in some embodiments, the airfoil pitch control commands 526 may include pitch change control commands 530. The pitch change control commands 530 may include control commands configured to change a pitch angle of one or more airfoils 402, such as a pitch angle of one or more fan blades 210 and/or a pitch angle of one or more guide vanes 246. The pitch change control commands 530 may include control commands configured to change a position of one or more ensemble actuators 416, a position of one or more unitary actuators 430, and/or a position of one or more subgroup actuators 442. The pitch change control commands 530 may be determined based at least in part on the one or more airfoil load models 502.

In some embodiments, an airfoil load models 502 may be configured to determine an asymmetric load, such as a cyclic load, acting upon the one or more airfoils 402. The cyclic load may include an nP load, such as a 1P load. The module outputs 506 may include control commands configured to augment and/or compensate for such asymmetric and/or cyclic load. The control commands may reduce the asymmetric load and/or offset the asymmetric load. For example, an asymmetric and/or cyclic load acting upon one or more fan blades 210 may be at least partially offset by changing the pitch angle of one or more guide vanes 246. For example, an nP load, such as a 1P load, acting upon one or more fan blades 210 may be at least partially offset by changing a pitch angle of one or more guide vanes 246. In some embodiments, an nP load, such as a 1P load, acting upon one or more fan blades 210 at a circumferential position may be at least partially offset by changing a pitch angle of one or more guide vanes 246 at the circumferential position corresponding to the one or more fan blades 210. For example, an nP load, such as a 1P load, acting upon a fan blade 210 at circumferential position corresponding to a horizontally leftward orientation (e.g., at a nine o'clock position) may be at least partially offset by changing a pitch angle of a guide vane 246 at circumferential position that has a corresponding horizontally leftward orientation (e.g., at a nine o'clock position). Additionally, or in the alternative, an nP load, such as a 1P load, acting upon a fan blade 210 at circumferential position corresponding to a horizontally rightward orientation (e.g., at a three o'clock position) may be at least partially offset by changing a pitch angle of a guide vane 246 at circumferential position that has a corresponding horizontally rightward orientation (e.g., at a three o'clock position).

Additionally, or in the alternative, an asymmetric and/or cyclic load acting upon one or more airfoils 402 may be at least partially augmented and/or compensated for by changing a pitch angle of one or more respectively inversely disposed airfoils 402, such as one or more inversely disposed fan blades 210 and/or one or more inversely disposed guide vane 246. For example, a first airfoil 402 and a second airfoil 402 may be inversely disposed, and an asymmetric and/or cyclic load acting upon the first airfoil 402 and/or the second airfoil 402 may be augmented and/or compensated for by changing the pitch angle of the first airfoil 402 and/or the second airfoil 402. For example, an asymmetric load as between the first airfoil 402 and/or the second airfoil 402 may be at least partially offset by changing the pitch angle of the first airfoil 402 and/or the second airfoil 402. In some embodiments, an nP load, such as a 1P load, acting upon one or more fan blades 210 may be at least partially offset by changing a pitch angle of one or more fan blades 210 and/or one or more guide vanes 246, that have an inversely disposed circumferential position. For example, an nP load, such as a 1P load, acting upon a fan blade 210 at circumferential position corresponding to a horizontally leftward orientation (e.g., at a nine o'clock position) may be at least partially offset by changing a pitch angle of another fan blade 210 and/or by changing a pitch angle of a guide vane 246 at circumferential position that has a horizontally rightward orientation (e.g., at a three o'clock position). Additionally, or in the alternative, an nP load, such as a 1P load, acting upon a fan blade 210 at circumferential position corresponding to a horizontally rightward orientation (e.g., at a three o'clock position) may be at least partially offset by changing a pitch angle of another fan blade 210 and/or by changing a pitch angle of a guide vane 246 at circumferential position that has a horizontally leftward orientation (e.g., at a nine o'clock position).

In some embodiments, an airfoil load models 502 may be configured to determine an autogenous load, such as an aeroelastic load and/or a gyroscopic load. The module outputs 506 may include control commands configured to augment and/or compensate for such autogenous excitation. For example, an autogenous load acting upon one or more airfoils 402 (e.g., one or more fan blades 210 and/or one or more guide vanes 246) may be at least partially reduced and/or offset for by changing the pitch angle of one or more of the airfoils 402. Additionally, or in the alternative, the module outputs 506 may include engine control commands 532. The engine control commands 532 may include control commands configured to change one or more operating parameters of an open rotor engine 200, based at least in part on the module outputs 506 from the airfoil excitation control module 500. The engine control commands 532 may include control commands configured to change a fuel flow setting and/or a power output setting for an open rotor engine 200. In some embodiments, one or more engine control commands 532 may cause an open rotor engine 200 to recover from an airfoil excitation phenomena and/or an excitation load associated therewith. The engine control commands 532 may be determined based at least in part on the one or more airfoil load models 502. In some embodiments, the engine control commands 532 may include control commands, such as a reduced fuel flow setting and/or a reduced power output setting for an open rotor engine 200 providing propulsion for the aircraft 100, configured to allow the aircraft 100 and/or the open rotor engine 200 to recover from an autogenous load, such as an aeroelastic load and/or a gyroscopic load.

In some embodiments, the module outputs 506 may include model parameters 534. For example, an airfoil excitation model 520, and/or a structural model 522, may provide one or more model parameters 534 utilized by the fan blade pitch angle control model 516 and/or by a guide vane pitch angle control model 518. In some embodiments, an airfoil excitation control module 500, and/or one or more airfoil load models 502, module inputs 504, and/or module outputs 506 corresponding to an airfoil excitation control module 500, may be generated and/or updated, modified, adjusted, or the like from time to time, including, for example, periodically, in connection with a model development or training sequence, and/or in real-time.

In some embodiments, an airfoil excitation control module 500 may include a model trainer 536. The model trainer 536 may generate, update, modify, and/or adjust, one or more airfoil load models 502, such as a fan blade pitch angle control model 516, a guide vane pitch angle control model 518, an airfoil excitation model 520, and/or a structural model 522. An exemplary model trainer 536 may use any one or more various training or learning techniques such as backwards propagation of errors, which may include performing truncated backpropagation through time. In some embodiments, supervised training techniques may be used on a set of labeled training data. The model trainer 536 may perform a number of generalization techniques (e.g., weight decays, dropouts, etc.) to improve the generalization capability of the airfoil excitation control module 500 being trained.

An exemplary model trainer 536 may include a machine-learning model 538. The model trainer 536 may utilize one or more module inputs 504 as inputs, including, for example, as inputs to a machine-learning model 538. The model trainer 536 may output one or more model adjustments 540. The model adjustments 540 may include a new airfoil load model 502 and/or updates or adjustments to an airfoil load model 502, such as updates to settings, values, and/or schedules already included in the airfoil load model 502. Additionally, or in the alternative, the model adjustments 540 may include new settings, values, and/or schedules to be included with or substituted for those already included in the airfoil load model 502.

A machine-learning model 538 may use any suitable machine learning technique, operating regime, or algorithm. A machine-learning model 538 may use pattern recognition, computational learning, artificial intelligence, or the like to derive algorithms that allow the machine-learning model 538 to generate and/or update one or more airfoil load models 502. A machine-learning model 538 may include an unsupervised or a supervised learning regime, including a semi-supervised learning regime, an active learning regime, a reinforcement learning regime, and/or a representation learning regime. A machine-learning model 538 may utilize neural networks, decision trees, association rules, inductive logic algorithms, cluster analysis algorithms, and the like.

By way of example, the machine-learning model 538 shown in FIG. 5A may include a neural network. However, an exemplary machine-learning model 538 may include any other suitable model, including a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, and combinations thereof. Even further additional suitable types of machine or statistical learning models are also contemplated. It will also be appreciated that a machine-learning model 538 can use certain mathematical methods alone or in combination with one or more machine or statistical learning models.

In addition to outputting a model adjustment 540, in some embodiments a machine-learning model 538 may output a confidence score 542, which may provide an indication as to a level of confidence attributable to one or more outputs of the machine-learning model 538. The confidence score 542 may be used, for example, to set a margin of error to be used by the airfoil excitation control module 500 in determining a model adjustment 540. For example, in the event of a low confidence score 542 the airfoil excitation control module 500 may account for a more conservative or wide margin for error when determining a model adjustment 540, whereas in the event of a high confidence score 542 the airfoil excitation control module 500 may allow for a more aggressive or narrow margin for error when determining a model adjustment 540.

Referring now to FIG. 5B, exemplary airfoil excitation control modules 500 are further described. The airfoil excitation control module 500 shown in FIG. 5B may represent an exemplary embodiment encompassed by the subject matter described with reference to FIG. 5A. Additionally, or in the alternative, the airfoil excitation control module 500 shown in FIG. 5B may include any one or more of the features described with reference to FIG. 5A. An airfoil excitation control module 500 may include one or more airfoil load models 502 configured to provide airfoil pitch control commands 526 to one or more airfoils 402, such as airfoil pitch setpoints 528 and/or pitch change control commands 530, as described, for example with reference to FIG. 5A. As shown, the one or more airfoil load models 502 may include an airfoil pitch angle control model 514. The airfoil pitch angle control model 514 may include a fan blade pitch angle control model 516 and/or a guide vane pitch angle control model 518 (FIG. 5A). The airfoil pitch angle control model 514 may provide airfoil pitch control commands 526 to one or more airfoils 402, such as one or more fan blades 210 and/or one or more guide vanes 246.

As shown in FIG. 5B, in some embodiments, the airfoil pitch angle control model 514 may include a pitch angle controller 550. The pitch angle controller 550 may determine pitch angle setpoints for the one or more airfoils and/or to provide control commands configured to control the pitch angle of the one or more airfoils 402, for example, based at least in part on the pitch angle setpoints. For example, the pitch angle controller 550 may determine airfoil pitch control commands 526 for respective ones of the plurality of airfoils 402. The pitch angle of the one or more airfoils 402 may be controlled by the pitch angle controller 550 based at least in part on sensor data 508. Additionally, or in the alternative, the pitch angle controller 550 may control the pitch angle of the one or more airfoils 402 based at least in part on an input from an airfoil excitation model 520 and/or an input from a structural model 522. The airfoil excitation model 520 and/or the structural model 522 may provide input to the airfoil pitch angle control model 514, such as to the pitch angle controller 550, based at least in part on sensor data 508.

In some embodiments, the airfoil pitch angle control model 514 may include a pitch angle baseline scheduler 552. The pitch angle baseline scheduler 552 may determine a baseline schedule for the pitch angle of the one or more airfoils 402 and/or to provide control commands configured control the pitch angle of the one or more airfoils 402. The baseline schedule may include a nominal schedule of pitch angles for the one or more airfoils 402. In some embodiments, the baseline schedule may include pitch angle setpoints and/or control commands configured to change a pitch angle of the one or more airfoils 402, such as all of the airfoils 402 and/or a subset or group of the airfoils 402, based at least in part on such a nominal schedule. In some embodiments, a baseline schedule may be predetermined. Additionally, or in the alternative, the pitch angle baseline scheduler 552 may determine a baseline schedule based at least in part on sensor data 508, and/or based at least in part on an input from an airfoil excitation model 520 and/or an input from a structural model 522. Such an input from the airfoil excitation model 520 and/or the structural model 522 may be determined based at least in part on the sensor data 508. In some embodiments, the airfoil pitch control commands 526 determined by the pitch angle controller 550 may include changes to a baseline schedule determined by the pitch angle baseline scheduler 552. The changes to the baseline schedule may be determined for one or more of the plurality of airfoils 402.

In some embodiments, the airfoil pitch angle control model 514 may include an airfoil group scheduler 554. The airfoil group scheduler 554 may determine a plurality of airfoil groups 556 and/or to associate respective ones of the plurality of airfoils 402 to a respective one of the plurality of airfoil groups 556. The respective airfoil groups 556 may include one or more airfoils 402, such as a plurality of airfoils 402. A respective airfoil group 556 may include one or more fan blades 210 and/or one or more guide vanes 246. In some embodiments, a pitch angle baseline scheduler 552 may determine a baseline schedule for one or more airfoil groups 556. Additionally, or in the alternative, the airfoil group scheduler 554 may associate a baseline schedule with one or more airfoil groups 556. In some embodiments, a pitch angle controller 550 may provide airfoil pitch control commands 526 to the one or more airfoil groups 556. Additionally, or in the alternative, the airfoil group scheduler 554 may associate airfoil pitch control commands 526 with one or more airfoil groups 556. Additionally, or in the alternative, in some embodiments, the airfoil pitch control commands 526 may be determined based at least in part on the airfoil group scheduler 554, such as a respective one of the plurality of airfoil groups 556 to which respective ones of the plurality of airfoils 402 may be allocated. For example, the airfoil pitch control commands 526 may include airfoil pitch setpoints 528 and/or pitch change control commands 530 determined based at least in part on respective ones of the plurality of airfoil groups 556 determined by the airfoil group scheduler 554.

The plurality of airfoils 402 in a respective airfoil group 556 may include circumferentially adjacent airfoils 402. Additionally, or in the alternative, plurality of airfoils 402 in a respective airfoil group 556 may include airfoils 402 located at an inversely disposed circumferential position, such as a circumferentially opposite position and/or an approximately circumferentially opposite position. Such inversely disposed circumferential positions may include positions circumferentially-spaced from one another by about π-radians, such as by π-radians+/−(½)-π-radians, such as by π-radians+/−(⅓)-π-radians, such as by π-radians+/−(¼)-π-radians, or such as by π-radians+/−(⅙)-π-radians.

In some embodiments, the airfoil group scheduler 554 may augment an allocation of airfoils 402 among respective ones of the plurality of airfoil groups 556. For example, the airfoil group scheduler 554 may change (e.g., increase and/or decrease) a number of airfoils 402 allocated to a respective airfoil group 556, and/or to allocate airfoils 402 to a different airfoil group 556. Additionally, or in the alternative, the airfoil group scheduler 554 may change (e.g., increase and/or decrease) a number of airfoil groups 556. In some embodiments, the airfoil group scheduler 554 may associate respective ones of the plurality of fan blades 210 with respective ones of the plurality of guide vanes 246, for example, based at least in part on a circumferential position. A respective fan blade 210 may be associated with respectively different ones of the plurality of guide vanes 246 as the respective fan blade 210 rotate about the longitudinal axis 202 of the fan assembly 208.

Referring still to FIG. 5B, the airfoil pitch control commands 526 may include collective control commands 558 provided to all airfoils 402, such as all fan blades 210 and/or all guide vanes 246. Additionally, or in the alternative, the airfoil pitch control commands 526 may include group control commands 560 provided to a group of airfoils 402, such as a group of fan blades 210, a group of guide vanes 246, or a group of fan blades 210 and guide vanes 246. The group control commands 560 may be provided to respective ones of the plurality of airfoil groups 556. Additionally, or in the alternative, the airfoil pitch control commands 526 may include singular control commands 562 provided to an individual airfoil 402, such as a fan blades 210 or a guide vane 246. The singular control commands 562 may be provided to respective ones of the plurality of airfoils 402.

In some embodiments, the collective control commands 558 may be configured to actuate one or more course actuator mechanism 434 (e.g., the first actuator mechanism 436 shown in FIG. 4D). Additionally, or in the alternative, the group control commands 560 may be configured to actuate one or more course actuator mechanism 434. Additionally, or in the alternative, the singular control commands 562 may be configured to actuate one or more fine actuator mechanism 434 (e.g., the second actuator mechanism 438 shown in FIG. 4D).

The sensor data 508 utilized by the airfoil excitation control module 500 may include airstream sensor data 564. The airstream sensor data 564 may include data from one or more aerodynamic incidence sensors 112. Additionally, or in the alternative, the sensor data 508 may include vibration sensor data 566. The vibration sensor data 566 may include data from one or more vibration sensors 302.

Additionally, or in the alternative, the sensor data 508 may include strain gauge data 568. The strain gauge data 568 may include data from one or more strain gauges 306. Additionally, or in the alternative, the sensor data 508 may include position indicator data 570. The position indicator data 570 may include data from one or more position indicators 312. The sensor data 508, such as the airstream sensor data 564, the vibration sensor data 566, the strain gauge data 568, and/or the position indicator data 570, may be utilized by the airfoil excitation control module 500 to provide airfoil pitch control commands 526 as described herein.

In some embodiments, airfoil pitch control commands 526 determined, for example, by the pitch angle baseline scheduler 552 and/or the pitch angle controller 550, may corresponding to one or more circumferential positions about the longitudinal axis 202 of the fan assembly 208. For example, the airfoil pitch control commands 526 for a plurality of fan blades 210 may include airfoil pitch setpoints 528 and/or pitch change control commands 530 (FIG. 5A) configured to augment the pitch angle of the plurality of fan blades 210 with respect to circumferential position as the respective fan blades 210 rotate about the longitudinal axis 202 of the fan assembly 208. The pitch angle of the plurality of fan blades 210 may be augmented with respect to circumferential position according to a baseline schedule determined by the pitch angle baseline scheduler 552 and/or according to changes to the baseline schedule determined by the pitch angle controller 550. Additionally, or in the alternative, the pitch angle of the plurality of fan blades 210 may be augmented according to pitch angle setpoints and/or control commands without reference to a baseline schedule.

As another example, the airfoil pitch control commands 526 for a plurality of guide vanes 246 may include airfoil pitch setpoints 528 and/or pitch change control commands 530 (FIG. 5A) configured to provide differing pitch angles for respectively different circumferential position of the plurality of guide vanes 246 in relation to the longitudinal axis 202 of the fan assembly 208. The differing pitch angles of the plurality of guide vanes 246 with respect to circumferential position may be provided according to a baseline schedule determined by the pitch angle baseline scheduler 552 and/or according to changes to the baseline schedule determined by the pitch angle controller 550. Additionally, or in the alternative, the differing pitch angles of the plurality of guide vanes 246 may be provided according to pitch angle setpoints and/or control commands without reference to a baseline schedule.

In some embodiments, the airfoil pitch control commands 526 for the plurality of airfoils 402 (e.g., the plurality of fan blades 210 and/or the plurality of guide vanes 246) may provide for a respectively different pitch angle as between inversely disposed circumferential positions, such as circumferentially opposite positions and/or approximately circumferentially opposite positions. Such inversely disposed circumferential positions may include positions circumferentially-spaced from one another by about π-radians, such as by π-radians+/−(½)-π-radians, such as by π-radians+/−(⅓)-π-radians, such as by π-radians+/−(¼)-π-radians, or such as by π-radians+/−(⅙)-π-radians. For example, a first airfoil 402 (e.g., a first fan blade 210 or a first guide vane 246) may have a larger pitch angle than the pitch angle of a second airfoil 402 (e.g., a second fan blade 210 or a second guide vane 246) inversely disposed from such first airfoil 402. The first airfoil 402 may have a larger pitch angle than the second airfoil 402, for example, with respect to one or more first circumferential positions. Additionally, or in the alternative, the first airfoil 402 may have a smaller pitch angle than the pitch angle of the second airfoil 402, for example, with respect to one or more second circumferential positions.

By way of example, the first airfoil 402 may have a circumferential position corresponding to about a horizontally leftward orientation (e.g., a nine o'clock position) and second airfoil 402 may have a circumferential position corresponding to about a horizontally rightward orientation (e.g., a three o'clock position). The horizontally leftward orientation may be from about a seven o'clock position to about an eleven o'clock position, such as from about an eight o'clock position to about a ten o'clock position. The horizontally rightward orientation may be from about a one o'clock position to about a five o'clock position, such as from about a two o'clock position to about a four o'clock position. As another example, the first airfoil 402 may have a circumferential position corresponding to about a vertically upward orientation (e.g., a twelve o'clock position) and second airfoil 402 may have a circumferential position corresponding to about a vertically downward orientation (e.g., a six o'clock position). The vertically upward orientation may be from about a ten o'clock position to about a two o'clock position, such as from about an eleven o'clock position to about a one o'clock position. The vertically downward position may be from about a four o'clock position to about an eight o'clock position, such as from about a five o'clock position to about a seven o'clock position. With respect to a plurality of fan blades 210, the first fan blade 210 and/or the second fan blade 210 may respectively exhibit such a circumferential position at a corresponding point in time as the plurality of fan blades 210 rotate about the longitudinal axis of the fan assembly 208. With respect to a plurality of guide vanes 246, the first guide vane 246 and/or the second guide vane 246 may be fixed at respective circumferential positions about the longitudinal axis of the fan assembly 208. Notably, the phrase "from an X o'clock position to a Y o'clock position" includes "between X o'clock and Y o'clock."

In some embodiments, by way of illustration, for a fan assembly 208 rotating counterclockwise (as viewed from an afterward reference point), the airfoil pitch control commands 526 may provide for respective ones of a plurality of fan blades 210 to exhibit a relatively smaller pitch angle at a circumferential position corresponding to about a horizontally leftward orientation (e.g., a 9 o'clock position), as compared to an inversely disposed one of the plurality of fan blades 210. The airfoil pitch control commands 526 may provide for respective ones of the plurality of fan blades 210 to exhibit a relatively larger pitch angle at a circumferential position corresponding to about a horizontally rightward orientation (e.g., a 3 o'clock position), as compared to an inversely disposed one of the plurality of fan blades 210.

Additionally, or in the alternative, the airfoil pitch control commands 526 may provide for respective ones of the plurality of airfoils 402 to exhibit a relatively smaller pitch angle, as compared to an inversely disposed one of the plurality of fan blades 210, at a circumferential position corresponding to from about an upward vertical orientation (e.g., a 12 o'clock position) to about a downward vertical position (e.g., a 6 o'clock position), for example, when rotating from about the upward vertical orientation to about the downward vertical position. The airfoil pitch control commands 526 may provide for respective ones of the plurality of fan blades 210 to exhibit a relatively larger pitch angle, as compared to an inversely disposed one of the plurality of fan blades 210, when the respective fan blade 210 has a circumferential position of from about a downward vertical position (e.g., a 6 o'clock position) to about an upward vertical orientation (e.g., a 12 o'clock position), for example, when rotating from about the downward vertical position to about the upward vertical orientation.

Additionally, or in the alternative, the airfoil pitch control commands 526 may provide for the pitch angle of respective ones of a plurality of fan blades 210 to increase when rotating from a circumferential position corresponding to about a horizontally leftward orientation (e.g., a 9 o'clock position) to a circumferential position corresponding to about, as compared to an inversely disposed one of the plurality of fan blades 210. The airfoil pitch control commands 526 may provide for respective ones of the plurality of fan blades 210 to a horizontally rightward orientation (e.g., a 3 o'clock position). The airfoil pitch control commands 526 may provide for the pitch angle of respective ones of a plurality of fan blades 210 to decrease when rotating from a circumferential position corresponding to about a horizontally rightward orientation (e.g., a 3 o'clock position) to a circumferential position corresponding to about a horizontally leftward orientation (e.g., a 9 o'clock position).

In some embodiments, the airfoil pitch control commands 526 for a plurality of airfoils 402 (e.g., a plurality of fan blades 210 and/or a plurality of guide vanes 246) may include pitch angle setpoints and/or control commands configured to augment and/or compensate for an airfoil excitation phenomena and/or an excitation load associated therewith, such as an asymmetric load corresponding to one or more circumferential positions of the respective airfoils 402. For example, the airfoil pitch control commands 526 may compensate for different excitation loads as between one or more circumferential positions of the respective airfoils 402. In some embodiments, the airfoil pitch control commands 526 for the plurality of airfoils 402 (e.g., the plurality of fan blades 210 and/or the plurality of guide vanes 246) may provide for a respectively different pitch angle as between inversely disposed circumferential positions, such as circumferentially opposite positions and/or approximately circumferentially opposite positions, and the respectively different pitch angles may be determined at least in part to augment and/or compensate for respective excitation loads as between such inversely disposed circumferential positions.

In some embodiments, airfoil pitch control commands 526 for a plurality of guide vanes 246 may augment and/or compensate for an excitation load acting upon one or more of the plurality of fan blades 210. In some embodiments, the airfoil pitch control commands 526 may include pitch angle setpoints and/or control commands for one or more of the plurality of guide vanes 246 determined based at least in part on an excitation load acting upon a corresponding one or more of the plurality of fan blades 210. The corresponding one or more of the plurality of fan blades 210 may be located at a circumferential position corresponding to the respective one of the plurality of guide vanes 246. Additionally, or in the alternative, the corresponding one of the plurality of fan blades 210 may be located at an inversely disposed circumferential position, such as a circumferentially opposite position and/or an approximately circumferentially opposite position. For example, the pitch angle of respective guide vane 246 may at least partially compensate for and/or offset an excitation load acting upon a fan blade located at an inversely disposed circumferential positions relative to the respective guide vane 246. Such inversely disposed circumferential positions may include positions circumferentially-spaced from one another by about π-radians, such as by π-radians+/−(½)-π-radians, such as by π-radians+/−(⅓)-π-radians, such as by π-radians+/−(¼)-π-radians, or such as by π-radians+/−(⅙)-π-radians.

For example, the airfoil pitch control commands 526 may include pitch angle setpoints and/or control commands for a first guide vane 246 located at a circumferential position corresponding to about a horizontally leftward orientation (e.g., a nine o'clock position), and the pitch angle setpoints and/or control commands may be determined based at least in part on an excitation load acting upon a first fan blade 210 located at a circumferential position corresponding to about a horizontally rightward orientation (e.g., a three o'clock position). The pitch angle setpoints and/or control commands for the first guide vane 246 may be determined at least in part to compensate and/or offset the load acting upon the first fan blade 210. The airfoil pitch control commands 526 may include pitch angle setpoints and/or control commands for a second guide vane 246 located at a circumferential position corresponding to about a horizontally rightward orientation (e.g., a three o'clock position), and the pitch angle setpoints and/or control commands may be determined based at least in part on an excitation load acting upon a second fan blade 210 located at a circumferential position corresponding to about a horizontally leftward orientation (e.g., a nine o'clock position). The pitch angle setpoints and/or control commands for the second guide vane 246 may be determined at least in part to compensate and/or offset the load acting upon the second fan blade 210. The horizontally leftward orientation may be from about a seven o'clock position to about an eleven o'clock position, such as from about an eight o'clock position to about a ten o'clock position. The horizontally rightward orientation may be from about a one o'clock position to about a five o'clock position, such as from about a two o'clock position to about a four o'clock position.

As another example, the airfoil pitch control commands 526 may include pitch angle setpoints and/or control commands for a third guide vane 246 located at a circumferential position corresponding to about a vertically upward orientation (e.g., a twelve o'clock position), and the pitch angle setpoints and/or control commands may be determined based at least in part on an excitation load acting upon a third fan blade 210 located a circumferential position corresponding to about a vertically downward orientation (e.g., a six o'clock position). The pitch angle setpoints and/or control commands for the third guide vane 246 may be determined at least in part to compensate and/or offset the load acting upon the third fan blade 210. The airfoil pitch control commands 526 may include pitch angle setpoints and/or control commands for a fourth guide vane 246 located at a circumferential position corresponding to about a vertically downward orientation (e.g., a six o'clock position), and the pitch angle setpoints and/or control commands may be determined based at least in part on an excitation load acting upon a fourth fan blade 210 located a circumferential position corresponding to about a vertically upward orientation (e.g., a twelve o'clock position). The pitch angle setpoints and/or control commands for the fourth guide vane 246 may be determined at least in part to compensate and/or offset the load acting upon the fourth fan blade 210. The vertically upward orientation may be from about a ten o'clock position to about a two o'clock position, such as from about an eleven o'clock position to about a one o'clock position. The vertically downward position may be from about a four o'clock position to about an eight o'clock position, such as from about a five o'clock position to about a seven o'clock position. The respective fan blades 210 may exhibit such a circumferential position at a corresponding point in time as the plurality of fan blades 210 rotate about the longitudinal axis of the fan assembly 208. The respective guide vanes 246 may be fixed at respective circumferential positions about the longitudinal axis of the fan assembly 208. One or more examples are described below with respect to FIG. 5B.

Figure 6:
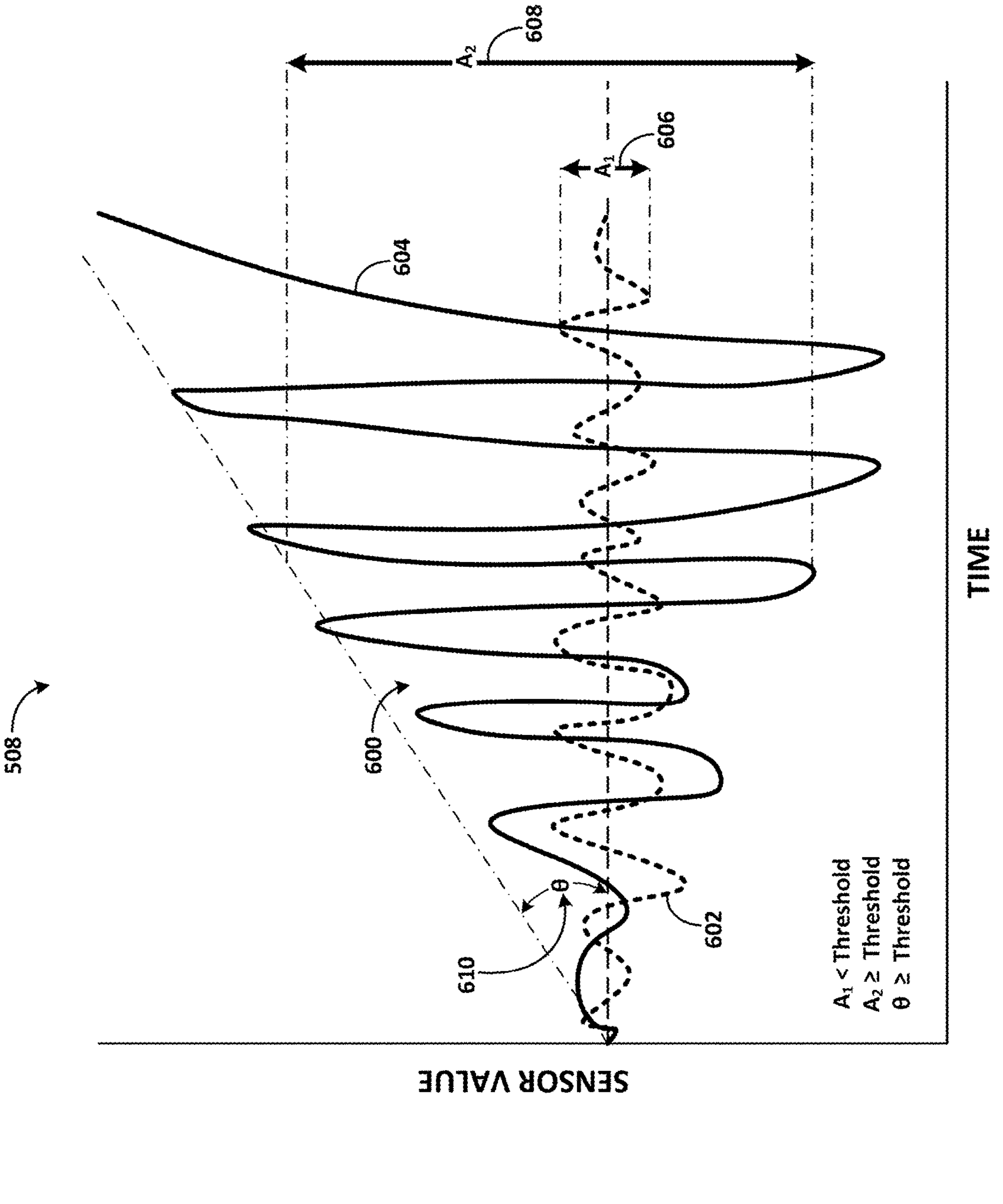
FIG. 6 schematically depicts exemplary sensor data that may be utilized by an airfoil excitation control module.

Referring now to FIG. 6, exemplary sensor data 508 will be described. FIG. 6 shows sensor values 600 for sensor data 508 as a function of time. The sensor data 508 shown in FIG. 6 may correspond to any of the one or more sensors 110. In some embodiments, the sensor data 508 shown in FIG. 6 may include vibration sensor data 566 from one or more vibration sensors 302. Additionally, or in the alternative, the sensor data 508 shown in FIG. 6 may include strain gauge data 568 from one or more strain gauges 306. As shown in FIG. 6, the sensor data 508 may exhibit a variation in sensor values 600 as a function of time. The variation in sensor values 600 may be indicative of an airfoil excitation phenomena, such as an autogenous excitation (e.g., an aeroelastic excitation and/or a gyroscopic excitation). For example, the variation in sensor values 600 may be indicative of airfoil flutter attributable to the fan assembly 208. Additionally, or in the alternative, the sensor data 508 may exhibit sensor values 600 indicative of nominal operating conditions. An airfoil excitation phenomena, such as an autogenous excitation, may be distinguished from nominal operating conditions based at least in part on an amplitude and/or a change in amplitude of the sensor values 600 over a frame of reference, such as a time interval. Additionally, or in the alternative, an airfoil excitation phenomena may be distinguished from nominal operating conditions based at least in part on a frequency and/or a change in frequency of the sensor values 600 over a frame of reference, such as a time interval.

For example, FIG. 6 shows first sensor data values 602 and second sensor data values 604. As shown, the first sensor data values 602 may have a first amplitude 606 that is less than a threshold value. The first amplitude 606 being less than the threshold value may indicate that the first sensor data values correspond to nominal operating conditions. Also as shown, the second sensor data values 604 may have a second amplitude 608 that is greater than a threshold value. The second amplitude 608 being greater than the threshold value may indicate that the second sensor data values 604 correspond to an airfoil excitation phenomena, such as an autogenous excitation (e.g., an aeroelastic excitation and/or a gyroscopic excitation). Additionally, or in the alternative, an airfoil excitation phenomena may be distinguished from nominal operating conditions based at least in part on a slope of the sensor values 600 over a frame of reference, such as a time interval. For example, the second sensor data values 604 shown in FIG. 6 exhibit a slope (θ) 610 that exceeds a threshold value. The slope (θ) 610 of the second sensor data values 604 being greater than the threshold value may indicate that the second sensor data values 604 correspond to an airfoil excitation phenomena, such as an autogenous excitation (e.g., an aeroelastic excitation and/or a gyroscopic excitation).

In some embodiments, an airfoil load model 502, such as an airfoil excitation model 520 (FIGS. 5A and 5B), may determine an airfoil excitation phenomena based at least in part on an amplitude (e.g., the second amplitude 608) and/or a slope (θ) 610 of the sensor values 600, as shown, for example in FIG. 6. The airfoil load model 502 may provide one or more model outputs 506 based at least in part on an airfoil excitation phenomena, such as determined based at least in part on an amplitude (e.g., the second amplitude 608) and/or a slope (θ) 610 of the sensor values 600. For example, the model outputs may include airfoil pitch control commands 526 and/or engine control commands 532. In some embodiments, the airfoil pitch control commands 526 may reduce, offset, compensate for, and/or remediate the airfoil excitation phenomenon. For example, in some embodiments, a change in pitch angle to one or more airfoils 402 may reduce, offset, compensate for, and/or remediate such an airfoil excitation phenomena. Additionally, or in the alternative, an airfoil excitation phenomena may be reduced, offset, compensated for, and/or remediated at least in part by one or more engine control commands 532. For example, the one or more engine control commands 532 may change one or more operating parameters of the open rotor engine 200, such as a fuel flow setting and/or a power output setting. The change to the one or more operating parameters of the open rotor engine 200 may reduce, offset, compensate for, and/or remediate the airfoil excitation phenomenon at least in part by providing separation from a natural resonant frequency of the fan assembly 208 (e.g., the plurality of fan blades 210) and/or the guide vane assembly 244 (e.g., the plurality of guide vanes 246). Additionally, or in the alternative, the change to the one or more operating parameters of the open rotor engine 200 may reduce, offset, compensate for, and/or remediate the airfoil excitation phenomenon at least in part by offsetting and/or compensating for an asymmetric load with respect to the fan assembly 208 (e.g., the plurality of fan blades 210) and/or the guide vane assembly 244 (e.g., the plurality of guide vanes 246).

Figure 7:
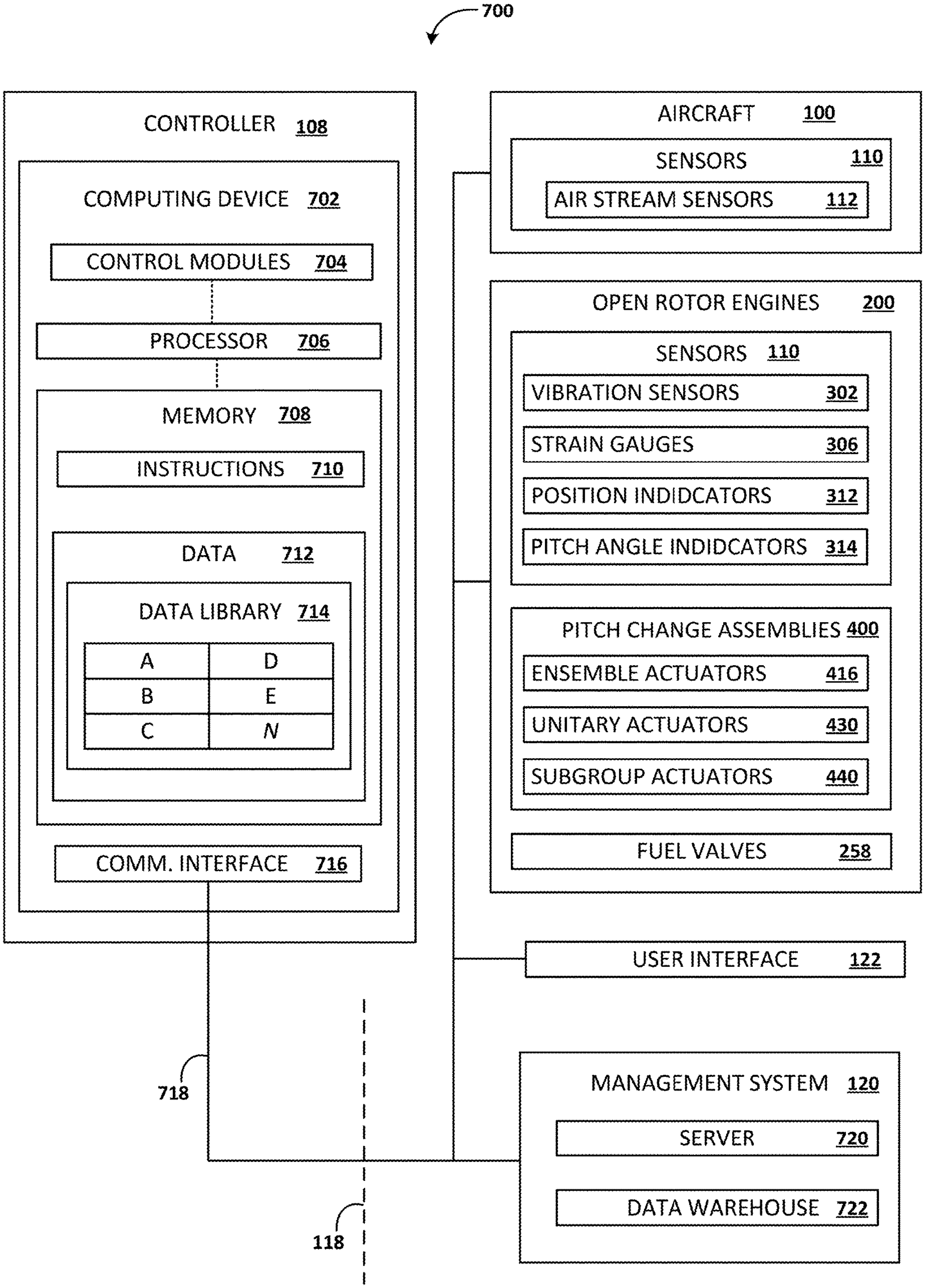
FIG. 7 schematically depicts an exemplary control system that may be utilized to control and aircraft and/or one or more open rotor aeronautical engines.

Referring now to FIG. 7, exemplary computing systems 700 are further described. An exemplary computing system 700 may be utilized to monitor and/or control various features of an aircraft 100, such as various features of an open rotor engine 200, as described herein. The computing system 700 may perform any desired control operations in accordance with the present disclosure, such as those described with reference to FIGS. 5A and 5B.

As shown in FIG. 7, an exemplary computing system 700 may include an electronic controller 108, such as an electronic engine controller, a full-authority digital engine control (FADEC) device, or the like. The electronic controller 108 may include one or more computing devices 702 configured to perform specified control operations. The one or more computing devices 702 may be located locally or remotely relative to the one or more open rotor engines 200. The control operations may include determining, generating, transmitting, and/or receiving module inputs 504. For example, the control operations may include determining, generating, transmitting, and/or receiving sensor data 508 from one or more sensors 110. Additionally, or in the alternative, the control operations may include determining, generating, transmitting, and/or receiving module outputs 506. For example, the control operations may include determining, generating, transmitting, and/or receiving airfoil pitch control commands 526, for example, based at least in part on the module inputs 504, such as the sensor data 508. The module outputs 506 and/or the airfoil pitch control commands 526 may be transmitted to one or more controllable components, such as one or more pitch change assemblies 400 (e.g., a fan blade-pitch change assembly 404 and/or a guide vane-pitch change assembly 406).

The computing device 702 may be communicatively coupled with the one or more sensors 110 and/or with the one or more controllable components, such as the one or more pitch change assemblies 400. The computing device 702 may include one or more control modules 704 configured to cause the electronic controller 108 to perform the one or more control operations, for example, based at least in part on one or more models, lookup tables, or the like.

The one or more computing devices 702 may include one or more processors 706 and one or more memory devices 708. The one or more processors 706 may include any suitable processing device, such as a microprocessor, microcontroller, integrated circuit, logic device, and/or other suitable processing device. The one or more memory devices 708 may include one or more computer-readable media, including but not limited to non-transitory computer-readable media, RAM, ROM, hard drives, flash drives, and/or other memory devices 708. The one or more control modules 704 may be implemented at least in part by the one or more processors 706 and/or the one or more memory devices 708.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 708 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 708 may store information accessible by the one or more processors 706, including computer-executable instructions 710 that can be executed by the one or more processors 706. The instructions 710 may include any set of instructions which when executed by the one or more processors 706 cause the one or more processors 706 to perform operations, including control operations. The one or more memory devices 708 may store data 712 accessible by the one or more processors 706, such as data associated with the aircraft 100, the one or more open rotor engines 200, and/or the one or more electronic controllers 108 associated therewith. The data 712 may include the sensor data 508. The data 712 may include current or real-time data 712, past data 712, or a combination thereof. The data 712 may be stored in a data library 714. The data 712 may also include other data sets, parameters, outputs, information, associated with the aircraft 100, the one or more open rotor engine 200, and/or the one or more electronic controllers 108 associated therewith.

The one or more computing devices 702 may also include a communication interface 716 configured to communicate with various nodes on a communication network 118 via wired or wireless communication lines 718. The communication interface 716 may include any suitable components for interfacing with one or more network(s), including for example, transmitters, receivers, ports, controllers, antennas, and/or other suitable components. The communication network 118 may include, for example, a local area network (LAN), a wide area network (WAN), SATCOM network, VHF network, a HF network, a Wi-Fi network, a WiMAX network, a gatelink network, and/or any other suitable communication network 118 for transmitting messages to and/or from the computing device 702 across the communication lines 718. The communication lines 718 of communication network 118 may include a data bus or a combination of wired and/or wireless communication links.

The one or more electronic controllers 108 may be communicatively coupled, for example, by way of the communication network 118, with one or more components of the aircraft 100 and/or with one or more components of the one or more open rotor engines 200 with respect to which the one or more electronic controllers 108 may communicate. For example, the one or more electronic controllers 108 may be communicatively coupled with one or more sensors, 110, such as one or more aerodynamic incidence sensors 112. Additionally, or in the alternative, the one or more electronic controllers 108 may be communicatively coupled with one or more vibration sensors 302, one or more strain gauges 306, one or more position indicators 312, and/or one or more pitch angle indicators 314. Additionally, or in the alternative, the one or more electronic controllers 108 may be communicatively coupled with one or more controllable components, such as one or more actuators associated with a pitch change assembly. For example, the one or more electronic controllers 108 may be communicatively coupled with one or more ensemble actuators 416, one or more unitary actuators 430, and/or one or more subgroup actuators 442. Additionally, or in the alternative, the one or more electronic controllers 108 may be communicatively coupled with one or more fuel valves 258.

The computing system 700 may include a management system 120 located locally or remotely relative to the aircraft

100 and/or the one or more open rotor engines 200. The management system 120 may include a server 720 and/or a data warehouse 722. As an example, at least a portion of the data 712 may be stored in the data warehouse 722, and the server 720 may transmit data 712 from the data warehouse 722 to the one or more computing device 702, and/or to receive data 712 from the one or more computing devices 702 and to store the received data 712 in the data warehouse 722 for further purposes. The server 720 and/or the data warehouse 722 may be implemented as part of the one or more computing devices 702 and/or as part of the management system 120. The computing system 700 may also include a user interface 122 configured to allow a user to interact with the various features of the computing system 700, for example, by way of the communication interface 716. The communication interface 716 may allow the one or more computing devices 702 to communicate with various nodes associated with the aircraft 100, the one or more open rotor engine 200, the management system 120, and/or the user interface 122.

Figure 8:
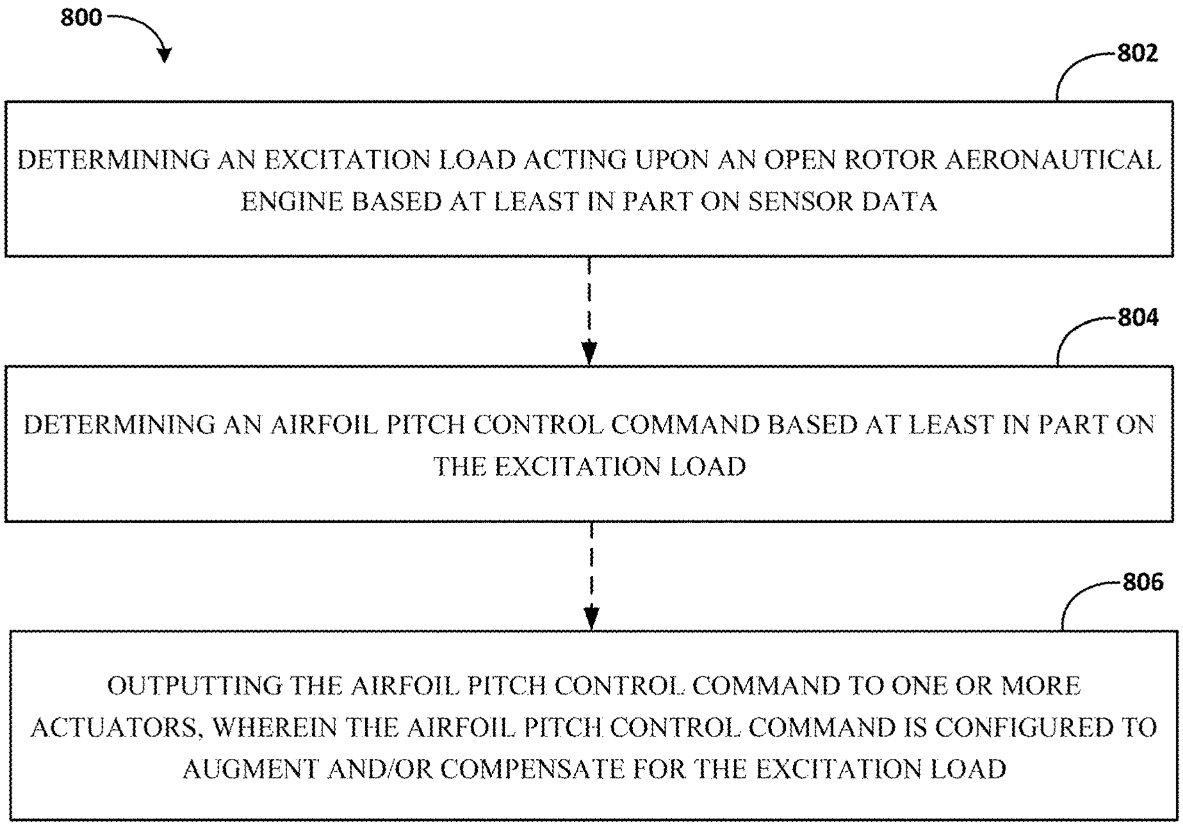
FIG. 8 shows a flow chart depicting an exemplary methods of operating an open rotor aeronautical engine.

Referring now to FIG. 8, exemplary methods 800 of operating an open rotor engine 200 are described. In addition, or in the alternative, to operating an open rotor engine 200, the exemplary methods 800 described with reference to FIG. 8 may be utilized to operate a pitch change assembly 400 (e.g., a fan blade-pitch change assembly 404 and/or a guide vane-pitch change assembly 406), such as those described with reference to FIGS. 4A-4H. Additionally, or in the alternative, the exemplary methods 800 described with reference to FIG. 8 may be utilized to operate an airfoil excitation control module 500 and/or one or more airfoil load models 502 thereof, such as those described with reference to FIGS. 5A-5B. Additionally, or in the alternative, the exemplary methods 800 described with reference to FIG. 8 may be utilized to operate a computing system 700 and/or one or more electronic controllers 108, such as those described with reference to FIG. 7.

As shown in FIG. 8, an exemplary method 800 may include, at block 802, determining an excitation load acting upon an open rotor aeronautical engine based at least in part on the sensor data. At block 804, an exemplary method 800 may include, determining an airfoil pitch control command based at least in part on the excitation load. The airfoil pitch control command may be configured to cause an actuator to change a pitch angle of at least one of a plurality of unducted airfoils of the open rotor aeronautical engine. At block 806, an exemplary method 800 may include outputting the airfoil pitch control command to one or more actuators. The one or more actuators may be actuatable to change the pitch angle of at least one of the plurality of unducted airfoils The airfoil pitch control command may be configured to augment and/or compensate for the excitation load acting upon the open rotor aeronautical engine.

As will be appreciated from the present disclosure, various embodiments of an open rotor engine, such as a gas turbine engine are provided. Certain of these embodiments may be an unducted, single rotor gas turbine engine, or a ducted turbofan engine. An example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary open rotor engines discussed above with respect to the figures.

In one or more of these embodiments, a threshold power or disk loading for a fan (e.g., an unducted single rotor or primary forward fan) may range from 25 horsepower per square foot (hp/ft$^2$) or greater at cruise altitude during a cruise flight condition. In particular embodiments of the engine, structures and methods provided herein generate power loading between 80 hp/ft$^2$ and 160 hp/ft$^2$ or higher at cruise altitude during a cruise flight condition, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may generate at least about 25,000 pounds and less than about 80,000 of thrust during operation at a rated speed, such as between about 25,000 and 50,000 pounds of thrust during operation at a rated speed, such as between about 25,000 and 40,000 pounds of thrust during operation at a rated speed.

In various exemplary embodiments, the fan may include twelve (12) fan blades. From a loading standpoint, such a blade count may allow a span of each blade to be reduced such that the overall diameter of the primary fan may also be reduced (e.g., to about twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between about 1 and 10, or 2 and 7, or at least about 3.3, at least about 3.5, at least about 4 and less than or equal to about 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan may rotate at a rotational speed of 700 to 1500 rpm at a cruise flight condition, while the power turbine (e.g., the low-pressure turbine) may rotate at a rotational speed of 2,500 to 15,000 rpm at a cruise flight condition. In particular embodiments, the fan can rotate at a rotational speed of 850 to 1,350 rpm at a cruise flight condition, while the power turbine may rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

Further aspects are provided by the subject matter of the following clauses:

A pitch change assembly for an aeronautical gas turbine engine having a plurality of airfoils, the pitch change assembly comprising: an ensemble actuator assembly comprising one or more ensemble actuators and a unison ring, the unison ring movable by actuation of the one or more ensemble actuators to collectively change a pitch angle of respective ones of the plurality of airfoils; and a unitary actuator assembly comprising a plurality of unitary actuators respectively coupled to a corresponding one of the plurality of airfoils, the plurality of unitary actuators respectively movable to change the pitch angle of the corresponding one of the plurality of airfoils.

The pitch change assembly of any preceding clause, wherein the pitch change assembly comprises a guide vane-pitch change assembly and wherein the plurality of airfoils comprise guide vanes, or wherein the pitch change assembly comprises a fan blade-pitch change assembly, and wherein the plurality of airfoils comprise fan blades.

The pitch change assembly any preceding clause, wherein the unison ring comprises: an outward unison ring; an inward unison ring; and a bearing assembly disposed between the inward unison ring and the outward unison ring.

The pitch change assembly any preceding clause, wherein the unison ring translates, collectively to respective ones of the plurality of airfoils, at least one of a linear motion and a rotary motion.

The pitch change assembly any preceding clause, wherein the ensemble actuator assembly comprises three ensemble actuators.

The pitch change assembly any preceding clause, wherein the aeronautical gas turbine engine comprises an open rotor aeronautical gas turbine engine.

A pitch change assembly for an aeronautical gas turbine engine having a plurality of guide vanes, the pitch change assembly comprising: one or more actuators configured to change a pitch angle of respective ones of the plurality of guide vanes; and a plurality of linkage arms that are respectively movable by actuation of at least one of the one or more actuators, wherein respective ones of the plurality of linkage arms are directly or indirectly coupled to a corresponding one of the plurality of guide vanes; wherein respective ones of the plurality of linkage arms have a length that differs from at least another one of the plurality of linkage arms respectively corresponding to another one of the plurality of guide vanes, wherein the length of a respective one of the plurality of linkage arms orients a displacement and/or a range of motion of the respective one of the plurality of linkage arms to an envelope of rotation of the corresponding one of the plurality of guide vanes about a guide vane axis, wherein the envelope of rotation of the corresponding one of the plurality of guide vanes differs from the envelope of rotation of at least another one of the plurality of guide vanes.

An open rotor aeronautical engine, comprising: a core engine; a plurality of unducted airfoils; and a pitch change assembly, comprising: an ensemble actuator assembly comprising one or more ensemble actuators and a unison ring, the unison ring movable by actuation of the one or more ensemble actuators to collectively change a pitch angle of respective ones of the plurality of unducted airfoils; and a unitary actuator assembly comprising a plurality of unitary actuators respectively coupled to a corresponding one of the plurality of unducted airfoils, the plurality of unitary actuators respectively movable to change the pitch angle of the corresponding one of the plurality of unducted airfoils.

The open rotor aeronautical engine any preceding clause, wherein the unison ring translates, collectively to respective ones of the plurality of unducted airfoils, at least one of a linear motion and a rotary motion.

The open rotor aeronautical engine any preceding clause, wherein the ensemble actuator assembly comprises three ensemble actuators.

The open rotor aeronautical engine any preceding clause, wherein the pitch change assembly comprises a guide vane-pitch change assembly, and wherein the plurality of unducted airfoils comprise guide vanes.

The open rotor aeronautical engine any preceding clause, wherein the pitch change assembly comprises a fan blade-pitch change assembly, and wherein the plurality of unducted airfoils comprise fan blades.

The open rotor aeronautical engine of any preceding clause, wherein the unison ring comprises: an outward unison ring; an inward unison ring; and a fan bearing assembly disposed between the inward unison ring and the outward unison ring.

The open rotor aeronautical engine of any preceding clause, wherein the outward unison ring defines part of a rotor portion of an unducted fan assembly, and the inward unison ring defines part of a stator portion of the unducted fan assembly.

The open rotor aeronautical engine any preceding clause, wherein the plurality of unitary actuators are respectively coupled to the unison ring.

The open rotor aeronautical engine of any preceding clause, wherein the unitary actuator assembly comprises a plurality of linkage arms, wherein respective ones of the plurality of linkage arms are respectively disposed between one of: the unison ring and a corresponding one of the plurality of unitary actuators, or the corresponding one of the plurality of unducted airfoils and the corresponding one of the plurality of unitary actuators.

The open rotor aeronautical engine of any preceding clause, wherein at least some of the plurality of linkage arms have a length that differs from at least another one of the plurality of linkage arms.

The open rotor aeronautical engine any preceding clause, wherein respective ones of the plurality of unitary actuators comprise: a first actuator mechanism that provides course adjustments to the pitch angle of the corresponding one of the plurality of unducted airfoils; and a second actuator mechanism that provides fine adjustments to the pitch angle of the corresponding one of the plurality of unducted airfoils.

The open rotor aeronautical engine any preceding clause, wherein the first actuator mechanism has a first stroke length corresponding to from 10% to 100% of a range of motion about a pitch axis of the corresponding one of the plurality of unducted airfoils, and wherein the second actuator mechanism has a second stroke length corresponding to from 1% to 40% of the range of motion of the pitch axis of the corresponding one of the plurality of unducted airfoils.

The open rotor aeronautical engine any preceding clause, wherein the pitch change assembly comprises: a plurality of subgroup actuator assemblies respectively comprising a subgroup actuator configured to change a pitch angle with respect to an airfoil subgroup corresponding to a respective subgroup actuator assembly from among the plurality of subgroup actuator assemblies, wherein the airfoil subgroup comprises a portion of the plurality of unducted airfoils.

The open rotor aeronautical engine any preceding clause, wherein the plurality of unducted airfoils comprise guide vanes, or wherein the plurality of unducted airfoils comprise fan blades; wherein the fan blades are located upstream from the guide vanes.

An open rotor aeronautical engine, comprising: a core engine; an unducted fan assembly comprising a plurality of fan blades; a guide vane assembly comprising a plurality of guide vanes extending outwardly from the core engine; a fan blade-pitch change assembly, comprising at least one of: an ensemble actuator assembly comprising one or more ensemble actuators and a unison ring, the unison ring movable by actuation of the one or more ensemble actuators to collectively change a pitch angle of respective ones of the plurality of fan blades; and a unitary actuator assembly comprising a plurality of unitary actuators respectively coupled to a corresponding one of the plurality of fan blades, the plurality of unitary actuators respectively movable to change the pitch angle of the corresponding one of the plurality of fan blades.

An open rotor aeronautical engine, comprising: a core engine; an unducted fan assembly comprising a plurality of fan blades; a guide vane assembly comprising a plurality of guide vanes extending outwardly from the core engine; a guide vane-pitch change assembly, comprising at least one of: an ensemble actuator assembly comprising one or more ensemble actuators and a unison ring, the unison ring movable by actuation of the one or more ensemble actuators to collectively change a pitch angle of respective ones of the plurality of guide vanes; and a unitary actuator assembly comprising a plurality of unitary actuators respectively coupled to a corresponding one of the plurality of guide vanes, the plurality of unitary actuators respectively movable to change the pitch angle of the corresponding one of the plurality of guide vanes.

An aeronautical gas turbine engine, comprising: a core engine; one or more sensors configured to provide sensor data indicative of an excitation load acting upon the aeronautical gas turbine engine; a plurality of airfoils; and a pitch change assembly comprising one or more actuators actuatable to individually and/or collectively change a pitch angle of respective ones of the plurality of airfoils; and an electronic controller configured to perform a method comprising: determining the excitation load acting upon the aeronautical gas turbine engine based at least in part on the sensor data; determining an airfoil pitch control command based at least in part on the excitation load; and outputting the airfoil pitch control command to the one or more actuators, wherein the airfoil pitch control command is configured to augment and/or compensate for the excitation load.

An open rotor aeronautical engine, comprising: a core engine; a plurality of guide vanes positioned within or extending from the core engine; and a pitch change assembly operably coupled to the plurality of guide vanes, the pitch change assembly comprising: one or more actuators configured to change a pitch angle of respective ones of the plurality of guide vanes; and a plurality of linkage arms that are respectively movable by actuation of at least one of the one or more actuators, wherein respective ones of the plurality of linkage arms are directly or indirectly coupled to a corresponding one of the plurality of guide vanes; wherein respective ones of the plurality of linkage arms have a length that differs from at least another one of the plurality of linkage arms respectively corresponding to another one of the plurality of guide vanes, wherein the length of a respective one of the plurality of linkage arms orients a displacement and/or a range of motion of the respective one of the plurality of linkage arms to an envelope of rotation of the corresponding one of the plurality of guide vanes about a guide vane axis, wherein the envelope of rotation of the corresponding one of the plurality of guide vanes differs from the envelope of rotation of at least another one of the plurality of guide vanes.

The open rotor aeronautical engine any preceding clause, wherein at a first position of the one or more actuators, the plurality of guide vanes have a uniform pitch angle as between respective ones of the plurality of guide vanes, and wherein at a second position of the one or more actuators, the plurality of guide vanes have a non-uniform pitch angle as between respective ones of the plurality of guide vanes.

The open rotor aeronautical engine any preceding clause, wherein at a first position of the one or more actuators, the plurality of guide vanes have a first non-uniform pitch angle as between respective ones of the plurality of guide vanes, and wherein at a second position of the one or more actuators, the plurality of guide vanes have a second non-uniform pitch angle as between respective ones of the plurality of guide vanes.

The open rotor aeronautical engine any preceding clause, wherein the pitch change assembly comprises: a unitary actuator assembly, wherein the one or more actuators respectively comprise a unitary actuator directly or indirectly coupled to a corresponding one of the plurality of guide vanes, the unitary actuator being movable to change the pitch angle of the corresponding one of the plurality of guide vanes.

The open rotor aeronautical engine any preceding clause, wherein the pitch change assembly comprises: an ensemble actuator assembly comprising the one or more actuators and a unison ring, wherein the unison ring is movable by actuating the one or more actuators to collectively change the pitch angle of respective ones of the plurality of guide vanes; wherein the plurality of linkage arms extend between the unison ring and the corresponding one of the plurality of guide vanes.

The open rotor aeronautical engine of any preceding clause, wherein the pitch change assembly comprises: a plurality of unitary actuators, wherein respective ones of the plurality of unitary actuators are disposed between a corresponding one of the plurality of linkage arms and a corresponding one of the plurality of guide vanes.

The open rotor aeronautical engine any preceding clause, wherein the plurality of guide vanes comprises a first guide vane and a second guide vane, wherein the first guide vane and the second guide vane are located at inversely disposed circumferential positions.

The open rotor aeronautical engine of any preceding clause, wherein the first guide vane has a first circumferential position corresponding to a horizontally leftward orientation, and wherein the second guide vane has a second circumferential position corresponding to a horizontally rightward orientation.

The open rotor aeronautical engine of any preceding clause, wherein the first circumferential position is from a seven o'clock position to an eleven o'clock position; and/or wherein the second circumferential position is from a one o'clock position to a five o'clock position.

The open rotor aeronautical engine of any preceding clause, wherein the first circumferential position is a nine o'clock position; and/or wherein the second circumferential position is a three o'clock position.

The open rotor aeronautical engine of any preceding clause, wherein the first guide vane has a first circumferential position and the second guide vane has a second circumferential position, and wherein the first circumferential position differs from the second circumferential position by $\pi$-radians+/−(⅓)-$\pi$-radians.

The open rotor aeronautical engine of any preceding clause, wherein the first circumferential position differs from the second circumferential position by $\pi$-radians+/−(⅙)-$\pi$-radians.

The open rotor aeronautical engine of any preceding clause, wherein the first circumferential position corresponds to a horizontally leftward orientation and the second circumferential position corresponds to a horizontally rightward orientation; or wherein the first circumferential position corresponds to a vertically upward orientation and the second circumferential position corresponds to a vertically downward orientation.

The open rotor aeronautical engine any preceding clause, comprising: an electronic controller, wherein the electronic controller is configured to actuate the one or more actuators to a first position during a cruise flight condition and to actuate the one or more actuators to a second position during at least one of: a climbing flight condition, a descending flight condition, and a takeoff flight condition.

The open rotor aeronautical engine any preceding clause, comprising: an electronic controller, wherein the electronic controller is configured to actuate the one or more actuators responsive to an excitation load acting upon the open rotor aeronautical engine.

The open rotor aeronautical engine any preceding clause, wherein the excitation load comprises an asymmetric load corresponding to one or more circumferential positions of respective ones of the plurality of guide vanes, and wherein the envelope of rotation of the respective ones of the plurality of guide vanes are selected at least in part to offset the asymmetric load at least partially.

The open rotor aeronautical engine any preceding clause, wherein the guide vanes comprise outlet guide vanes.

The open rotor aeronautical engine any preceding clause, wherein the guide vanes comprise inlet guide vanes.

The open rotor aeronautical engine any preceding clause, comprising: an unducted fan assembly rotatably driven by the core engine.

The open rotor aeronautical engine of any preceding clause, comprising: the pitch change assembly of any preceding clause.

A non-transitory computer-readable medium comprising computer-executable instructions, which when executed by a processor associated with an electronic controller for an aeronautical gas turbine engine, cause the electronic controller to perform a method of controlling the aeronautical gas turbine engine, the method comprising: determining, with the electronic controller, an airfoil pitch control command for at least one of a plurality of airfoils of the aeronautical gas turbine engine based at least in part on an excitation load acting upon the aeronautical gas turbine engine; and outputting, with the electronic controller, the airfoil pitch control command to one or more actuators actuatable to change a pitch angle of the at least one of the plurality of airfoils, wherein the airfoil pitch control command is configured to augment and/or compensate for the excitation load acting upon the aeronautical gas turbine engine.

The non-transitory computer-readable medium any preceding clause, wherein the plurality of airfoils comprises a plurality of fan blades, and wherein the airfoil pitch control command is configured to change a pitch angle of at least one of the plurality of fan blades; and/or wherein the plurality of airfoils comprises a plurality of guide vanes, and wherein the airfoil pitch control command is configured to change a pitch angle of at least one of the plurality of guide vanes.

The non-transitory computer-readable medium any preceding clause, wherein the excitation load comprises an asymmetric load.

The non-transitory computer-readable medium of any preceding clause, wherein the asymmetric load corresponds to a circumferential position of one or more of the unducted airfoils.

The non-transitory computer-readable medium of any preceding clause, wherein the asymmetric load comprises a cyclic load.

The non-transitory computer-readable medium of any preceding clause, wherein the cyclic load comprises a 1P load.

The non-transitory computer-readable medium any preceding clause, wherein the excitation load comprises an autogenous load.

The non-transitory computer-readable medium of any preceding clause, wherein the autogenous load comprises at least one of: an aeroelastic load and a gyroscopic load.

The non-transitory computer-readable medium of any preceding clause, wherein the excitation load acting upon the aeronautical gas turbine engine comprises an excitation load acting upon one or more of the plurality of fan blades.

The non-transitory computer-readable medium of any preceding clause, wherein the excitation load acting upon the aeronautical gas turbine engine comprises an excitation load acting upon one or more of the plurality of guide vanes.

The non-transitory computer-readable medium any preceding clause, wherein the plurality of airfoils comprises a plurality of fan blades and a plurality of guide vanes, and wherein the excitation load acting upon the aeronautical gas turbine engine comprises an excitation load acting upon one or more of the plurality of fan blades, and wherein the airfoil pitch control command is configured to change a pitch angle of at least one of the plurality of guide vanes.

The non-transitory computer-readable medium any preceding clause, wherein the excitation load comprises an asymmetric load corresponding to one or more circumferential positions of respective ones of the plurality of airfoils, and wherein the airfoil pitch control command is configured to at least partially offset the asymmetric load.

The non-transitory computer-readable medium any preceding clause, wherein the airfoil pitch control command for the at least one of the plurality of airfoils comprises one or more airfoil pitch control commands configured to change a first pitch angle of a first one of the plurality of airfoils and a second pitch angle of a second one of the plurality of airfoils; and wherein the first one of the plurality of airfoils and the second one of the plurality of airfoils are located at inversely disposed circumferential positions.

The non-transitory computer-readable medium of any preceding clause, wherein the one or more airfoil pitch control commands comprises: a first airfoil pitch control command configured to change the first pitch angle of the first one of the plurality of airfoils; and a second airfoil pitch control command configured to change the second pitch angle of the second one of the plurality of airfoils.

The non-transitory computer-readable medium of any preceding clause, wherein the one or more airfoil pitch control commands are configured to change at least one of: the first pitch angle of the first one of the plurality of airfoils at a circumferential position corresponding to a horizontally leftward orientation, and the second pitch angle of the second one of the plurality of airfoils at a circumferential position corresponding to a horizontally rightward orientation.

The non-transitory computer-readable medium of any preceding clause, wherein the circumferential position corresponding to the horizontally leftward orientation is from a seven o'clock position to an eleven o'clock position; and/or wherein the circumferential position corresponding to the horizontally rightward orientation is from a one o'clock position to a five o'clock position.

The non-transitory computer-readable medium any preceding clause, comprising further computer-executable instructions, which when executed by the processor, cause the electronic controller to further perform the method of controlling the aeronautical gas turbine engine, including: determining, with the electronic controller, the excitation load acting upon the aeronautical gas turbine engine, wherein the excitation load is determined based at least in part on sensor data from one or more sensors.

The non-transitory computer-readable medium of any preceding clause, wherein the excitation load acts upon the aeronautical gas turbine engine as a result of, or in relation to, one or more airfoil excitation phenomenon, the one or more airfoil excitation phenomenon comprising at least one of: a cyclic excitation and an autogenous excitation.

The non-transitory computer-readable medium of any preceding clause, wherein determining the excitation load comprises determining a variation in sensor values indicative of an autogenous excitation.

The non-transitory computer-readable medium of any preceding clause, wherein the autogenous excitation comprises at least one of: an aeroelastic excitation and a gyroscopic excitation.

The non-transitory computer-readable medium of any preceding clause, wherein determining the excitation load comprises at least one of: determining an amplitude of the sensor values and/or a slope of the amplitude of the sensor values; and/or determining a frequency of the sensor values and/or a slope of the frequency of the sensor values.

The non-transitory computer-readable medium of any preceding clause, wherein the method comprises: determining an aeroelastic load based at least in part on the amplitude of the sensor values and/or the frequency of the sensor values being greater than a threshold value.

The non-transitory computer-readable medium of any preceding clause, wherein the method comprises: determining a nominal operating condition based at least in part on the amplitude of the sensor values and/or the frequency of the sensor values being less than the threshold value.

The non-transitory computer-readable medium of any preceding clause, wherein the method comprises: determining an aeroelastic load based at least in part on the slope of the amplitude of the sensor values and/or the slope of the frequency of the sensor values being greater than a threshold slope.

The non-transitory computer-readable medium of any preceding clause, wherein the method comprises: determining a nominal operating condition based at least in part on the slope of the amplitude of the sensor values and/or the slope of the frequency of the sensor values being less than the threshold slope The non-transitory computer-readable medium any preceding clause, wherein determining the airfoil pitch control command comprises: determining a baseline schedule for the pitch angle of respective ones of the plurality of airfoils; and determining one or more changes to the baseline schedule, the one or more changes to the baseline schedule configured to change the pitch angle of one or more of the plurality of airfoils.

The non-transitory computer-readable medium any preceding clause, wherein determining the airfoil pitch control command comprises: determining a first airfoil pitch control command configured to actuate an ensemble actuator to collectively change the pitch angle of respective ones of the plurality of airfoils; and determining a second airfoil pitch control command configured to actuate one or more unitary actuators respectively configured to individually change the pitch angle of a respective one of the plurality of airfoils.

An excitation load control system for an aeronautical gas turbine engine, the excitation load control system comprising: one or more sensors configured to provide sensor data indicative of an excitation load acting upon the aeronautical gas turbine engine; a pitch change assembly comprising one or more actuators actuatable to individually and/or collectively change a pitch angle of respective ones of a plurality of airfoils of the aeronautical gas turbine engine; and an electronic controller configured to perform a method comprising: determining the excitation load acting upon the aeronautical gas turbine engine based at least in part on the sensor data; determining an airfoil pitch control command based at least in part on the excitation load; and outputting the airfoil pitch control command to the one or more actuators, wherein the airfoil pitch control command is configured to augment and/or compensate for the excitation load.

The excitation load control system any preceding clause, wherein the one or more sensors comprise at least one of: one or more aerodynamic incidence sensors; one or more vibration sensors configured to perform vibration-based condition monitoring; and one or more strain gauges.

The excitation load control system any preceding clause, wherein the one or more sensors comprises the one or more aerodynamic incidence sensors, wherein the one or more aerodynamic incidence sensors comprises at least one of: an angle of attack sensor and an angle of sideslip sensor.

The excitation load control system any preceding clause, wherein the one or more sensors comprises the one or more vibration sensors, wherein the one or more vibration sensors comprises at least one of: an accelerometer, a strain gauge, an eddy-current sensor, an acoustic sensor, an optical displacement sensor, and a gyroscope.

The excitation load control system any preceding clause, wherein the one or more sensors comprises the one or more vibration sensors, wherein the one or more vibration sensors are located on, at, within, or in proximity to at least one of: one or more bearing assemblies of the aeronautical gas turbine engine; a fan assembly of the aeronautical gas turbine engine; and a guide vane assembly of the aeronautical gas turbine engine.

The excitation load control system any preceding clause, wherein the one or more sensors comprises the one or more strain gauges, wherein the one or more strain gauges are coupled to and/or contained within respective ones of the plurality of airfoils.

The excitation load control system any preceding clause, wherein the one or more sensors comprises the one or more strain gauges, wherein the one or more strain gauges are coupled to and/or contained within an engine support structure of the aeronautical gas turbine engine.

The excitation load control system of any preceding clause, comprising: one or more position indicators configured to determine a circumferential position at least one of the plurality of airfoils, and/or one or more pitch angle indicators respectively configured to determine a pitch angle of at least one of the plurality of airfoils.

The excitation load control system any preceding clause, wherein the plurality of airfoils comprises at least one of: a plurality of fan blades, and a plurality of guide vanes.

The excitation load control any preceding clause, wherein the aeronautical gas turbine engine comprises an open rotor aeronautical gas turbine engine.

A method of controlling an aeronautical gas turbine engine, the method comprising: determining, with an electronic controller, an airfoil pitch control command for at least one of a plurality of airfoils of the aeronautical gas turbine engine based at least in part on an excitation load acting upon the aeronautical gas turbine engine; and outputting, with the electronic controller, the airfoil pitch control command to one or more actuators actuatable to change a pitch angle of the at least one of the plurality of airfoils, wherein the airfoil pitch control command is configured to augment and/or compensate for the excitation load acting upon the aeronautical gas turbine engine.

The method of any preceding clause, wherein the method is performed using the open rotor gas turbine engine of any preceding clause.

The method of any preceding clause, wherein the method is performed using the excitation load control system of any preceding clause.

The method of any preceding clause, wherein the method is performed using the non-transitory computer-readable medium of any preceding clause.

A controller configured to perform one or more of the steps of a method of any preceding clause.

A gas turbine engine comprising a means for performing one or more of the steps of a method of any preceding clause.

This written description uses examples to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. The scope of the claims encompasses such other examples that include structural elements that do not differ from the literal language of the claims or that have insubstantial differences from the literal languages of the claims.

We claim:

1. A non-transitory computer-readable medium comprising computer-executable instructions, which when executed by a processor associated with an electronic controller for an aeronautical gas turbine engine, cause the electronic controller to perform a method of controlling the aeronautical gas turbine engine, the method comprising:

determining, with the electronic controller, an airfoil pitch control command for at least one of a plurality of airfoils of the aeronautical gas turbine engine based at least in part on an excitation load acting upon the aeronautical gas turbine engine; and outputting, with the electronic controller, the airfoil pitch control command to one or more actuators actuatable to change a pitch angle of the at least one of the plurality of airfoils, wherein the airfoil pitch control command is configured to augment or compensate for the excitation load acting upon the aeronautical gas turbine engine, wherein the airfoil pitch control command includes instructions to actuate an ensemble actuator assembly including one or more ensemble actuators mounted to a fan case, one or more unitary actuators, each of the one or more unitary actuators connected to one of the plurality of airfoils, and a unison ring operably connecting the one or more ensemble actuators to the one or more unitary actuators, wherein the airfoil pitch control command includes instructions to actuate the one or more ensemble actuators to translate the unison ring to change the respective pitch angle of respective ones of the plurality of airfoils.

2. The non-transitory computer-readable medium of claim 1, wherein the plurality of airfoils comprises a plurality of fan blades, and wherein the airfoil pitch control command is configured to change a pitch angle of at least one of the plurality of fan blades; or wherein the plurality of airfoils comprises a plurality of guide vanes, and wherein the airfoil pitch control command is configured to change a pitch angle of at least one of the plurality of guide vanes.

3. The non-transitory computer-readable medium of claim 1, wherein the plurality of airfoils comprises a plurality of fan blades and a plurality of guide vanes, and wherein the excitation load acting upon the aeronautical gas turbine engine comprises an excitation load acting upon one or more of the plurality of fan blades, and wherein the airfoil pitch control command is configured to change a pitch angle of at least one of the plurality of guide vanes.

4. The non-transitory computer-readable medium of claim 1, wherein the excitation load comprises an asymmetric load corresponding to one or more circumferential positions of respective ones of the plurality of airfoils, and wherein the airfoil pitch control command is configured to at least partially offset the asymmetric load.

5. The non-transitory computer-readable medium of claim 1, wherein the airfoil pitch control command for the at least one of the plurality of airfoils comprises one or more airfoil pitch control commands configured to change a first pitch angle of a first one of the plurality of airfoils and a second pitch angle of a second one of the plurality of airfoils; and wherein the first one of the plurality of airfoils and the second one of the plurality of airfoils are located at inversely disposed circumferential positions.

6. The non-transitory computer-readable medium of claim 5, wherein the one or more airfoil pitch control commands comprises:

a first airfoil pitch control command configured to change the first pitch angle of the first one of the plurality of airfoils; and a second airfoil pitch control command configured to change the second pitch angle of the second one of the plurality of airfoils.

7. The non-transitory computer-readable medium of claim 5, wherein the one or more airfoil pitch control commands are configured to change at least one of: the first pitch angle of the first one of the plurality of airfoils at a circumferential position corresponding to a horizontally leftward orientation, and the second pitch angle of the second one of the plurality of airfoils at a circumferential position corresponding to a horizontally rightward orientation.

8. The non-transitory computer-readable medium of claim 7, wherein the circumferential position corresponding to the horizontally leftward orientation is from a seven o'clock position to an eleven o'clock position; or wherein the circumferential position corresponding to the horizontally rightward orientation is from a one o'clock position to a five o'clock position.

9. The non-transitory computer-readable medium of claim 1, comprising further computer-executable instructions, which when executed by the processor, cause the electronic controller to further perform the method of controlling the aeronautical gas turbine engine, including:

determining, with the electronic controller, the excitation load acting upon the aeronautical gas turbine engine, wherein the excitation load is determined based at least in part on sensor data from one or more sensors.

10. The non-transitory computer-readable medium of claim 9, wherein the excitation load acts upon the aeronautical gas turbine engine as a result of, or in relation to, one or more airfoil excitation phenomenon, the one or more airfoil excitation phenomenon comprising at least one of: a cyclic excitation and an autogenous excitation.

11. The non-transitory computer-readable medium of claim 9, wherein determining the excitation load comprises determining a variation in sensor values indicative of an autogenous excitation.

12. The non-transitory computer-readable medium of claim 11, wherein determining the excitation load comprises at least one of:

determining an amplitude of the sensor values and or a slope of the amplitude of the sensor values; or determining a frequency of the sensor values or a slope of the frequency of the sensor values.

13. The non-transitory computer-readable medium of claim 1, wherein determining the airfoil pitch control command comprises:

determining a baseline schedule for the pitch angle of respective ones of the plurality of airfoils; and determining one or more changes to the baseline schedule, the one or more changes to the baseline schedule configured to change the pitch angle of one or more of the plurality of airfoils.

14. The non-transitory computer-readable medium of claim 1, wherein determining the airfoil pitch control command comprises:

determining a first airfoil pitch control command configured to actuate the ensemble actuator to collectively change the pitch angle of respective ones of the plurality of airfoils; and determining a second airfoil pitch control command configured to actuate one or more unitary actuators respectively configured to individually change the pitch angle of a respective one of the plurality of airfoils.

15. An excitation load control system for an aeronautical gas turbine engine, the excitation load control system comprising:

one or more sensors configured to provide sensor data indicative of an excitation load acting upon the aeronautical gas turbine engine;

a pitch change assembly comprising one or more actuators actuatable to individually or collectively change a pitch angle of respective ones of a plurality of airfoils of the aeronautical gas turbine engine; and an electronic controller configured to perform a method comprising:

determining the excitation load acting upon the aeronautical gas turbine engine based at least in part on the sensor data;

determining an airfoil pitch control command based at least in part on the excitation load; and outputting the airfoil pitch control command to the one or more actuators, wherein the airfoil pitch control command is configured to augment or compensate for the excitation load, wherein the airfoil pitch control command includes instructions to actuate an ensemble actuator assembly including one or more ensemble actuators mounted to a fan case, one or more unitary actuators, each of the one or more unitary actuators connected to one of the plurality of airfoils, and a unison ring operably connecting the one or more ensemble actuators to the one or more unitary actuators, wherein the airfoil pitch control command includes instructions to actuate the one or more ensemble actuators to translate the unison ring to change the respective pitch angle of respective ones of the plurality of airfoils.

16. The excitation load control system of claim 15, wherein the one or more sensors comprise at least one of:

one or more aerodynamic incidence sensors;

one or more vibration sensors configured to perform vibration-based condition monitoring; and one or more strain gauges.

17. The excitation load control system of claim 16, comprising:

one or more position indicators configured to determine a circumferential position at least one of the plurality of airfoils, or one or more pitch angle indicators respectively configured to determine a pitch angle of at least one of the plurality of airfoils.

18. The excitation load control system of claim 15, wherein the plurality of airfoils comprises at least one of: a plurality of fan blades, and a plurality of guide vanes.

19. The excitation load control system of claim 15, wherein the aeronautical gas turbine engine comprises an open rotor aeronautical gas turbine engine.

20. A method of controlling an aeronautical gas turbine engine, the method comprising:

determining, with an electronic controller, an airfoil pitch control command for at least one of a plurality of airfoils of the aeronautical gas turbine engine based at least in part on an excitation load acting upon the aeronautical gas turbine engine; and outputting, with the electronic controller, the airfoil pitch control command to one or more actuators actuatable to change a pitch angle of the at least one of the plurality of airfoils, wherein the airfoil pitch control command is configured to augment or compensate for the excitation load acting upon the aeronautical gas turbine engine, wherein the airfoil pitch control command includes instructions to actuate an ensemble actuator assembly including one or more ensemble actuators mounted to a fan case, one or more unitary actuators, each of the one or more unitary actuators connected to one of the plurality of airfoils, and a unison ring operably connecting the one or more ensemble actuators to the one or more unitary actuators, wherein the airfoil pitch control command includes instructions to actuate the one or more ensemble actuators to translate the unison ring to change the respective pitch angle of respective ones of the plurality of airfoils.

* * * * *